United States Patent [19]
Okada

[11] Patent Number: 6,122,285
[45] Date of Patent: Sep. 19, 2000

[54] DATA TRANSFER METHOD USING RING CONNECTION AND INFORMATION PROCESSING SYSTEM USING RING CONNECTION

[75] Inventor: Yasuyuki Okada, Yamato, Japan

[73] Assignee: Hitachi, Ltd., Tokyo, Japan

[21] Appl. No.: 08/785,394

[22] Filed: Jan. 21, 1997

[30] Foreign Application Priority Data

Jan. 19, 1996 [JP] Japan .................................. 8-007140

[51] Int. Cl.$^7$ ............................................... H04L 12/403
[52] U.S. Cl. ........................................ 370/450; 370/449
[58] Field of Search .................................... 370/438, 439, 370/450, 452, 453, 454, 455, 456, 449; 340/825.5, 825.51

[56] References Cited

U.S. PATENT DOCUMENTS

| | | | |
|---|---|---|---|
| 4,780,871 | 10/1988 | Arakwa | 370/450 |
| 4,787,083 | 11/1988 | Tanaka | 370/85 |
| 4,860,000 | 8/1989 | Kobayashi | 340/825.5 |
| 4,924,461 | 5/1990 | Amemiya et al. | 370/95.2 |
| 5,444,847 | 8/1995 | Iitsuka | 395/287 |
| 5,495,484 | 2/1996 | Self et al. | 370/110.1 |

OTHER PUBLICATIONS

IEEE Standard 1596–1992, Scaleable Coherent Interface (SCI), 1992, or D. Cecchi, M. Dina, C. Preuss, "A 1GB/S SCI Link in 0.8MBiCMOS," 1995 IEEE International Solid-State Circuits Conference, San Francisco, CA, Digest of Technical Papers, Paper 20.2, Feb., 1995, pp. 326–327.

*Primary Examiner*—Huy D. Vu
*Assistant Examiner*—Alexander Boakye
*Attorney, Agent, or Firm*—Mattingly, Stanger & Malur

[57] ABSTRACT

A ring connection which has been used for connecting processors connected far from each other, is improved in latency, throughput and operational function and is applied to attain high speed connection between processors. A plurality of modules such as processors are connected with rings having a plurality of signal lines. An independent signal line for a flag for acquiring a transmission right is provided. A transmission right is requested by setting the flag, and reception and transmission operations and transfer operation in the ring are operated in parallel by confirming later the advance acquisition of the transmission right based on the detection of no setting of the received flag.

12 Claims, 44 Drawing Sheets

REDUNDANT RING

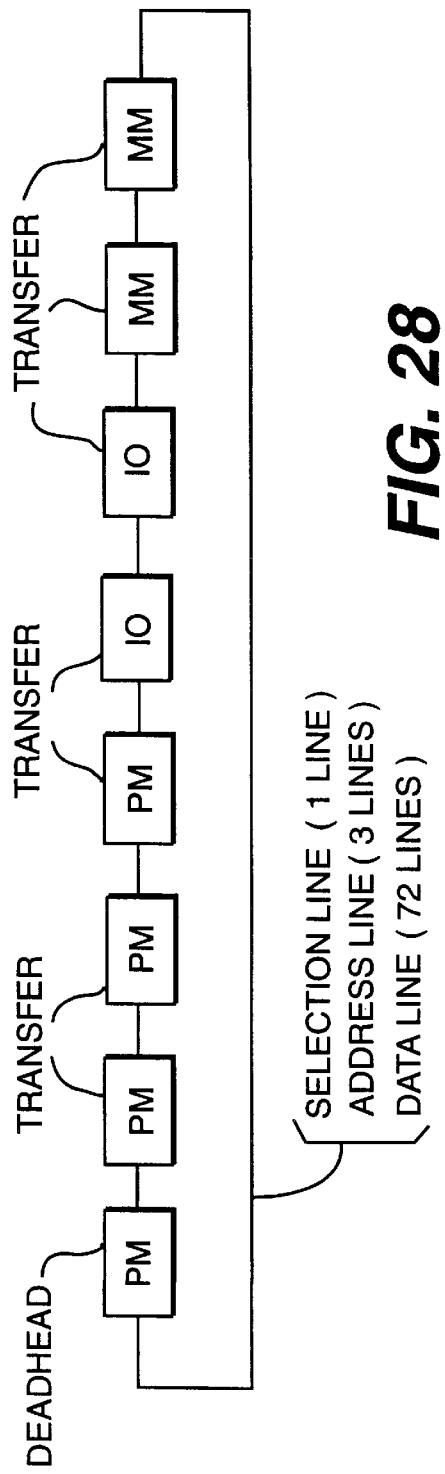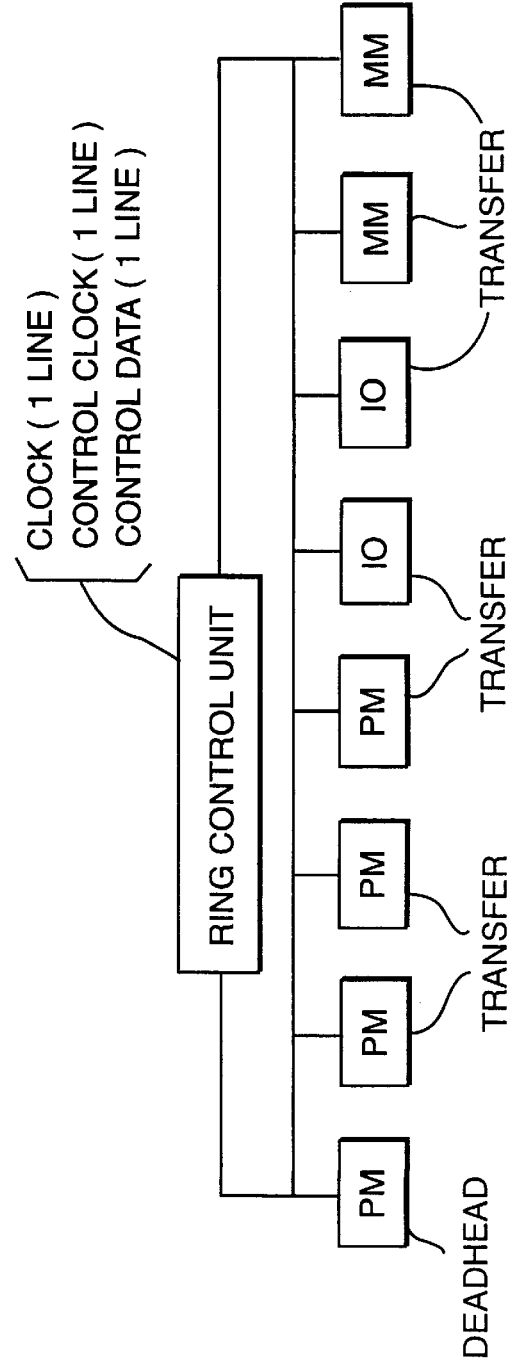

```
MEMORY ADDRESS (40 BITS)
    LOCAL MEMORY ADDRESS (36 BITS)
    LOCAL DIRECTORY TABLE (30 BITS)
       LOCAL DIRECTORY (26 BITS)
         ADDRESS TRANSLATION ENTRY
                 (18 BITS)
    ADDRESS TRANSLATION TABLE (22 BITS)
```

*FIG. 66*

```
  1 | 22 BITS
  2 | 22 BITS
    |   ⋮
256K| 22 BITS
```

*FIG. 67*

| | ADDRESS (4/8 BITS) | COPY VECTOR (8 BITS) |
|---|---|---|
| 1 | ADDRESS (4/8 BITS) | COPY VECTOR (8 BITS) |
| 2 | ADDRESS (4/8 BITS) | COPY VECTOR (8 BITS) |
| ⋮ | | |
| 4M | ADDRESS (4/8 BITS) | COPY VECTOR (8 BITS) |

*FIG. 68*

DATA TRANSFER METHOD USING RING CONNECTION AND INFORMATION PROCESSING SYSTEM USING RING CONNECTION

FIELD OF THE INVENTION

The invention relates to a data transfer method and information processing system using a ring connection system connecting information processing systems such as personal computers, work stations, and servers, and in particular relates to a data transfer method and information processing system using a ring connection system suitable for high speed data transferring between a plurality of processors.

BACKGROUND OF THE INVENTION

As information processing systems such as personal computers have become more popular and have been used in various fields, improving processing performance. For improving the performance, an approach that a plurality of processors is incorporated in an information processing system has been proposed. For this structure, high speed data transfer between the plurality of processors is an important factor in ensuring high performance. Typical high speed connection systems include the ring connection system, the conventional bus system and the switch system, which are shown, respectively, in FIGS. 1A, 1B and 1C.

The bus system is most popular as the connection means between processors that achieves high speed data transfer. The bus system does not need external additional circuits for connection and is flexible for expansion, and needs fewer number of pins which are necessary for connectors and is inexpensive. Further, all processors can see the content of the bus, therefore this system is suitable for broadcast communication (snoop) of tightly-coupled inter-processor connection.

For the bus connection system shown in FIG. 1A, the communication capacity, which is an important determinant of the performance and number of processors to be connected, depends on the clock frequency. In the processor bus, the time difference for signal transmission to the nearest processor and to the farthest processor should be included in the same clock cycle, so the operating frequency is limited by the bus length. The design value of the clock, LSI, and skew of the transmission line influence directly on the operating frequency. Because of the possibility of all of the combinations of transmitters and receivers, suitable for skew correction cannot be achieved. Degradation of transmission performance due to both-way transmission of a signal from outgoing lines to processors and passage in outgoing lines, and also the limitation on the operating frequency due to the necessity of providing an adequate driving capability to all of the processors are the main limiting conditions. To compensate, the length of the bus can be shortened to improve the operation frequency, but this puts a limitation on the flexibility in design regarding the mounting of the processors of the microprocessor systems. The operating frequency is improved by transmitting clock and data together, but the frequent switching between processors in the processor bus causes long switching times. The number of processors to be connected is also limited electrically. Further, the delay for acquisition of transmission right on the bus causes another performance limitation. There is also the problem of high performance connection between processors in the case that switching of inter-processor transfer is frequent whereby consistent response is not obtained from the processors.

FIG. 1C shows a switch connection system for LSI processors. When a switch system is used for connecting processors, a signal is transferred one way, and the operating frequency is improved because of the one-to-one communication. The total communication capacity is not limited theoretically, and the number of connections is not limited. On the other hand, the switch is an external component and connection between the processors is star-like. As a result, the total length of wiring is significant and the wiring around the switch becomes crowded. Further, the broadcast communication makes the control complex and the delay time due to passage through the switch also limits the performance.

A ring connection system is shown in FIG. 1B. The ring is also used for connection between processors. In the ring connection system, a signal is transferred in one way with one-to-one correspondence, therefore the communication capacity can be made larger than that of the bus system. The length of the transmission line to the next processor is short, the short transmission line enables skew correction of the clock, LSI, and transmission line. The outgoing line for a signal is unnecessary, and because only the next processor is driven, there are fewer limitations on the operating frequency. There is no limitation on the length of the connections, unlike the bus system and the number of connections is not limited electrically. Also, as for the bus system, the additional circuits are unnecessary, and less wiring is required than that for the bus system. Further, because all of the processors can see the content of the ring, the ring system is suitable for broadcast communication (snoop) for close-coupled inter-processor connection.

On the other hand, in the case of the ring connection system, the ring needs many pins in the order of two times that of the bus. The bus can transmit to all processors with one clock, but in the case of a ring, time delay for passage through processors is significant because of skew correction, clock synchronization, and control of transmission right, and in particular, the tightly-coupled inter-processor connection presents a problem.

Examples of application of a ring to inter-processor connections are described in, for example, IEEE Standard 1596H- 1992, "Scaleable Coherent Interface (SCI)", 1992, or D. Cecchi, M. Dina, C. Preuss, "A IGB/S SCI Link in 0.8MBiCMOS," 1995 IEEE International Solid-State Circuits Conference, San Francisco, Calif., Digest of Technical Papers. Paper 20. 2, February 1995, pp. 326–327. SCI is the typical inter-processor connection described in the above-mentioned literature, however, it does not solve sufficiently the above-mentioned problem.

The structure of the interface of a ring is shown in FIG. 2 for the case in which the ring connection is used for establishing the inter-processor connection system.

In FIG. 2, a signal is received from a reception line 800 and stored in buffer 801. The flag and address are judged, then the signal is processed and transmitted to the receiving FIFO 807 or relay FIFO 806. A clock different from the reception clock, which operates in the area 802, is used for the modules of the processors, therefore buffers for absorbing the speed difference, namely receiving FIFO 807 and relay FIFO 806, are necessary. The receiving clock and the clock for the modules are different from each other in phase as a matter of course, therefore changing the clock is necessary between the buffer 801 and transmission processing 805. A signal is transmitted through the transfer latch 803 for transmission. Using a synchronous pattern periodically, signals are subjected to skew correction together before entering to the buffer 801. A packet for confirming the delivery is generated automatically and transmitted. Only one ring is used, and all the information is exchanged using the same packet form. A signal is subjected to cache coherence without using the broadcast function such as snoop. The cache coherence is ensured by using one-to-one packet communication. Failure detection, separation, and recovery are carried out through the ring, transfer pass of an ordinary packet.

As described herein above for the prior art, to use the processor bus (Here "bus" is used as a general term indicating means for connecting a processor to another processor or unit) properly, it is necessary to realize effectively the functions which are inherent in the processor bus by improving latency, throughput, and operability. Further, it is necessary to improve the time delay due to passage through processors in the ring connection, and to break the performance limit of the processor bus which has been based on the assumption that the processor bus is used for short distance connections.

SUMMARY OF THE INVENTION

It is an object of the present invention to provide a data transfer method and information processing system using a ring connection which enables latency to be shortened due to passage of signals through processors in the ring.

It is an object of the present invention to provide a data transfer method and information processing system using a ring connection which enables the clock to be supplied stably to modules rather than to the ring while the ring is inactive during switching.

It is an object of the present invention to provide a data transfer method and information processing system using a ring connection which provides high throughput in the information processing system.

It is an object of the present invention to provide a data transfer method and information processing system using a ring connection which shortens the system quiescent time accompanied by the structural change of the ring.

To achieve the above-mentioned objects, a data transfer method using a ring connection according to the present invention involves an information processing system having a plurality of modules such as processors connected together with a ring comprising a plurality of signal lines, wherein an independent signal line for the flag is provided to acquire a transmission right. Reception and transmission operations and the transfer operation of the ring are operated in parallel by confirming later in time the advance acquisition of the transmission right based on the operations that the flag is set, a transmission right is requested, and no setting of the received flag is detected.

According to another object of the present invention, a data transfer method using the ring connection system of the present invention involves an information processing system having a plurality of modules such as processors connected together with a ring comprising a plurality of signal lines, wherein the same clock signal is distributed to the rings, and the clock is used for transferring, transmission, and reception.

According to yet another object of the invention, a data transfer method using the ring connection of the present invention involves an information processing system having a plurality of modules such as processors connected together with a ring comprising a plurality of signal lines, wherein the phase of the clock is matched to a signal to be received by a phase adjusting circuit, the clock with the same phase is used commonly for transfer control, reception control, and transmission control to eliminate delay due to switching of the clock, and at least one module in deadhead mode out of the plurality of modules matches the delay for one circulation of the ring to a cycle of an integral multiple of the clock.

According to yet another object of the invention, a data transfer method using the ring connection of the present invention involves an information processing system having a plurality of modules such as processors connected together with a ring comprising a plurality of signal lines, wherein transfer to a next module from one module operates without latching of the one module, then transmission is operated with matching to the phase before latching.

According to yet another object of the invention, an information processing system using the ring connection of the present invention having a plurality of modules such as processors connected together with a ring comprising a plurality of signal lines, wherein the information processing system is provided with an independent signal line for a flag provided to acquire a transmission right, and a means for confirming later in time the advance acquisition of the transmission right based on the operations that the flag is set, a transmission right is requested, and no setting of the received flag is detected.

According to yet another object of the invention, an information processing system using the ring connection of the present invention having a plurality of modules such as processors connected together with a ring comprising a plurality of signal lines, wherein a phase adjusting circuit for matching the phase of clock to a signal to be received, a means for supplying the clock with the same phase used commonly for transfer control, reception control, and transmission control, and at least one module in deadhead mode out of the plurality of modules for matching the delay for one circulation of the ring to a cycle of an integral multiple of the clock are provided.

According to yet another object of the invention, an information processing system using the ring connection of the present invention having a plurality of modules such as processors connected together with a ring comprising a plurality of signal lines, wherein a means for transferring to the next module out of the plurality of modules without latching respective module out of the plurality of modules, and a means for transmitting with matching to the phase before latching.

According to yet another object of the invention, an information processing system using the ring connection of the present invention having a plurality of modules such as processors connected together with a ring comprising a plurality of signal lines, wherein a means for transferring to the next module out of the plurality of modules without latching the respective module out of the plurality of modules, and a means for transmitting with matching to the phase before latching are provided.

According to yet another object of the invention, an information processing system using the ring connection of the present invention having a plurality of modules such as processors connected together with a ring comprising a plurality of signal lines, wherein the information processing system is provided with a signal line for acquiring a transmission right of block packet for transferring continuous packets, a signal line for notifying the suppression of the transmission request of ordinary packets during a time period of block transfer after 2 cycles from the acquisition of the transmission right, and means for permitting the transmission of a block packet after 4 cycles from the acquisition of transmission right of a block packet.

BRIEF DESCRIPTION OF THE DRAWINGS

FIG. 28 is a diagram for illustrating the basic ring of the present invention;

FIG. 29 is a diagram for illustrating the control ring of the present invention;

FIG. 66 is a diagram for illustrating extension of the address in the present invention;

FIG. 67 is a diagram for illustrating the address translation table of the present invention;

FIG. 68 is a diagram for illustrating the remote directory of the present invention;

DETAILED DESCRIPTION OF THE PREFERRED EMBODIMENTS

Figure 1:
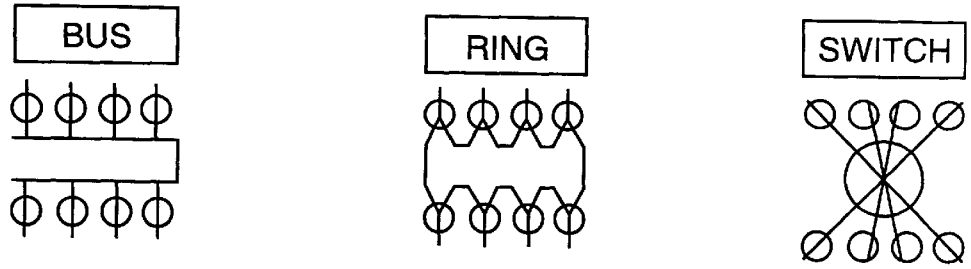
FIG. 1 is a diagram of the inter-processor connection technology between ring, bus, and switch.
Figure 2:
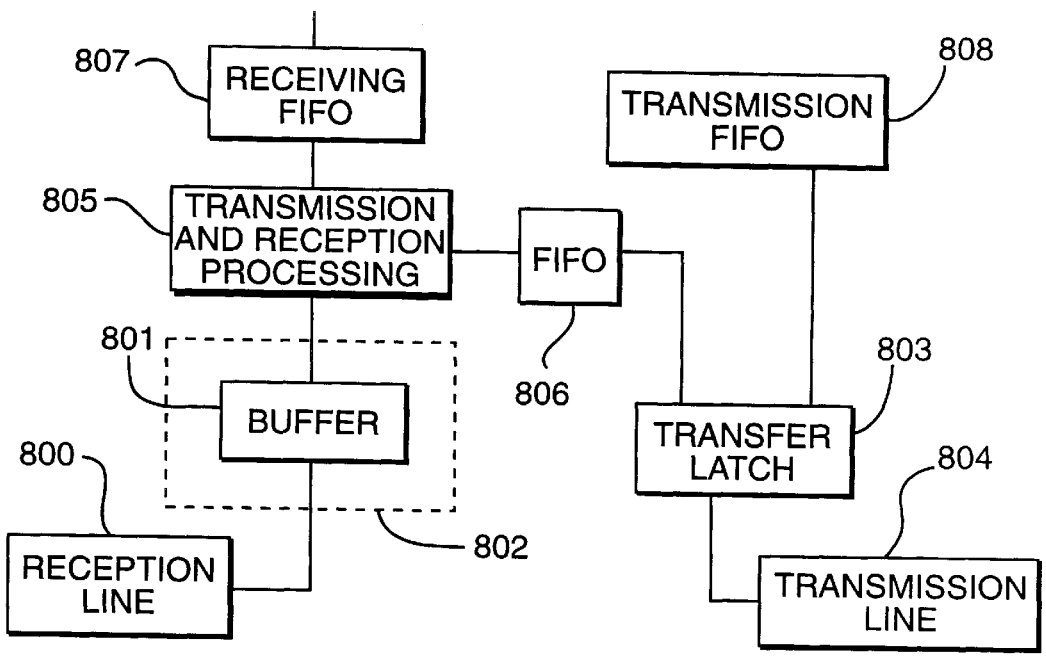
FIG. 2 is a diagram for illustrating the structure of the interface of the ring in a ring connection system.

Embodiments of the present invention will be described in detail hereinafter referring to the drawings. First, the basic concept of the present invention is described.

APPLICATION OF THE RING TO A PROCESSOR BUS

In the present invention, a ring which has been used for high speed long distance transmission is applied to a processor bus to increase the performance limit of the bus by applying the advantageous high speed performance of the ring. The most important performance element of the processor bus is the shortening of the latency which is not so important for long distance transmission connections. On the other hand, because the ring shares the transfer capacity, the sharing is essentially the bottle neck for the throughput. The recovery from failure of the transmission system is important for long distance transmission, therefore the transmission system is independent. On the other hand, a processor bus is a system for short distance transmission which has fewer connection modules, and because an information system using a processor bus shares its clock, power source, cooling system, and box, the processor bus is involved in fewer failures of its transmission system. Since integral operation of a ring system such as failure detection, separation, and structural change of modules is important, the ring, which is improved in latency, throughput, and operability, is applied to a processor bus.

ONE CYCLE ONE PACKET TRANSFER

Figure 3:
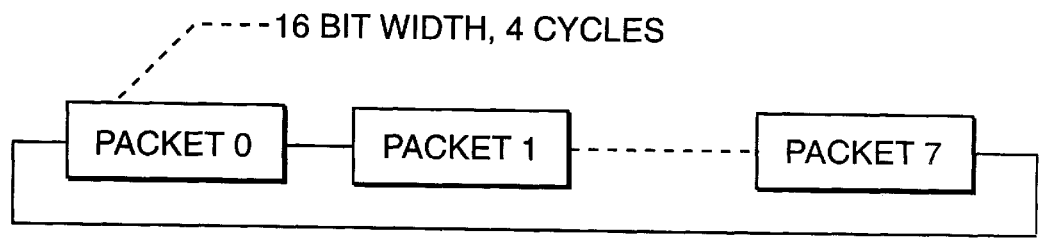
FIG. 3 is a diagram for illustrating the ring with a transfer bit width of 16 bits.

For each (one) cycle of (one) packet transfer, the latency is shortened by three cycles. Because of the assumption that a conventional ring system employs long distance transmission, the bit width ranges from 1 bit to 16 bits, a restriction imposed by the distance. As shown in FIG. 3, the transfer bit width is assumed to be 16 bits and one packet is assumed to be 64 bits. This means that for each packet, four cycles are needed. When short distances are in the transmission according to the ring of the present invention, the system is designed to transfer one packet for each cycle.

Figure 4:
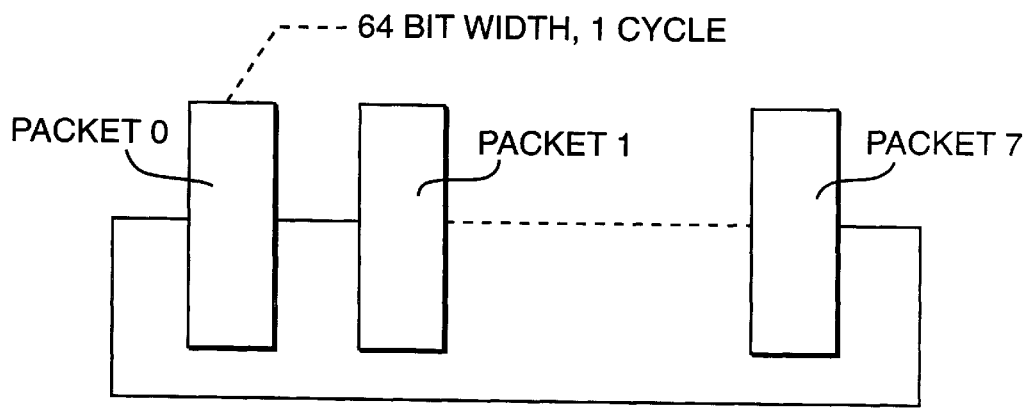
FIG. 4 is a diagram for illustrating the ring with a transfer bit width of 64 bits.

As shown in FIG. 4, assuming one packet to be 64 bits, it means one cycle for the transfer bit width of 64 bits. To render the transfer system flexible, the system is extended to be capable of transfer a block packet and a packet in a plurality of cycles.

ADVANCE ACQUISITION OF TRANSMISSION RIGHT

Figure 5:
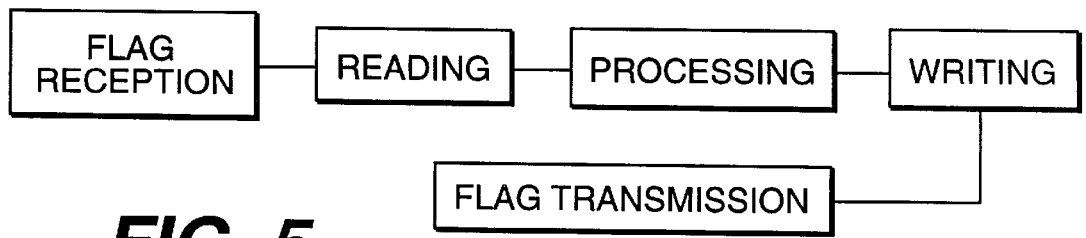
FIG. 5 is a diagram for illustrating flag processing of the ring based on a conventional technique.
Figure 6:
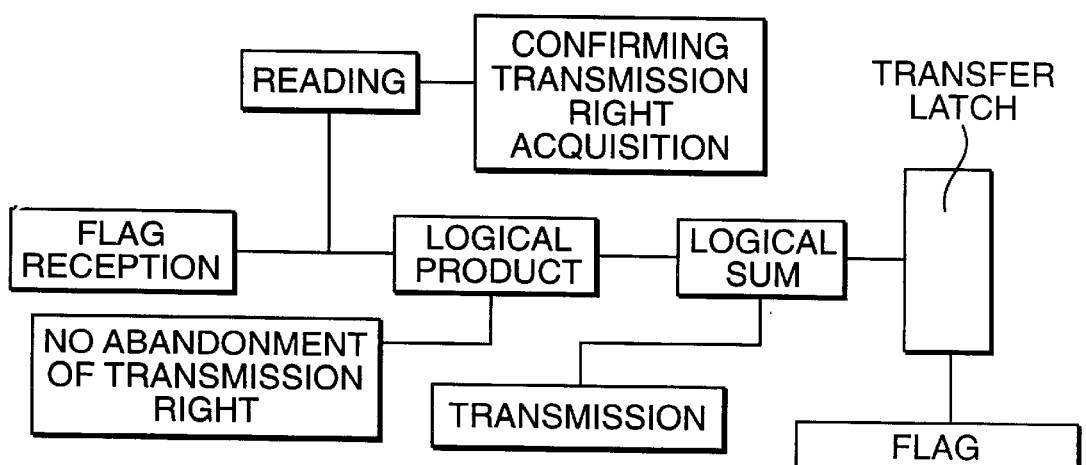
FIG. 6 is a diagram for illustrating flag processing of the ring based on the present invention.

The latency is shortened one cycle by the advance acquisition of the transmission right, according to the invention. As shown in FIG. 5, a conventional ring requires that the transmission module read a flag, acquire a transmission right based on the content of the flag, set the flag, and transmit the flag to the next module. Each module connected to the ring of the present invention, sets the flag if the flag is to be transmitted, and then transmits the flag to the next module through the transmission, logic sum, and transfer latch shown in FIG. 6. The advance acquisition of transmission right is confirmed by no setting of the received flag.

Figure 7:
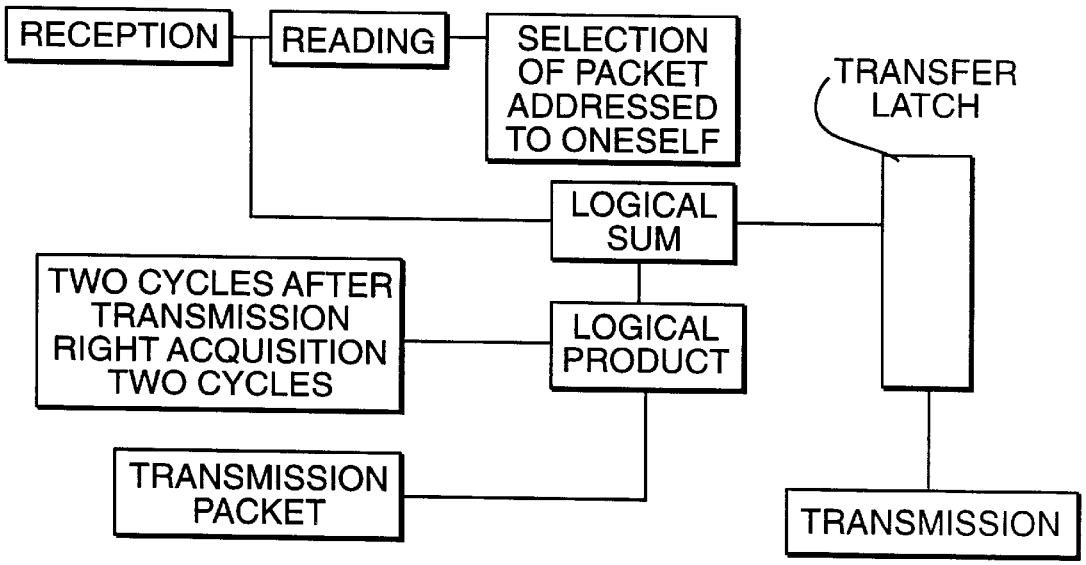
FIG. 7 is a diagram for illustrating transmission and reception of the ring based on the present invention.

The transmitting module suppresses transfer of the received flag by logic product of transmission right abandonment at the time of one circulation of the ring. Thus, the transmitting module resets the flag originated from the transmitting module itself. As shown in FIG. 7, respective modules receive all the information, read the header in a packet, select and receive only the packet(s) addressed to the module, and transmit all the information in parallel. By applying this system, the processing including reading, processing, and writing is separated from the transfer of packets, and both the processing and the transfer are operated in parallel. A packet is transmitted after two cycles from the advance acquisition of transmission right. Because a packet may be merely transmitted to the next module, the latency is improved.

THE SAME CLOCK DISTRIBUTION TRANSMISSION

Figure 8:
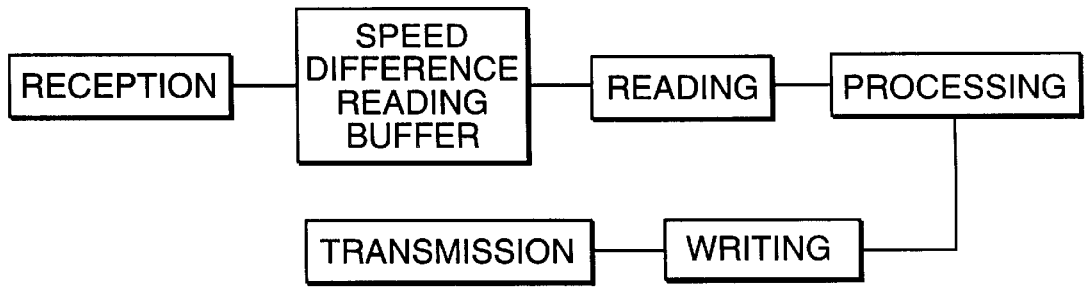
FIG. 8 is a diagram for illustrating a buffer of the ring based on a conventional technique.

The latency is shortened by 3 to 4 cycles by using the same clock distribution transmission. Because of the assumption in the prior art of long distance transmission between respective modules, a conventional ring uses an independent clock, therefore the buffer for absorbing the speed difference of the clocks is necessary as shown in FIG. 8. In the present invention, the buffer for absorbing the speed difference is eliminated by distribution and transmission of a clock by a control ring.

PROCESSING IN RECEPTION PHASE

Figure 9:
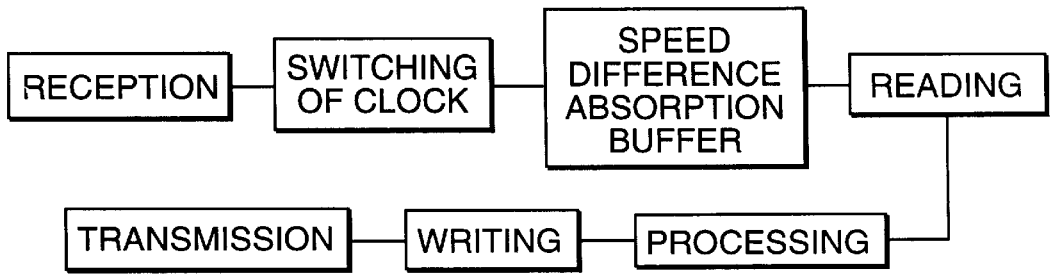
FIG. 9 is a diagram for illustrating clock change of the ring based on a conventional technique.
Figure 10:
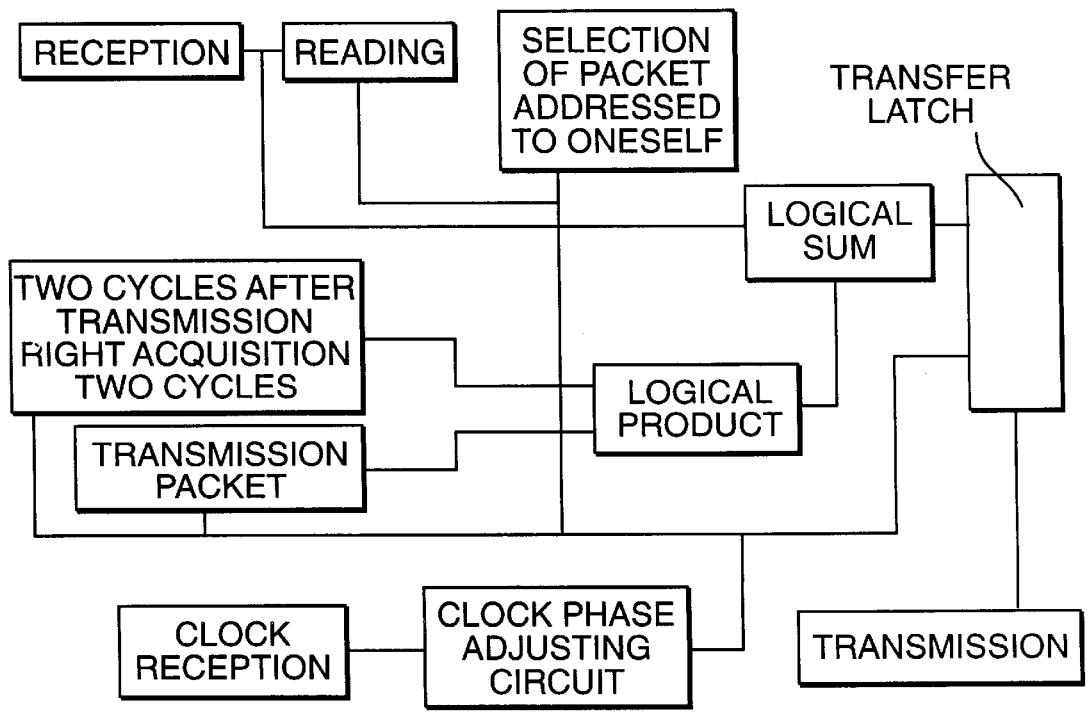
FIG. 10 is a diagram for illustrating the transmission and reception clock of the ring based on the present invention.

The latency is shortened by a half-cycle by processing in the reception phase. Because, in the prior art, the clock phase is independent for respective modules, a conventional ring needs the delay for clock change when used in a module as shown in FIG. 9 in addition to the speed difference absorbing buffer. In the present invention, as shown in FIG. 10, the timing of the reception is matched by the clock phase adjust circuit and this is used for processing and transmission, therefore the clock change is unnecessary.

Figure 11:
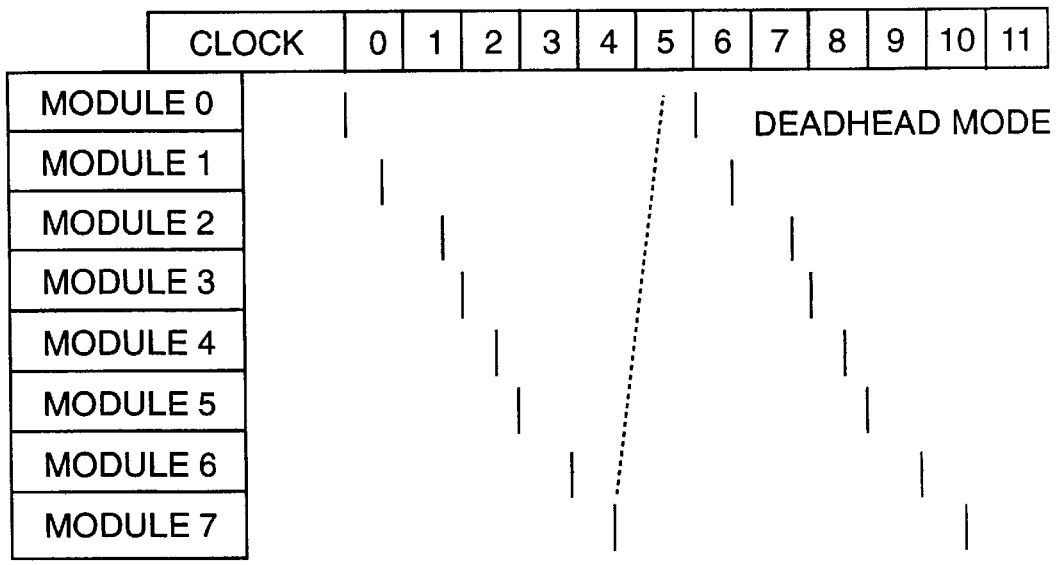
FIG. 11 is a diagram for illustrating transition of the phase of the clock in the present invention.

By providing the structure described herein above, the operating frequency is improved because the operating frequency becomes insensitive to the skew of a clock. The clock phase is advanced for each passage of a module depending on the delay. The advance should be an integral multiple of the clock at any module when retransmission after one circulation of the ring. As shown in FIG. 11, the deadhead mode is provided to at least one module of the ring, the module transmits synchronously with the clock to adjust the number of cycles for one circulation of the ring to an integral multiple (herein 6 cycles). In the present invention, less fluctuation of the transmission system is assumed, therefore a method in which the system is readjusted only when an error happens to occur is adopted instead of a method in which a test packet is transmitted during operation to adjust the phase dynamically.

SWITCHING OF CLOCK FOR PHASE CHANGE

Figure 12:
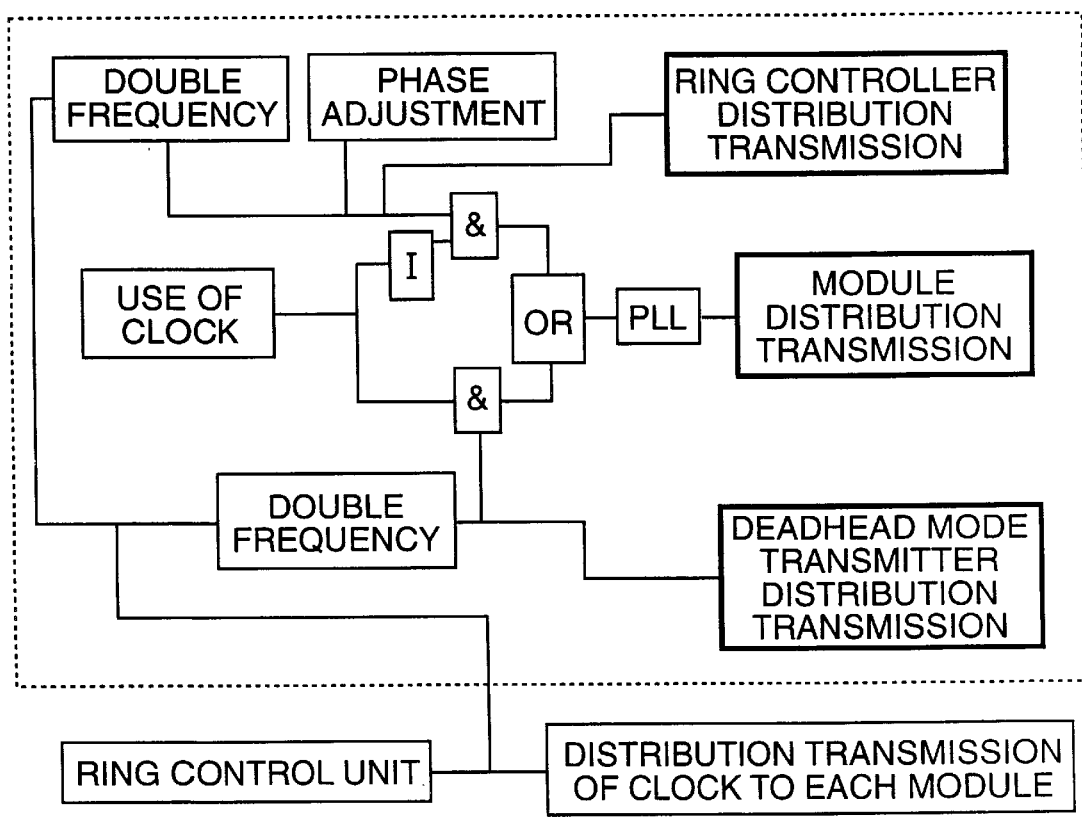
FIG. 12 is a diagram for illustrating the clock system of the present invention.

A continuous clock is supplied by switching of clock for phase change. To avoid influence due to wave form changes of the clock when a module is inserted or pulled out and initialized, and to continue the operation continuously, the operation of a module is ensured by using a clock that is distribution-transmitted through PLL and used for the control of modules other than that in relation to the ring control. The clock system of the present invention is shown in FIG. 12. Each module comprises ring control portion, module control portion and deadhead mode control portion as shown in FIG. 12. The reception phase is adjusted when the module is inserted or pulled out and initialized, and only the clock for the ring control portion is changed. The module control portion uses the clock that is distribution-transmitted through PLL. When the clock for the ring control portion is determined, the clock for the module control portion is adjusted to the clock for the ring control portion to reduce an increase of latency and complexity of the control accompanied with a clock conversion. Using the clock that is distribution-transmitted through PLL prevents malfunctions of the module control portion at the time the phase of the clock is switched, because the phase of the clock is moderately changed owing to PLL. Thus, the continuous clock is supplied.

SYSTEM FOR RELAYING WITHOUT LATCH

Figure 13:
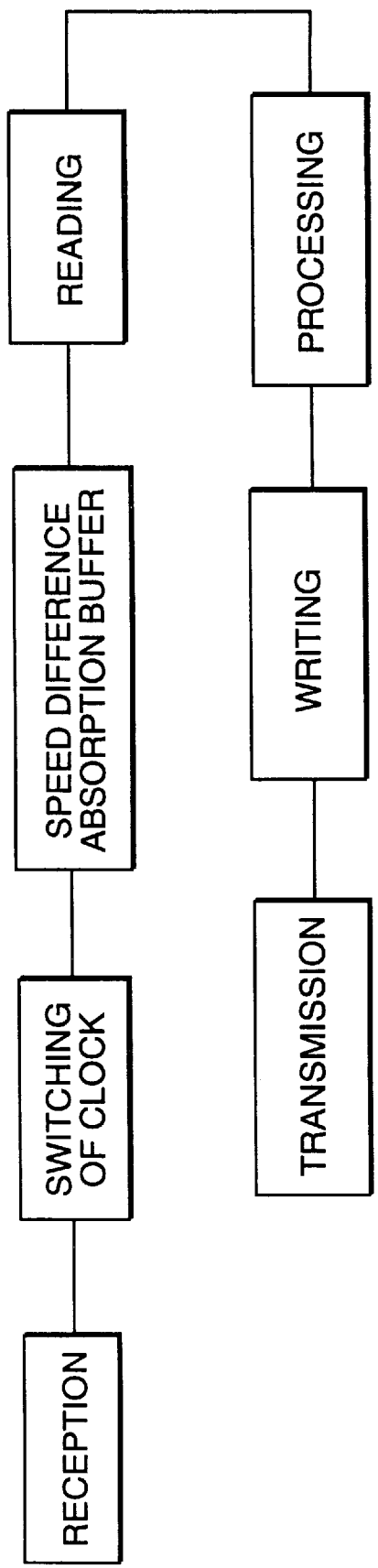
FIG. 13 is a diagram for illustrating transfer in the ring based on a conventional technique.
Figure 14:
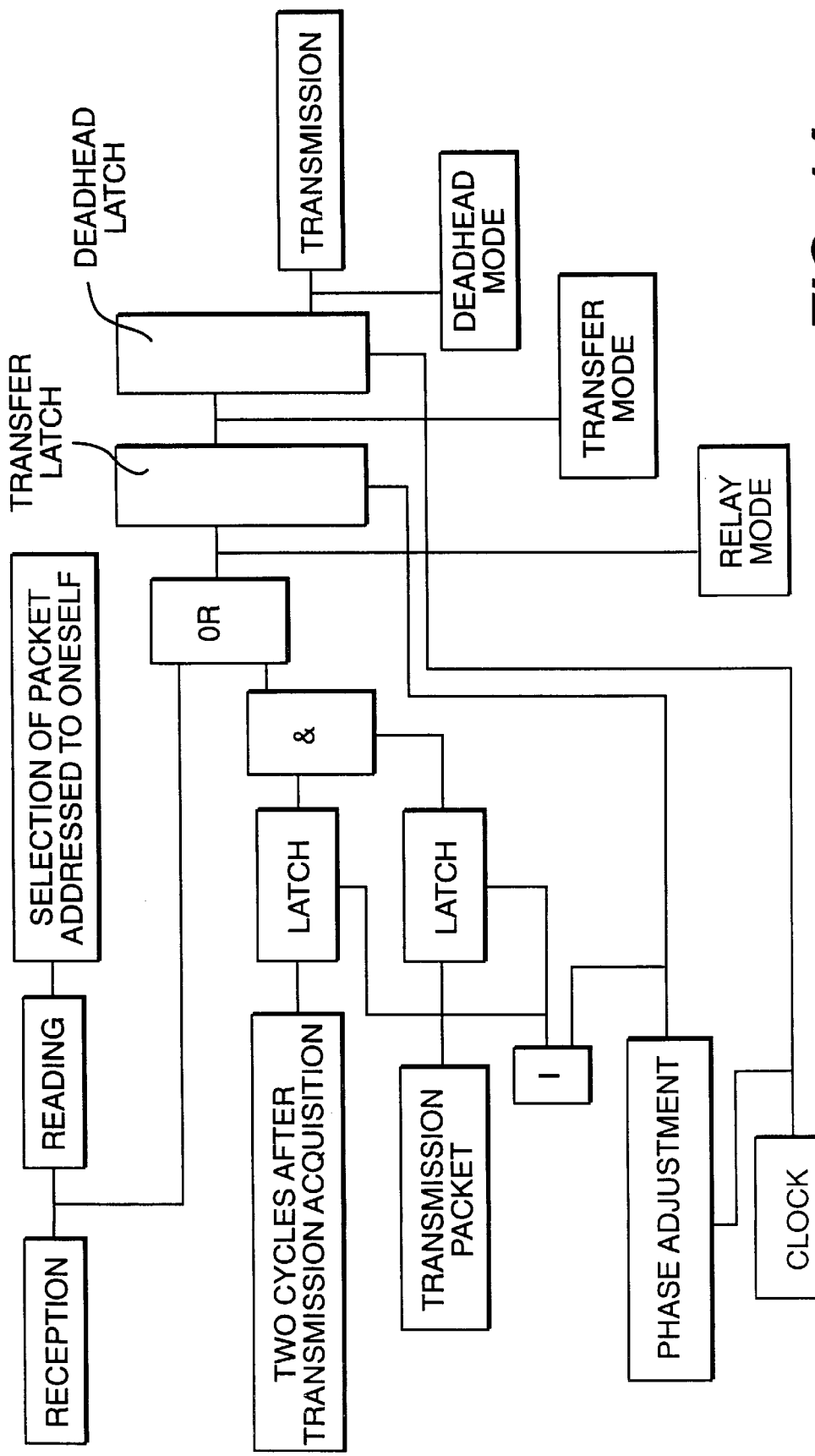
FIG. 14 is a diagram for illustrating transfer in the ring based on the present invention.

The latency is shortened another half cycle by relaying without latching. Conventionally, a ring transmits a received packet through a latch as shown in FIG. 13. The ring of the present invention also transmits a received packet through a transfer latch for wave form shaping. In the present invention, as shown in FIG. 14 however, when the wave form shaping is unnecessary, the packet is relayed without passing it through the transfer latch. The latch is operated at the timing of a half of the rising of the reception, therefore the latency is shortened by a half cycle.

Figure 15:
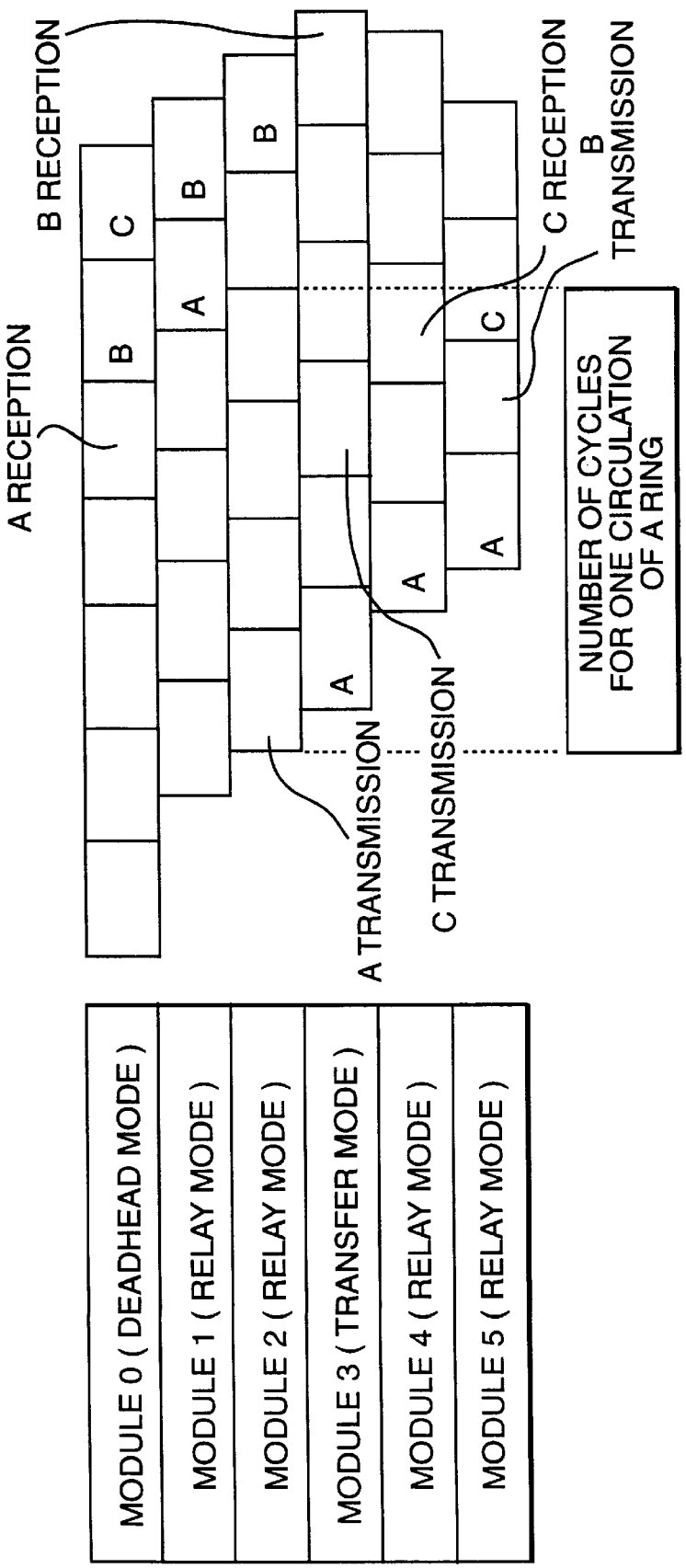
FIG. 15 is a diagram for illustrating an example of packet transfer for describing the operation mode of respective modules based on the present invention.

Because the phase of a transmission packet cannot be adjusted by the transfer latch, the packet is transmitted through a latch for matching the phase to the rising of the reception. The modules of the present invention are operated in various modes: a relay mode for relaying without a latch; a transfer mode for relaying through the transfer latch, wherein one transfer mode module is necessary per several modules for wave form shaping; and a deadhead mode involving the passage through a deadhead mode module for synchronizing to the clock, wherein at least one deadhead latch is necessary per ring. An example of transfer of packets A, B, and C is shown in FIG. 15.

SKEW CORRECTION FOR RESPECTIVE RECEPTION LINES

Figure 16:
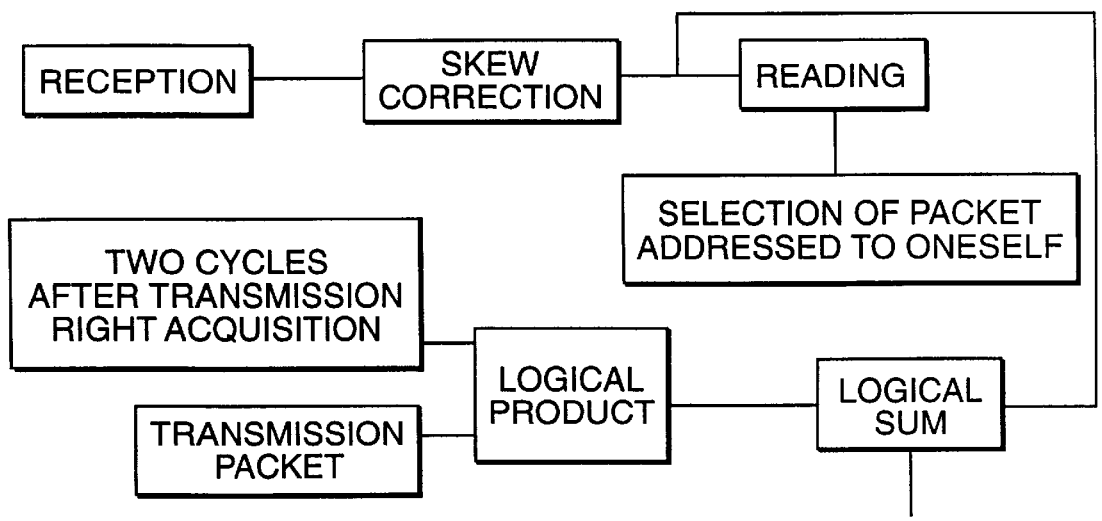
FIG. 16 is a diagram for illustrating skew correction in the present invention.

The operating frequency is improved by skew correction for respective reception lines. Because skew is corrected totally in the case of latching in the conventional ring, the skew quantity influences directly on the operating frequency. In the present invention, the skew is corrected for respective reception lines (signal lines) by a simple circuit as shown in FIG. 16, therefore the operating frequency is improved up to the level at which the operational frequency is determined by only the correction accuracy.

DELIVERY CONFIRMATION USING SIGNAL LINE

The throughput is improved by delivery confirmation using a signal line. The conventional ring depends on the delivery confirmation on a response packet. In the case of the ring of the present invention, the delivery confirmation and reporting for delivery confirmation are operated using a signal line instead of transmission of a response packet, therefore the throughput is improved. A conventional system in which the delivery is confirmed individually for each packet is applied, the throughput becomes one half. The transmission module acquires the transmission right of two signal lines, namely report and notice of delivery confirmation, when acquiring the transmission right. The reception module reports the delivery confirmation through the signal line after two cycles from reception of the packet. A response system in which no response is operated when received to operate delivery confirmation is applied for broadcast, therefore the delivery is confirmed with only one signal line.

COMBINATION OF A RING HAVING SHORT DATA WIDTH

The throughput is improved by combining a ring having a short data width. Because the conventional ring has been premised on long distance transfer, there is no provision for rings having short data width for combined respective uses. A ring commonly uses short packets. For a ring having a short data width that is applied to a processor bus, many short packets for purposes other than data transfer are required depending on the case. If the data transfer is used commonly, the throughput and transfer efficiency are lowered. In the case of the ring of the present invention, because the transmission right can be controlled with a single signal, rings having a packet with a short data width, such as: a block packet ring for controlling the transfer of a block packet; a select ring for parallel transferring of two packets in one cycle; and a directory ring for reading a cache directory can be easily provided in combination.

Figure 17:
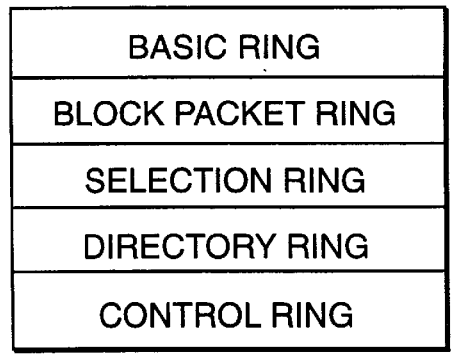
FIG. 17 is a diagram for illustrating the types of rings used in the present invention.

The ring for data transfer is called a basic ring. The types of ring are shown in FIG. 17. The basic ring and combined rings synchronize the information exchange and mutual operations by using a common clock. The control ring is commonly used to eliminate the complexity due to the ring combination.

BLOCK PACKET RING

The throughput is improved by using a block packet ring. The block packet ring is used for transferring packets continuously to simplify the control of respective modules and for improving the throughput. The conventional ring has some information at the header of a packet equivalent to a flag of the continuous transfer. In this system, a module should acquire a transmission right by reading, processing, and writing a received packet, and reporting it, therefore the latency cannot be shortened. In the case of the ring of the present invention, the basic ring can be extended to transfer a block packet.

Figure 18:
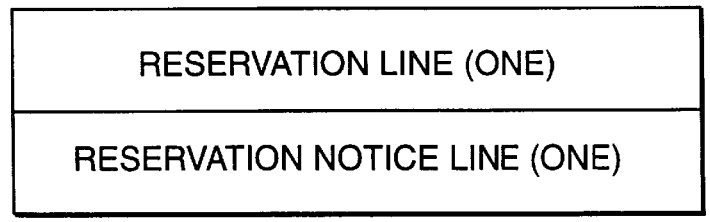
FIG. 18 is a diagram for illustrating the block packet ring of the present invention.

A basic ring transfers one packet per one cycle. First, one module is selected for continuous transferring of packets. The function to acquire a transmission right for selection is provided. Transfer of one packet per one cycle should be suppressed during continuous transferring of packets. For the suppression, the continuous transmission of packets is notified to respective modules. Respective modules suppress transmission requests for packets after two cycles from the reception of the reservation notice. Thus, the transmission module can require transmission of packets after two cycles from the notifying of continuous transmission. Therefore, as shown in FIG. 18, the continuous transfer of packets is realized by providing two signals comprising a reservation line which is a signal for acquisition of a transmission right of packets and a reservation notifying line.

SELECTION RING

Figure 19:
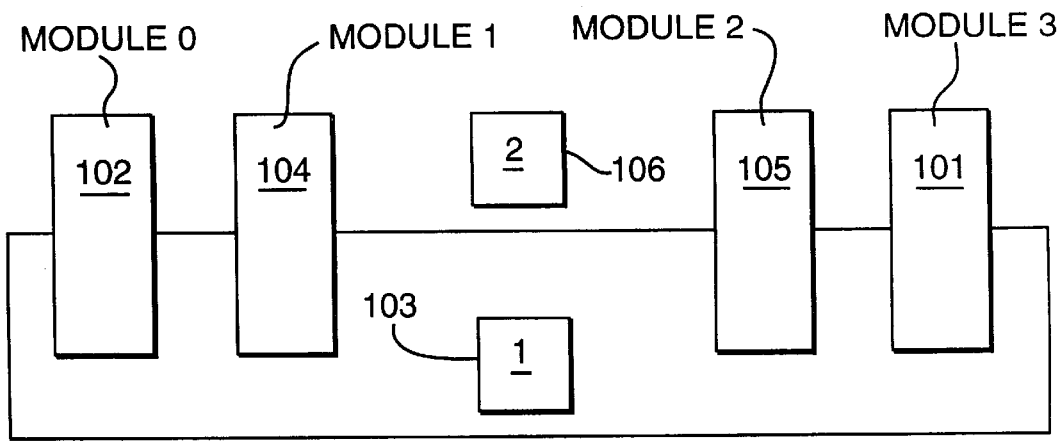
FIG. 19 is a diagram for illustrating an example of parallel transfer in the present invention.

The throughput is improved by the selection ring. The basic ring acquires a transmission right during one circulation of the ring. While a packet is transferred from a transmission module to a reception module, a packet is transferred simultaneously between two arbitrary modules from the reception module to the transmission module. As shown in FIG. 19, the transfer 106 from the module 1 (104) to the module 2 (105) and the transfer 103 between the module 3 (101) and the module 0 (102) are both possible simultaneously. In general, while a transfer from a transmitting module to a reception module is executed, another transfer among any two modules between the reception module and the transmitting module is possible simultaneously. The realization of this transfer system enables the throughput to be increased by double at most. An example of such realization for the ring cannot be found, however.

The centralized arbitration system in which requests are collected from respective modules in parallel and the requests are selected has been known as a conventional popular technique. This part falls in the topology which is the same as a switch. The central arbitration system requires a common section, and the requirement reduces the extensibility of the ring. If the central arbitration system is applied as it is to the ring, the number of packets from respective modules is equivalent to the same as the transmission request, and the greatest part of the throughput of the ring is consumed. Moreover, a large number of signal lines as large as several times the number of connected modules is required to perform simultaneous transmission requests from the respective modules.

The centralized arbitration system is realized in the ring by using the characteristics of the ring of the present invention. Because transfer of a block packet needs several cycles, if there is provided the capability of operating one transmission request per one cycle to all of the modules, the ring is balanced. Thereby, only one hardware mechanism provided to a whole system for acquisition of the transmission right for sending a transmission request is sufficient, therefore signal line for one module is sufficient. A module which acquire a transmission right sends a transmission request to the module of the address 0. The module of address 0 selects at most two transmission requests from respective modules at a time, and advises the transmission right. A transmission request is composed of a request address and destination address, a transmission right is notified by a request address. If signals are added, a request for a block packet and a report of busy can be operated. One pair of signal lines is added for parallel transfer in addition to two signal lines for delivery confirmation of the basic ring.

PARALLEL TRANSMISSION REQUEST SELECTION SYSTEM

Figure 20:
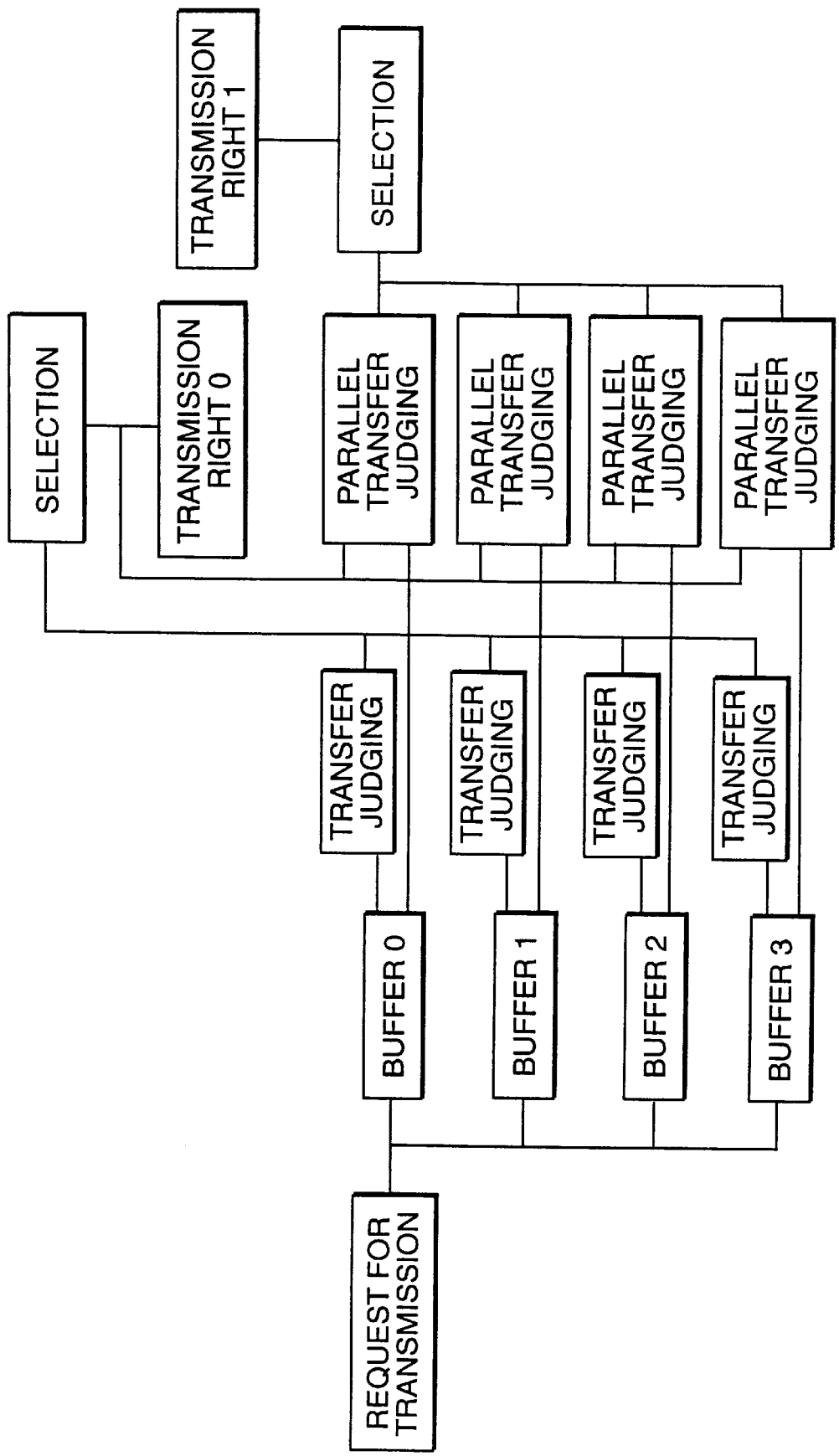
FIG. 20 is a diagram for illustrating the select logic system of the parallel transfer packet of the present invention.

In the case of a conventional centralized arbitration system, one transmission request is selected for one cycle. In the case of the ring of the present invention, various processing capabilities which are not involved in the conventional technique, such as selection of two transmission requests per one cycle and judgment of transferability from the requested address and destination address, are required. As shown in FIG. 20, the ring of the present invention applies the parallel transmission request selection system, namely a high speed logic system, in which a transmission request is buffered for each module, a block transferable for the first transmission right is judged in parallel and the first one is selected out of these blocks, and a block transferable for the second transmission right in parallel with the transfer of the selected block for the first transmission right is judged in parallel and the first one is selected out of these blocks.

DIRECTORY RING

A distributed system in which each module has a directory for containing only the line condition of the cache exclusively for its own module, and there is no centralized directory. In the distributed system, it is required that the condition of the cache is collected from the directory which belongs to respective modules, the condition of the directory which belongs to its own module is determined, and the condition is notified to the memory module. The conventional cache condition status control uses the centralized system in which the system receives reports of the cache condition from respective modules and distribution-transmits them at a time to the memory module. This part falls because of its topology which is the same as a switch. The common section is required for the centralized cache condition control, and the common section reduces the expandability of the ring. The time required to examine the condition of a cache is not the same, as to the report of the condition of a cache. It is necessary to confirm the reception from all of the modules. If the conventional system is applied as it is, the condition of a cache should be reported using packets from all of the modules. For the reporting, the large number of packets as large as several times that of the modules is required for the transmission request, thus a great part of the throughput of the ring is consumed.

According to the invention, a directory ring is provided that realizes the condition control of the cache by using the characteristics of the ring of the present invention. If the report can be requested from all of the modules from a module which is to request the report, it may be possible to reduce the number of packets. If the interval of the request for reporting is prescribed with respect to the timing when reports are collected, the report of the cache condition from all of the modules can be received using only at most one to two packets. If an area for reporting the condition for respective modules is provided in a packet, the large number of signal lines as large as several times that of the modules is required. If information lines are assigned for each type of cache condition and the condition is collected, the number of signal lines needed is small, but the information for specifying the module which reported the condition is lost.

Figure 21:
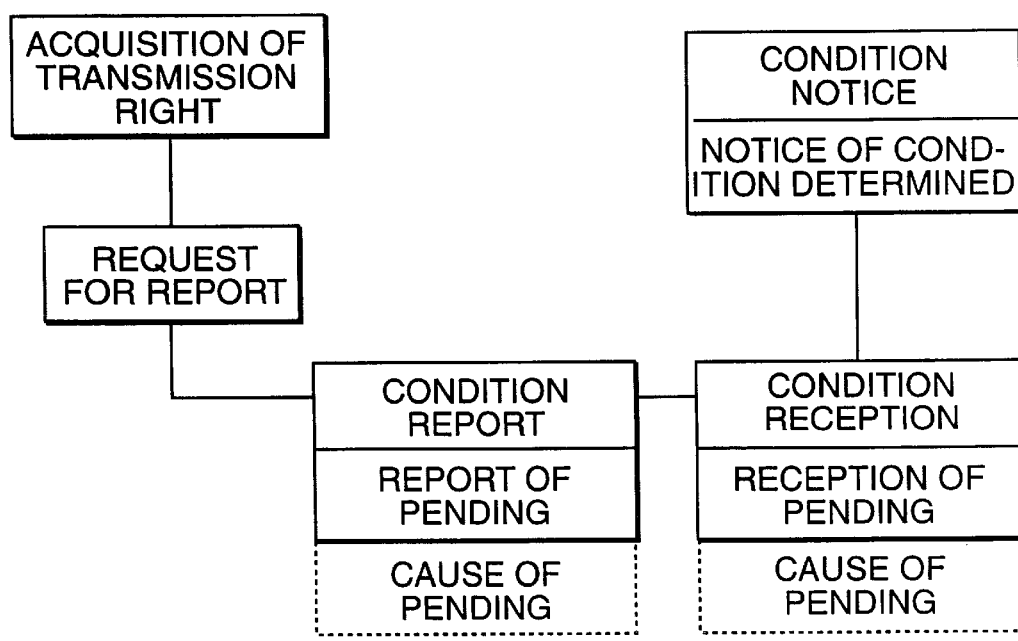
FIG. 21 is a diagram for illustrating the directory ring of the present invention.

The necessary function is that of the confirming that all of the modules have reported. For the confirmation, one signal line which indicates no reporting of the cache condition is provided. The signal line informs that the cache condition can not be reported. If the signal line is not significant, it indicates that all of the modules have reported. As described herein above, a ring with cache condition control is realized by providing with signal lines necessary for acquisition of a right for a transmission requesting a report of cache condition, request of a report of condition, report of cache condition, report of pending condition, notice of collected cache condition, and notice of determined condition as shown in FIG. 21. If the categorized causes of pending condition are reported in addition to the report of pending condition, the request module can select efficiently the timing of re-request.

HIERARCHICAL CONNECTION

The throughput is improved by providing a hierarchical connection technique. SCI described hereinbefore is known as a conventional technique which is a ring used for cache coherence with a local memory. In SCI, it takes a long time for the determination because an inquiry of the packet and the response are operated hierarchically on the premise that the cache coherence is not broadcast, and the hierarchical operation causes increased number of packets. SCI needs a large capacity because a complete directory for the local memory is required.

Figure 22:
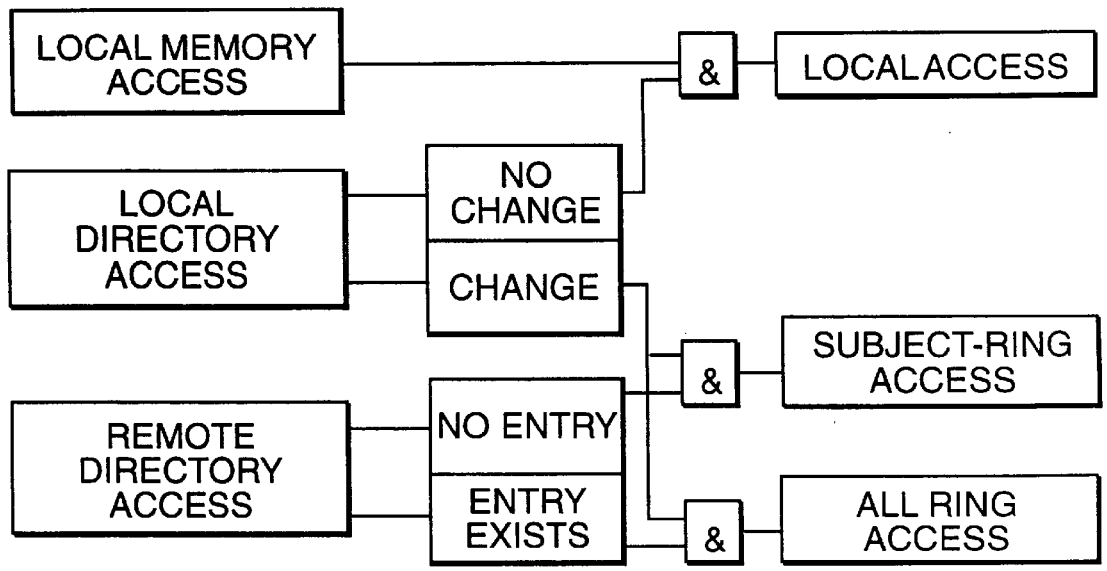
FIG. 22 is a diagram for illustrating access to the directory of the present invention.

The ring of the present invention provides means for access without degrading the performance for local access and has an access only to necessary modules by providing a simple directory for remote access. When there is no entry in the directory, the ring employs a broadcast system to use the high performance of the broadcast of the ring, and the latency is improved and simplified. If it is known whether the line of local memory which belongs to the ring is changed outside the ring, it can be decided whether an access is taken to the outside of the ring. If there is a copy of a line of a local memory which belongs to the ring outside of the ring, whether the coherence is operated is decided. If a directory (local directory) having two bits, indicating the change to another ring and the existence of a copy, is provided to all lines of the local memory which belongs to the ring, it is possible to prevent an access to the other ring without requiring much capacity of the local directory for the local access, and the performance is not degraded. If information for specifying that the ring has changed or that a copy has been added to the directory, the performance is improved because only necessary other rings have an access, but the directory needs a large capacity. If a directory (remote directory) for registering not all of the lines of the local memory but for registering only the latest access lines is provided, and vectors of changes and copies of conditions of each ring or each ring group are provided, the capacity can be reduced. Because the change access occurs often for exclusion control, the change access is maintained preferentially in the directory. If there is an entry in the remote directory, only addressed rings have access. If there in no entry in the remote directory, all rings have access. As shown in FIG. 22, in any case, a packet for the access is commonly used, the coherence is operated with one transfer of a packet, therefore the time is short. The latency and broadcast packet are reduced by shortening the time for cache coherence, thereby the throughput is improved to the same level as that of Symmetric Multi Processor. If the local memory is provided with a directory or the local memory is controlled directly, it is not necessary to inform the suppression of access to the local memory through the hierarchical connection mechanism. If this method can not be used, it is necessary to provide a directory ring which is a means to be used when directories are dispersed.

CONTAINING OF LOCAL MEMORY IN DIRECTORY

The processing efficiency is improved by containing the local memory in the directory. When the capacity of the local directory is large, the local directory is provided in the local memory, and the copy of the local memory is stored in the hierarchical connection mechanism. When the hierarchical connection mechanism is not capable of reception and the local memory receives an access for access to the directory, the response can not be received. To solve this dead lock condition, the concept of using a logic channel or subchannel, which are conventional, is partially introduced. The address of the ring is likened to a physical channel or channel, and the access inherent to the ring and the access to the directory are interpreted as the logic channels 0 and 1, respectively. Because it is required in this case to know which logic channel receives the packet, one response signal line is added for indicating the logic channel 0,1 when the reception not possible response is reported as a response signal equivalent to the status of the logic channel. Respective modules manage the flow control and the busy condition by the module address and logic channel 0,1. The number of response signals is increased for extensions of the logic channel and addition of status.

CONTROL RING

Figure 23:
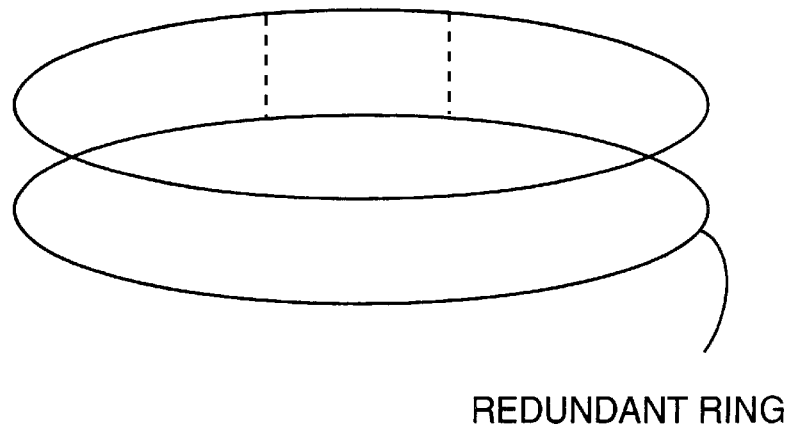
FIG. 23 is a diagram for illustrating the redundant ring of a conventional technique.

As for the conventional ring, a lot of logic is necessary because detection of module failure, specification of failure module, and separation of failure module from a ring are performed using the usual operation of the ring. For the specification and separation of a failure module, two rings which circulate in reverse directions as shown in FIG. 23 are required. Because the conventional ring is structured on the premise of long distance transmission in which failure of the transmission system is dominant, these two rings are effective as a redundant system for realizing loop back function. However, the redundant system results in doubled latency and doubled structural elements. In the case of a processor bus, the failure of the ring due to a failure of the modules is dominant and the failure of the ring due to a failure of the transmission system is rather exceptional. The system operation such as failure detection of the ring, specifying, and separation caused from failure of the modules connected to the ring is important for a processor bus.

In the ring of the present invention, the quantity of logic for failure detection, specifying, and separation is reduced. A ring control unit for independently performing the structural change, failure detection, specification, and separation is provided, and respective modules are connected by a control ring having two signal lines: a low speed control data line and a control clock; and a clock. By using the distribution-transmission system without the transfer for communication from the ring control unit to the modules, the influence on respective modules accompanied by structural change and failure of modules of the control ring is reduced.

Figure 24:
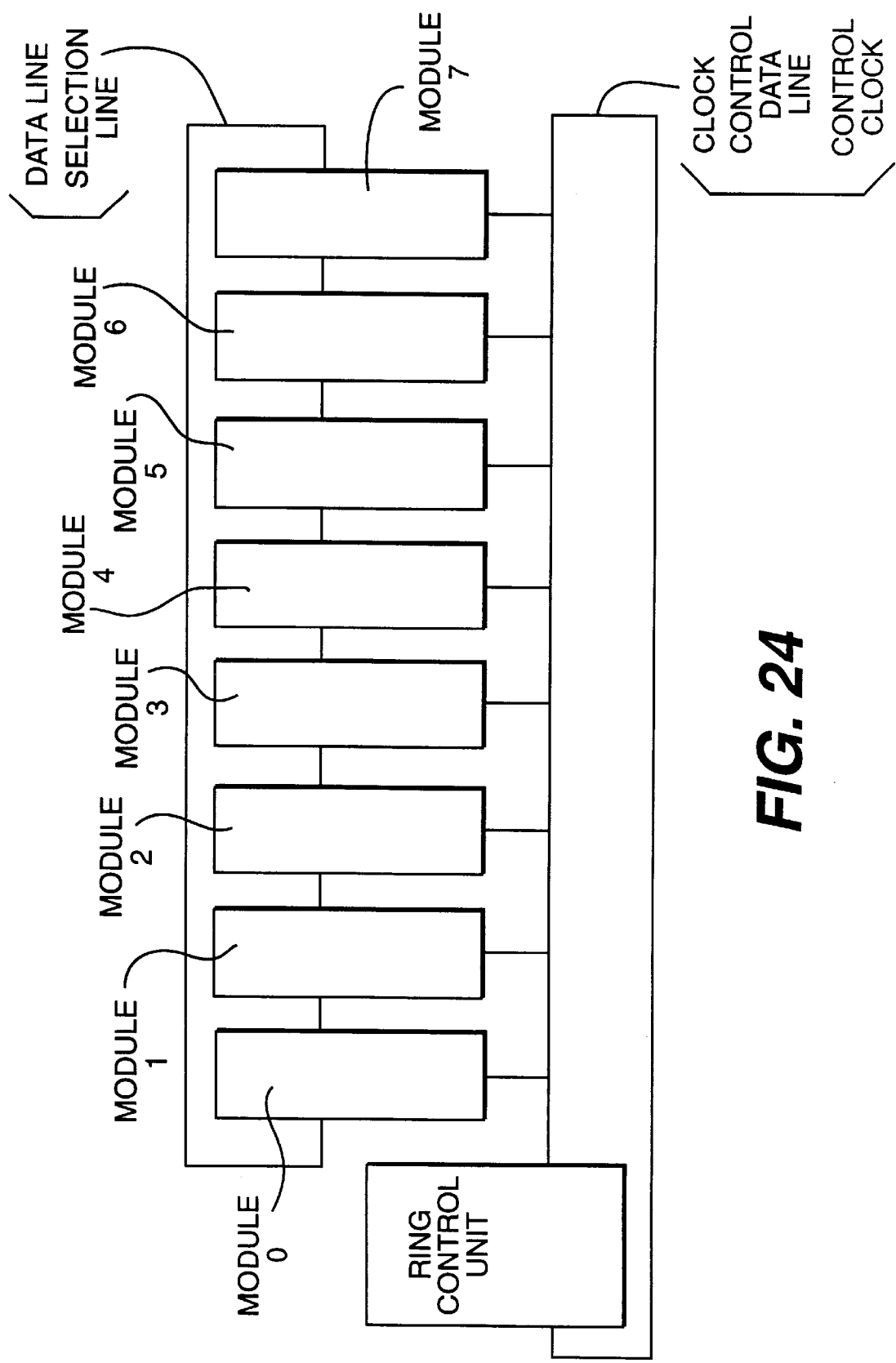
FIG. 24 is a diagram for illustrating the basic ring and control ring of the present invention.

As shown in FIG. 24, by providing a control ring having one ring for data transfer and three signal lines, a ring with high operability is structured at a lower cost than that for the case in which a redundant ring is provided. The control ring performs direct controlling, therefore the operation function of respective modules is unnecessary. A module can report a failure directly, therefore a small quantity of logic for detection of failure is enough. Since, for separation, only an indication is provided to the ring for relay to a failure module, the quantity of logic for separation is small. The phase adjustment of a clock and the quantity of delay of a reception line are initialized by the control ring, thereby the initializing function of respective modules is simplified. Certain failures are not separable, but such are limited to failures in the cable, connector, relay gate, driver, and receiver. The cutting and recovery of the ring resulted from insertion or pulling out of a module are operated through the control ring from the module, therefore the time for the cutting and restoration is reduced. In a module, a clock is supplied also during initialization and is switched continuously to a clock which is adjusted in the phase after initialization, thereby respective modules can be operated continuously.

CONVENIENCE OF STRUCTURAL CHANGE

As for a conventional ring, the connection change of cables is required for addition and removal of a connection device including relay members. For a processor ring, the insertion and removal of a module are equivalent to the addition and removal of a device, and it involves using a replacement short circuit switch. For that, two actions, one is the pulling out of a module and the other is insertion of a short circuit switch, are required. In the present invention, the convenience for structural change is improved without using a redundant ring. The short circuit switch which is inserted or removed in linking with insertion and removal of a module using the force for insertion and removal is devised and applied to the processor bus, thereby the time for structural change is shortened and convenient structural change is realized.

If a module is inserted or removed during operation without any preliminary notice, a series of operations such as transmission and response of a packet are interrupted and the system stops suddenly. In general, an operator shuts the system down prior to replacing of a module, and starts the system up after the replacing, therefore the stop time is long. To cope with the problem, a sensor which detects the insertion of a module in advance is provided, and a function that the sensor is connected to the next module and notifies it through the control ring is provided. A sensor which detects the pulling out of a module in advance is provided, and a function that the sensor notifies the control ring of the pull out is provided to separate in advance only the module which is to be pulled out. After that, the system is stopped automatically for the required shortest time, thus the stop time is shortened and the working operational time is maintained at a maximum.

LOGICAL ORDERING AND TWO-WAY RING

The ring of the present invention can assure the logical ordering for semaphore, which is a mechanism for concurrency control in a multi-processor system required to use a memory. The throughput is nearly doubled by using a two-way ring.

LATENCY

Figure 25:
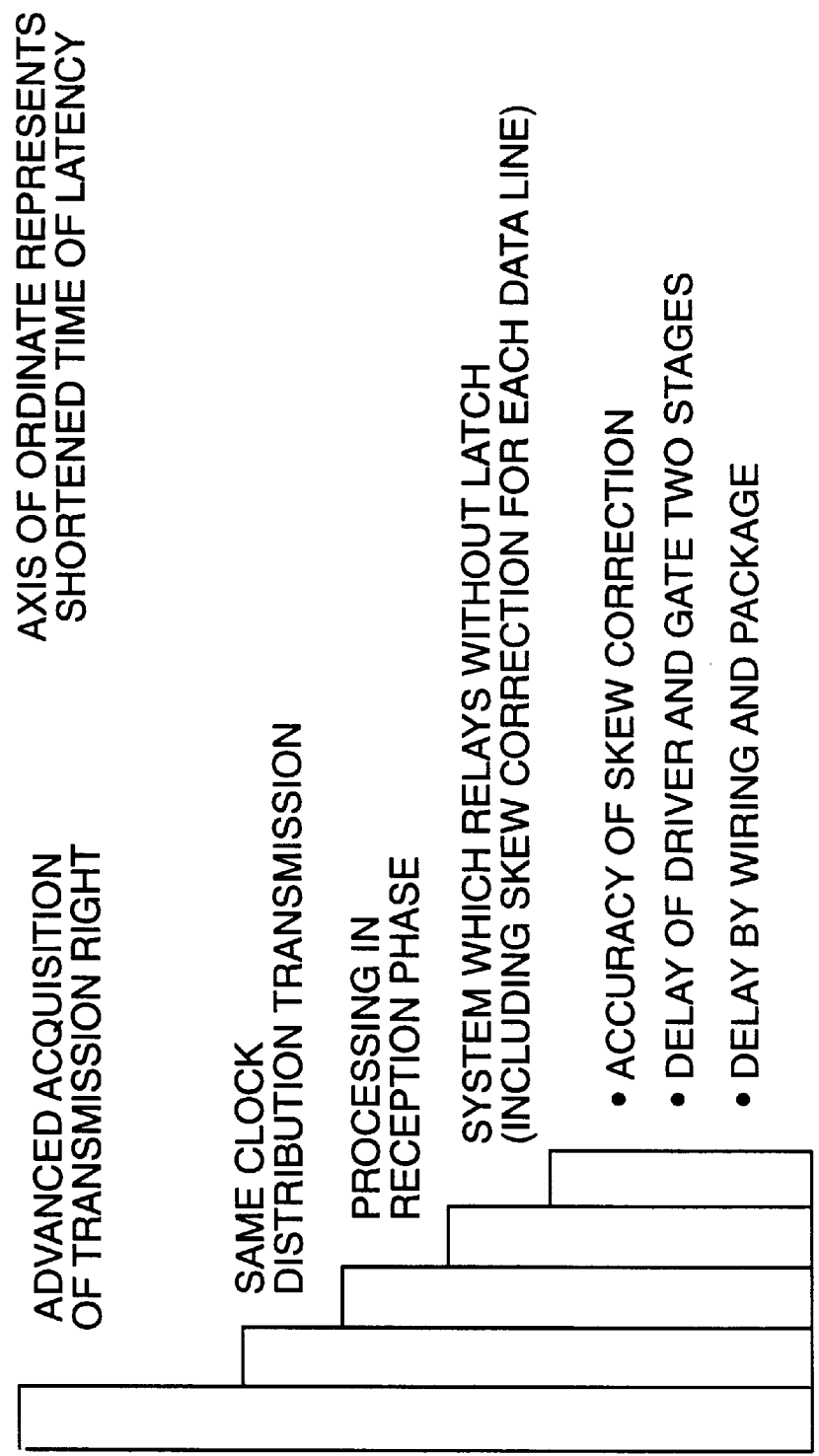
FIG. 25 is a diagram for illustrating the content of improvement of latency based on the present invention.

The details of the improvement of the latency according to the ring of the present invention is shown in FIG. 25.

OPERATING FREQUENCY

Figure 26:
FIG. 26 is a diagram for illustrating the content of improvement of operating frequency based on the present invention.

The improvement of the operating frequency according to the ring of the present invention is shown in FIG. 26.

EXTENSIBILITY

Figure 27:
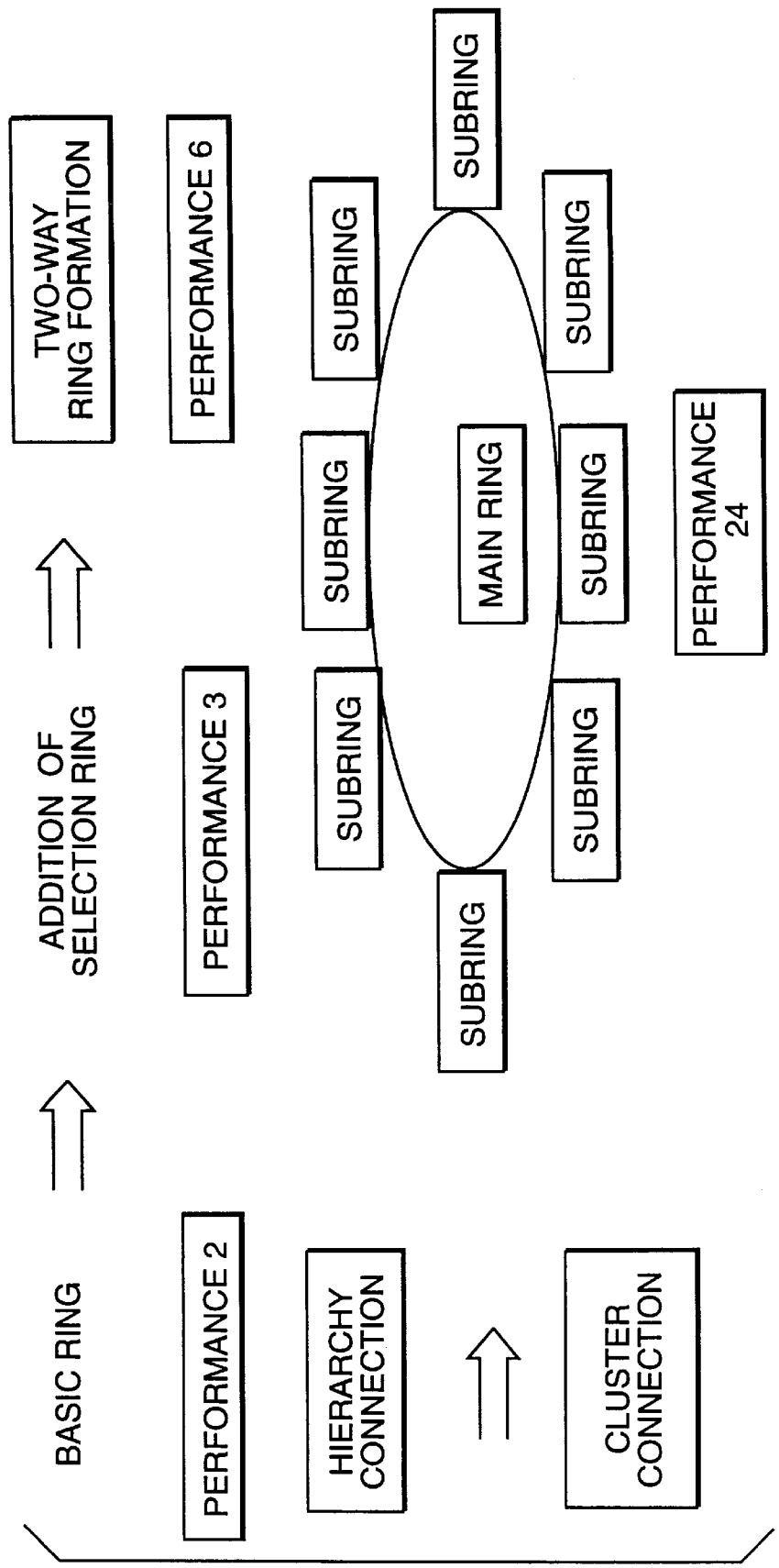
FIG. 27 is a diagram for illustrating the potential of extension based on the present invention.

The performance of the ring of the present invention is improved by addition of a transmission right ring and hierarchical connection under a condition of the same frequency and ring wiring. The improvements of performance and clustering are made possible by forming a two-way ring under the condition of the same frequency and ring wiring. An example of the performance improvement using the same LSI technique as the expandable bus to clustering is shown in FIG. 27.

PERFORMANCE OF A SINGLE RING

In the case that the skew correction is not applied for every output of a transmission latch, the limit of the operating frequency is determined by superposition of the skew of accuracy provided by a skew correction circuit and the skew of a transmission latch. If the skew correction is applied for every output of a transmission latch, the limit of the operating frequency is determined by only the accuracy of the skew correction circuit. The frequency characteristics of a driver is larger than that of this circuit in general, therefore it is considered to be about 400 Mhz based on the estimation from the operating frequency of a driver.

The latency and maximum wiring length are assumed to be 8 modules and 10 cm respectively. The latency of a module in the relay mode is 2.5 ns in total based on gate delay of two steps (0.3 ns), a delay of a driver (0.8 ns), the mounting delay (1 ns) including the wiring (10 cm), and the average delay of skew (0.4 ns). The latency of a module in transfer mode is 4 ns in total based on the center of reception window of a latch (average 0.4 cycle, 400 Mhz; 1 ns), and the delay of a latch (0.5 ns) in addition to the latency of a module in the relay mode.

If the module in the relay mode is 6 and the module in the transfer mode and deadhead mode is 1, the average latency for one circulation of the ring is at least 23.5 ns. By a cycle adjustment in the deadhead mode module, the number of cycles for one circulation of the ring is 10 cycles for the case of 400 Mhz. For 250 Mhz, the latency in the transfer mode and deadhead mode increases by 0.8 ns respectively, therefore the average latency for one circulation of the ring is at least 25.1 ns, and the number of cycles for one circulation of the ring is 7 cycles. The average latency between modules is equivalent to about a half circulation of the ring, therefore the average latency is about 12.5 ns for 400 Mhz and about 14 ns for 250 Mhz.

PERFORMANCE OF HIERARCHICAL CONNECTION

For the hierarchical connection, the following provides the latency: (1) transmission from a transmission module of a transmission subring to a transmission connection mechanism connecting the transmission subring to the main ring, (2) the processing of the transmission connection mechanism, (3) transmission in the main ring from the transmission connection mechanism to a reception connection mechanism connecting a reception subring to the main ring, (4) processing of the reception connection mechanism, and (5) transmission from the connection mechanism of the reception subring to a reception module.

(1), (3), and (5) are the same as the latency of a single ring, therefore the latency is triple that of a single ring, therefore the latency is 42 ns for 250 Mhz. The processing of the transmission connection mechanism in (2) includes reception and transmission processing. There is no access to the memory of a directory. For reception and transmission, it is 6 cycles, and the latency is 24 ns for 250 Mhz. A packet for broadcast has an access to the directory, therefor it is added. The processing of the reception connection mechanism in (4) involves parallel operation of access to the directory and transfer of a packet to the subring, therefore it is 6 cycles for reception and transmission, and the latency is 24 ns for 250 Mhz. As a result, the overall latency is 90 ns.

Next, embodiments of the present invention are described.

CONNECTION FORM OF BASIC RING

The interprocessor interface comprises a plurality of processor modules (PM), input-output modules (IO), memory modules (MM), and ring control units (RC), which components are connected therebetween. A total of 8 modules of PM, IO, and MM are connected to a ring.

The signals of each module (PM, IO, and MM) are a selection line (one), address lines (three), and data lines (72) for the basic ring; and clock (one), control clock (one), and control data line (one) as the control ring. Each module receives the selection line, address line, and data line included in the basic ring from the preceding module, and transfers it to the next module. The ring control unit generates a high speed clock for operating the basic ring, low speed control clock for controlling the basic ring, and control data synchronized with the control clock, and distributes them.

A module operates in the operation modes of transfer mode or deadhead mode. One module for a ring operates in the deadhead mode in which the selection line, address line, and data line are transferred synchronously with the clock. One circulation of the basic ring is prescribed to have a delay of an integral multiple of the clock and a value larger than 2 cycles. The connection of the basic ring between the respective modules is shown in FIG. 28.

Respective modules process the control data with the control clock of the control ring, and receive it when it is addressed to the module. Depending on the content, a module transmits a response of the module condition on the carrier of the control data. The ring control unit receives the information of respective modules by polling to respective modules. The clock distributes the frequency of ½ the operating frequency and is frequency-multiplied to the operating frequency in a module. The restriction on the operating frequency of the clock is mitigated. In the description hereinafter, it is assumed for simplification that the clock supplies the clock of the operating frequency. In FIG. 29, signals of the ring interface relating to the ring control unit are shown.

ADVANCE ACQUISITION OF TRANSMISSION RIGHT

Figure 30:
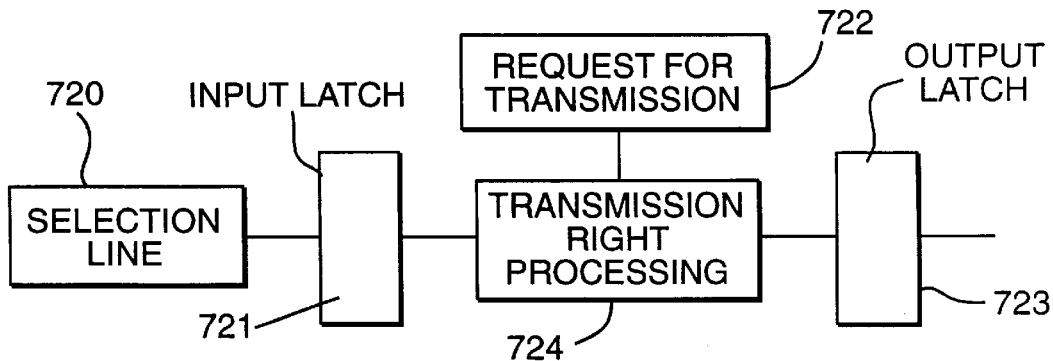
FIG. 30 is a diagram for illustrating a conventional transmission right acquisition system.

A packet comprises a header including the requester, request number, and type and body. The form and content of the packet are not mentioned herein because it is not pertinent to the subject of the ring. As to the transmission right, a system in which the selection line and address line are received and a transmission right is acquired depending on the content of the selection line and address line has been known. In FIG. 30, an example in which a conventional system is applied is shown. The selection line 720 is contained in the input latch 721, operates transmission right processing 724 for transmission request 722, and contains the result in the output latch 723. The latency of at least 1 cycle is generated. The system for shortening the latency is described as follows.

Figure 31:
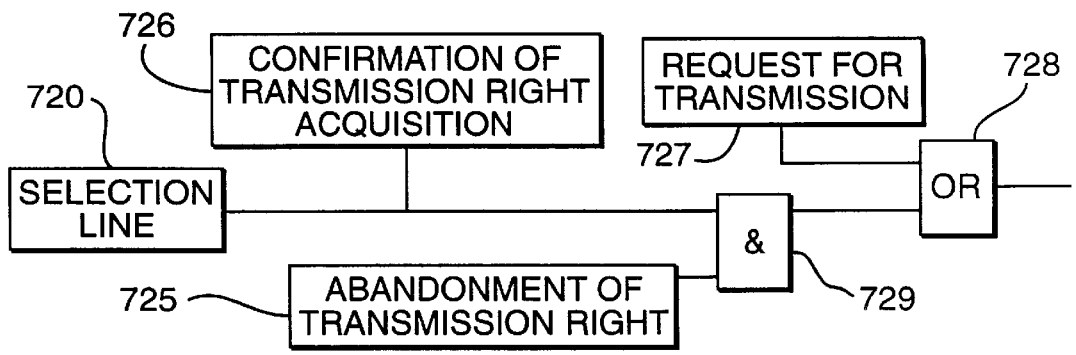
FIG. 31 is a diagram for illustrating transfer with a delay of gate of two steps according to the present invention.

The system which can transfer the selection line with delay of gate of two steps is shown in FIG. 31. In each module, a gate 728 calculates logic sum of the transmission request 727 and an output of a gate 729. The gate 729 calculates the logic product of the selection line 720 and an abandonment of a transmission right 725. By the logic product, the module resets the flag originated from the transmitting module itself at the time of one circulation of the ring. Based on the content of the selection line 720 and the transmission request 727, transmission right acquisition confirmation 726 is operated. When the selection line abandons (725) the own transmission right, the selection line is suppressed by the logic product 729.

Figure 32:
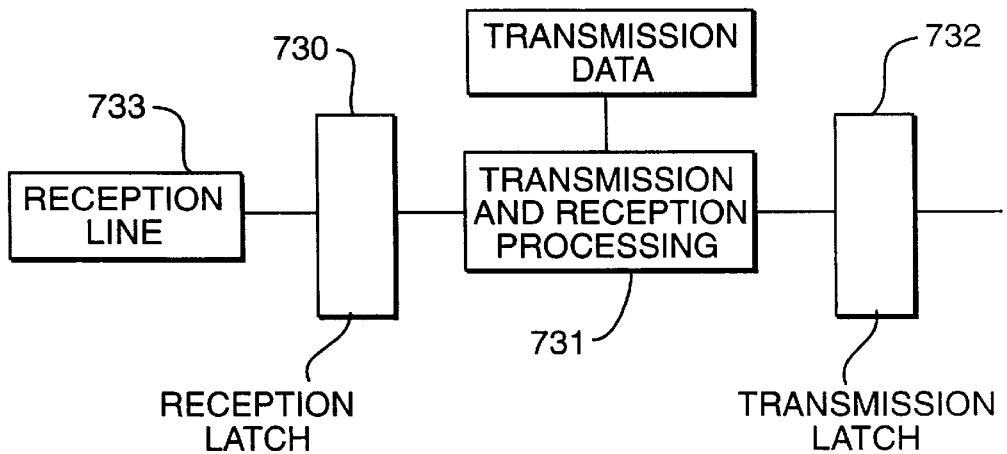
FIG. 32 is a diagram for illustrating a conventional reception system.

An example in which a conventional system is applied to the reception line is shown in FIG. 32. The reception line 733 is contained in the reception latch 730, operates transmission and reception processing 731, and contains a transmission latch. The latency of at least one cycle is generated.

Figure 33:
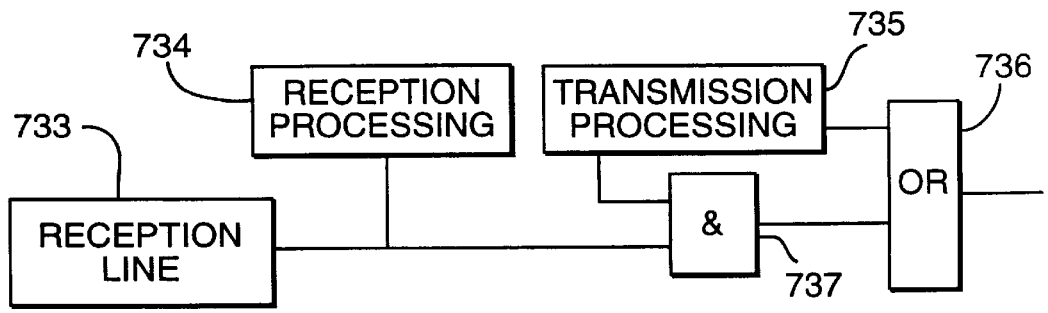
FIG. 33 is a diagram for illustrating the parallel transmission reception system based on the present invention.

A system which operates in parallel reception processing 734 and transmission processing 735 is shown in FIG. 33. The reception line 733 is subjected to reception processing (734), and in parallel subjected to transmission processing 735, and the reception line is suppressed by the logic product 737 when it is a transmission.

The address of a packet uses the address line and a packet uses the data line. As it becomes obvious from the description provided herein, the address line is separated for only the description, but actually the address line is included in the header of a packet, therefore the actual signal line is included in the data line. 8 data lines out of 72 data lines are used for an error correction symbol or parity depending on the content of a packet. Actual data is transferred through 64 date lines 64 (64 bits). The address and a packet are transferred with one cycle synchronously with the clock on the ring. The selection line indicates that there is a packet and address on the data line and address line after 2 cycles.

Figure 34:
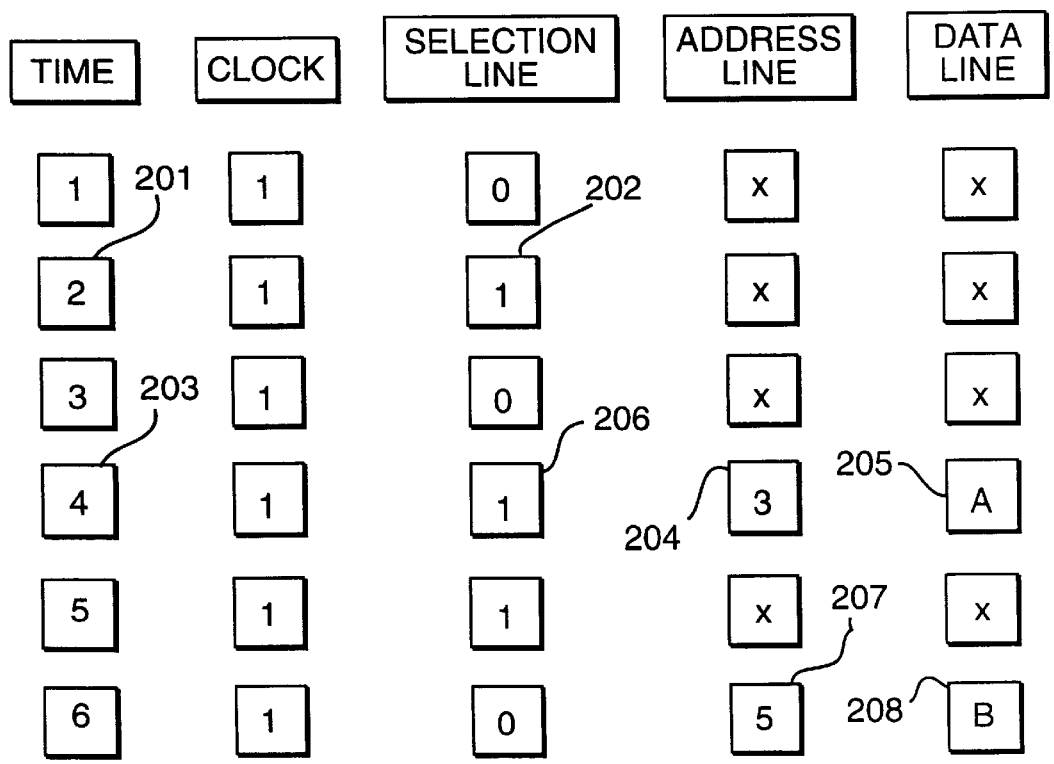
FIG. 34 is a diagram for illustrating the relationship between selection line, address line, and data line according to the present invention.

FIG. 34 shows a transmission in which the selection line becomes 1 (202) at the time 2 (201), and at the time 4 (203), after 2 cycles, the address 3 (204) is transmitted to the address line and the packet A (205) is transmitted to the data line, and at the time 4 (203) the selection line becomes 1 (206), and the address 5 (207) is transmitted to the address line and the packet B (208) to the data line.

RECEPTION

Figure 35:
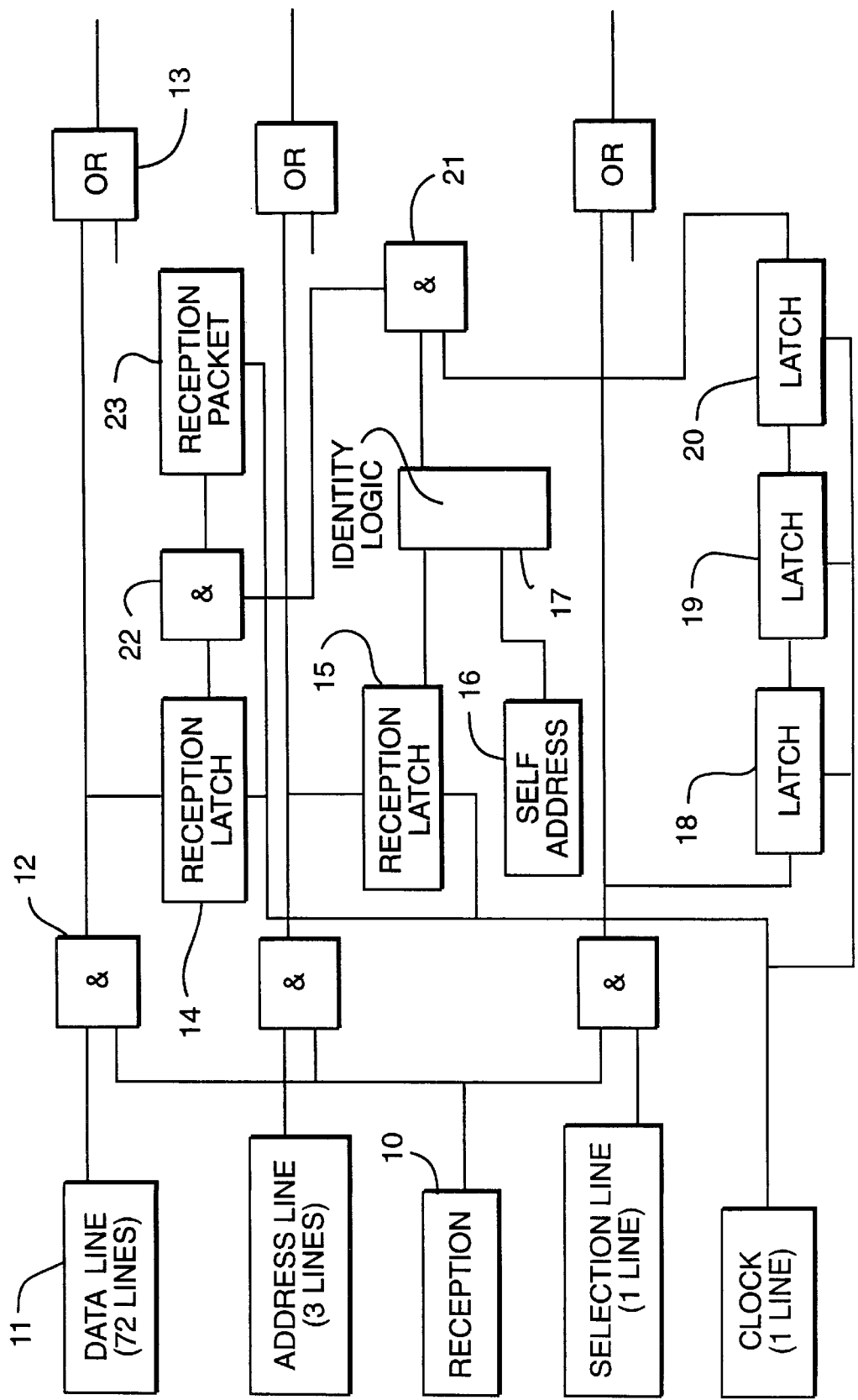
FIG. 35 is a diagram for illustrating the reception system of the present invention.

The reception system for transfer from a latch to a latch at the trailing edge is described using FIG. 35. The reception 10 represents the condition in which this module is not in a transmission condition but is in the reception condition. Data from the preceding module is transferred to this module through the data line 11. The reception 10 is 1, therefore the logical product 12 holds. The data line 11 transfers the data to the next module through the logical sum circuit 13. The content of the data line is always latched in the reception latch 14. As to the address line, data is latched in the reception latch 15 in the same manner, and compared with the self address 16 of this module in the identity circuit 17.

Figure 36:
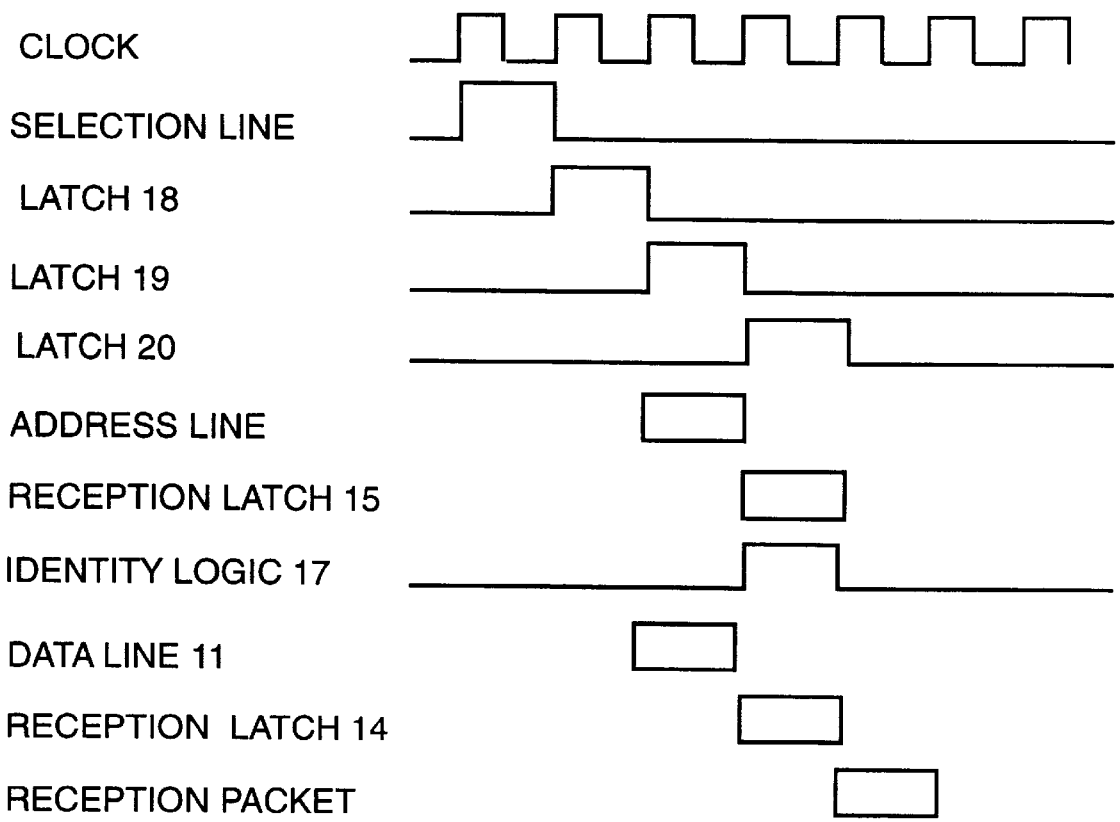
FIG. 36 is a diagram for illustrating the time chart of reception operation in the present invention.

The content of the selection line of 1 represents that there are an address and packet on the address line and data line, respectively, after 2 cycles. The selection line is latched by the latch 18, latch 19, and latch 20 with a delay of 1 cycle for every latching. If the content of the selection line is 1 and the identity logic 17 of the address is 1 to hold the logical product 21, the content of the selection line is received as a reception packet 23 through the logical product 22 because the content of the selection line of the latch 20 is set in advance to the reception latch 15 by 2 cycles. The reception operation is shown in a time chart of FIG. 36.

ACQUISITION OF TRANSMISSION RIGHT AND TRANSMISSION

If there is a packet to be transmitted, the selection line is turned to 1. If the received selection line is 0, a transmission right is acquired, and the mode is switched to the transmission mode after 2 cycles. If the received selection line is 1, it represents that no transmission right is acquired. The reception is continued while waiting for the acquiring of a transmission right, that is, waiting for the change of the selection line to 0. When the selection line becomes 0, an address and packet are loaded on the address line and data line after 2 cycles. When the transmitted packet circulates once, the selection line is turned to 0 to abandon the transmission right. If there is a transmission request until 2 cycles before the prescribed cycles for one circulation of the ring by the packet, the selection line is maintained at 1 continuously to acquire the transmission right.

Figure 37:
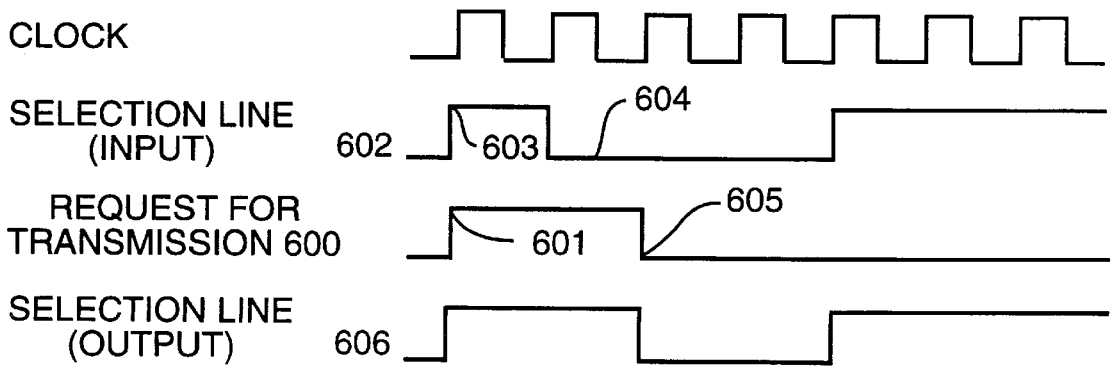
FIG. 37 is a diagram for illustrating the concept of transmission operation in the present invention.

The conceptual diagram of the transmission operation is shown in FIG. 37. If there is a transmission request 600, 1 (601) is output. The received selection line 602 is 1 (603), and the transmission request 600 is maintained at 1 (601) continuously. If the received selection line 602 is 0 (604), the transmission request is turned to 0 (605) to indicate the acquisition of a transmission right. The output (606) of the selection line outputs a logical sum of the received selection line 602 and transmission request 600.

Figure 38:
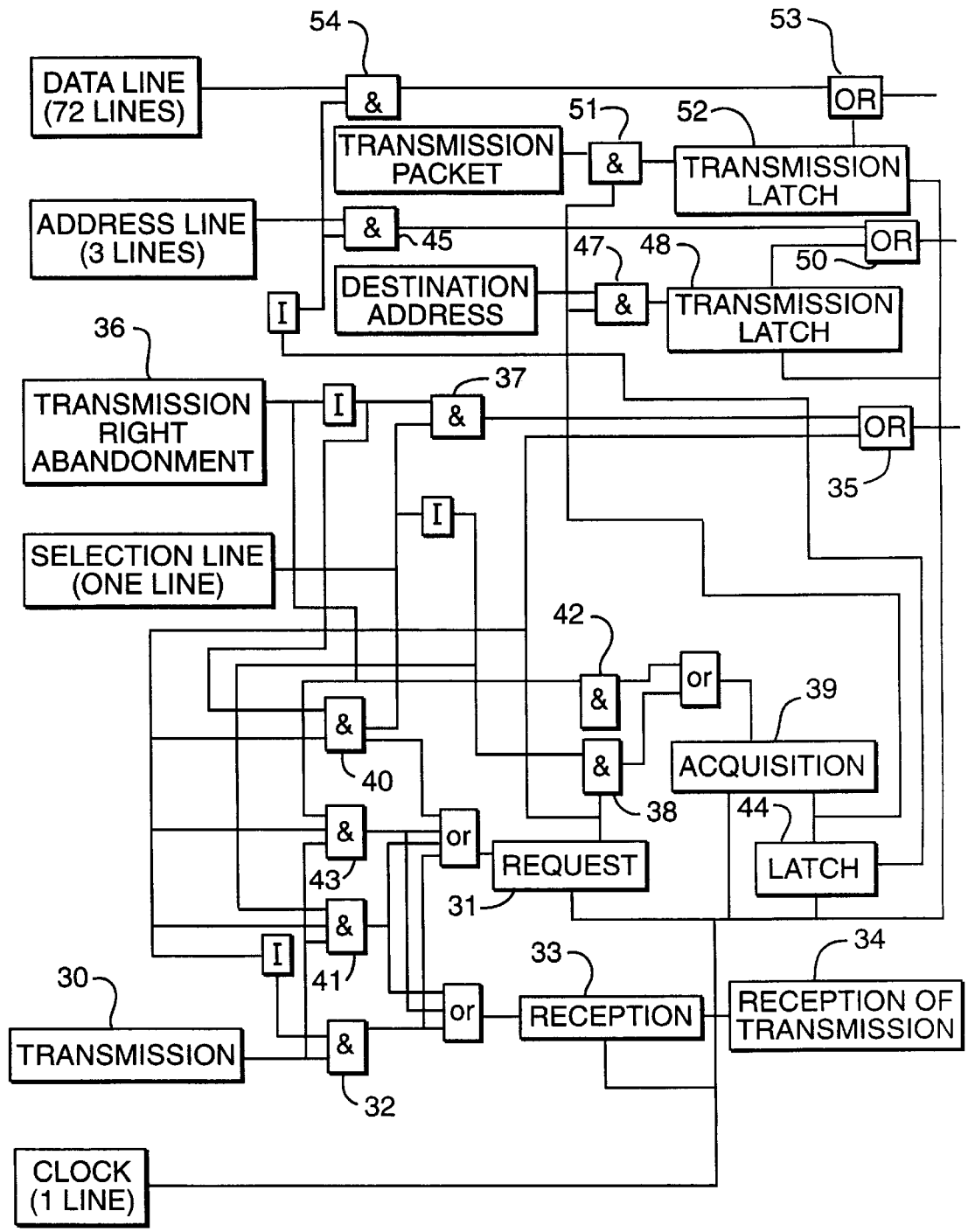
FIG. 38 is a diagram for illustrating transmission operation in the present invention.

A transmission operation is described using FIG. 38. The intention for a transmission of this module is represented by turning the transmission 30 to 1. If the request of the transmission 30 has been processed previously, the request (latch) 31 is 0. The reception (latch) 33 is turned to 1 in response to the holding of the logical product 32. The reception 33 informs the reception by use of the transmission reception (34) signal to the transmission request logic of the module. Next, a new transmission request is examined, and transmitted to the transmission 30 signal. For a transmission request every cycle, it is required to renew every one cycle using the result of the reception 33. The examination and the renewal are executed by a renewal circuit. The renewal circuit is not described herein because the renewal circuit does not involve the subject of the ring interface. The holding of the logical product 32 results in the turning of the same request 31 (latch) to 1. The content of the request 31 (latch) is transmitted immediately to the next module through the logical sum 35. If it is the cycle of one circulation of the ring after this module acquires a transmission right, the transmission right abandonment 36 is turned to 1 and the logical product 37 does not hold, and the transfer of the selection line is suppressed.

If it is the cycle that another module did not acquire a transmission right, the content of the selection line is 0, then only the content of the request 31 is transmitted. If it is the cycle that another module acquired a transmission right, the selection line is 1 and the logical product 37 holds, and then the transmission right and the transmission request of the module are superposed in the logical sum 35. If the received selection line is 0, it represents that another module does not acquire a transmission right, the logical product 38 holds, the acquisition 39 (latch) is turned to 1 to inform the acquisition of a transmission right. When the transmission right abandonment 36 is 1, even if the selection line is 1, the selection line operates the same processing as when it is 0 for processing of the transmission right. If the transmission right abandonment 36 is 1, it represents that the transmission packet of this module has circulated once, the logical product 42 holds, the acquisition 39 (latch) is turned to 1 to indicate the acquisition of a transmission right.

After 2 cycles from turning of the selection line to 0, the acquisition 39 (latch) is turned to 1, then the next cycle becomes a transmission mode, and a packet and destination address are transferred to the data line and address line. If the received selection line is 1, the logical product 38 does not hold, the acquisition 39 (latch) is 0 to indicate that a transmission right could not be acquired. When the selection line becomes 0 for waiting transmission right acquisition, the logical product 38 holds, and the acquisition 39 (latch) becomes 1. When the selection line is 1, the request 31 (latch) is 1, and the transmission right abandonment 36 is 0, the logical product 40 holds to continue the request. The situation becomes waiting for acquisition of a transmission right, and waits for the turning of the selection line to 0. If the selection line is 0, the request 31 (latch) is 1, and the transmission 30 is 1, the logical product 41 holds, and a transmission right is acquired continuously. If the transmission right abandonment 36 is 1, the request 31 (latch) is 1, and the transmission 30 is 1, the logical product 43 holds, and a transmission right is acquired continuously. When the logical product 41 and logical product 43 both hold, the reception 33 (latch) becomes 1 to indicate the reception of the transmission 30. If the acquisition 39 becomes 1, the logical product 47 holds, the destination address is latched to the transmission latch 48, and the destination address is transmitted to the next module through the logical sum 53. If the acquisition 39 becomes 1, the logical product 51 holds, a transmission packet is latched to the transmission latch 52, and the transmission packet is transmitted to the next module through the logical sum 53. When the latch 44 becomes 1, the logical product 54 suppresses the transmission so that the content of the address line is not transmitted to the next module. When the latch 44 becomes 1, the logical product 55 suppresses the transmission so that the content of the data line is not transmitted to the next module. The transmission logic comprises two step gate logic like the reception logic.

Figure 39:
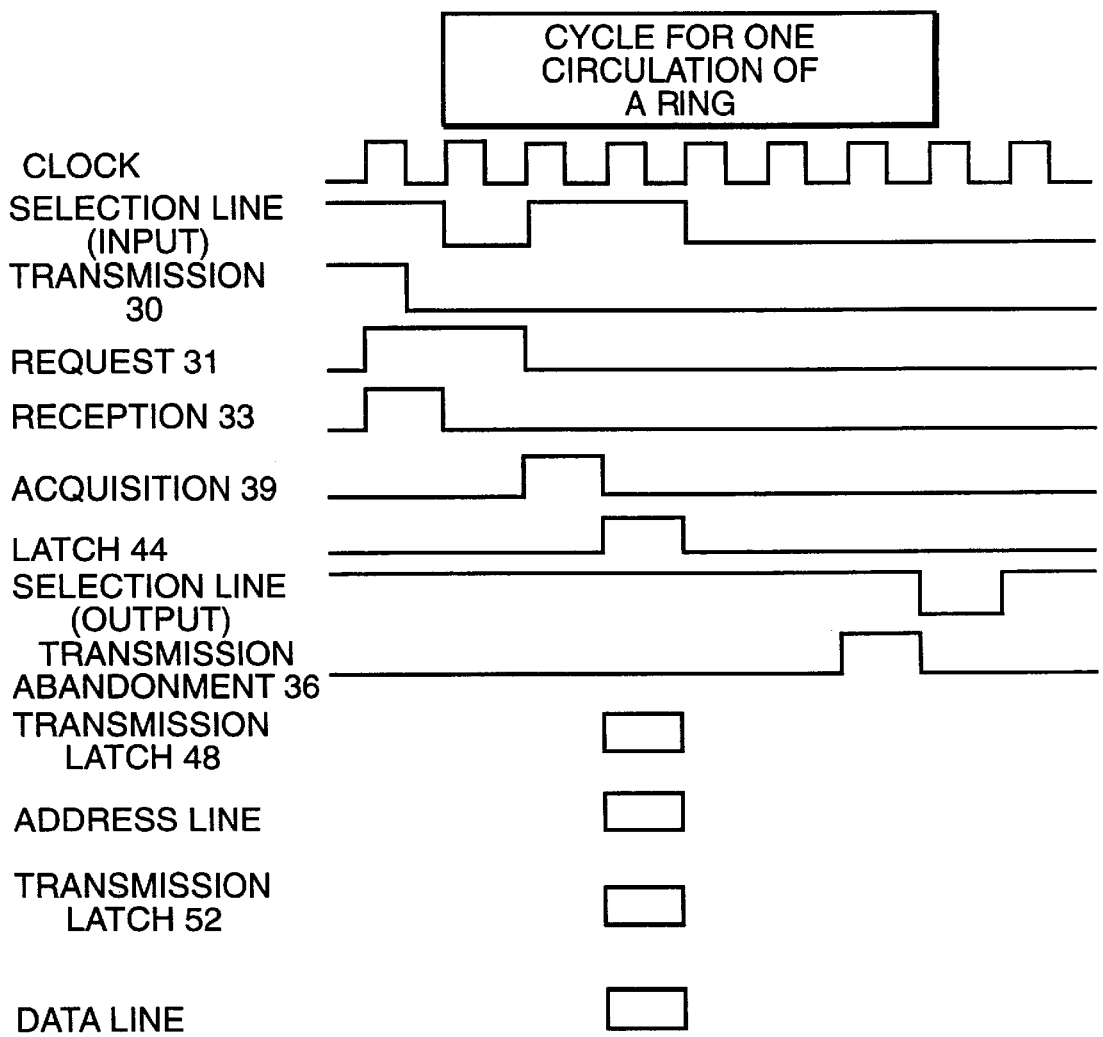
FIG. 39 is a diagram for illustrating an example of transmission operation in the present invention.

An example of transmission operation is shown in FIG. 39. Because the transmission 30 is 1 and the request is 0, the request 31 and reception 33 both become 1. Turning of the reception 33 to 1 results in renewal of the transmission 30 to 0 during one cycle. The selection line (input) remains 1 continuously, therefore the request 31 is 1. Because the transmission 30 is 0, the reception 33 becomes 0 in the next cycle. At the next cycle when the selection line (input) becomes 0, the acquisition 39 becomes 1. At the next cycle when the acquisition 39 becomes 1, the latch 44 becomes 1. The transmission latch 48 is renewed by the latch 44 and output to the address line. The transmission latch 52 is renewed by the latch 44 and output to the data line. After 6 cycles that is the cycle for one circulation of the ring, the transmission right abandonment 36 becomes 0. This module has no subsequent transmission request, therefore the selection line (output) becomes 0 at the next cycle.

SKEW CORRECTION

Figure 40:
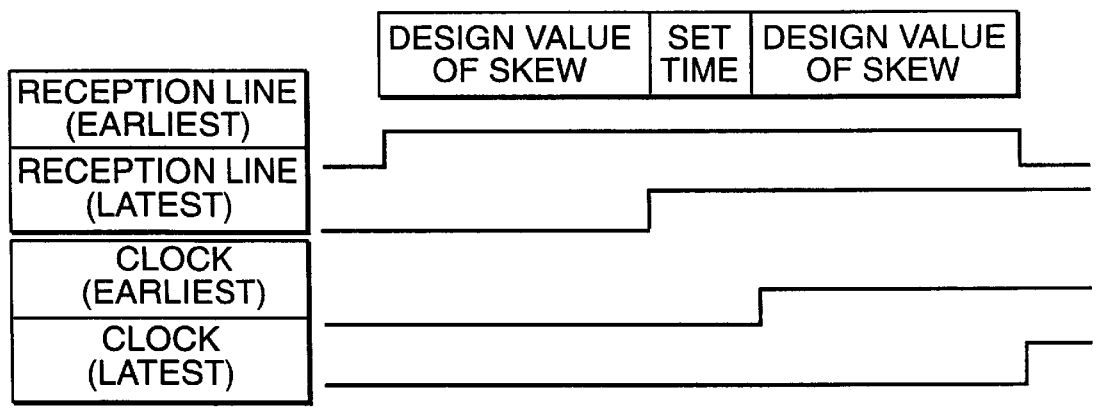
FIG. 40 is a diagram for illustrating an example without skew correction.

In the conventional system, it is necessary to receive a clock even if a clock is delayed by the time that is the sum of the design value of skew and the setup time to the reception line. The operating frequency is determined by adding the setup time to a value that is double the design value of the skew. This scheme is shown in FIG. 40.

Figure 41:
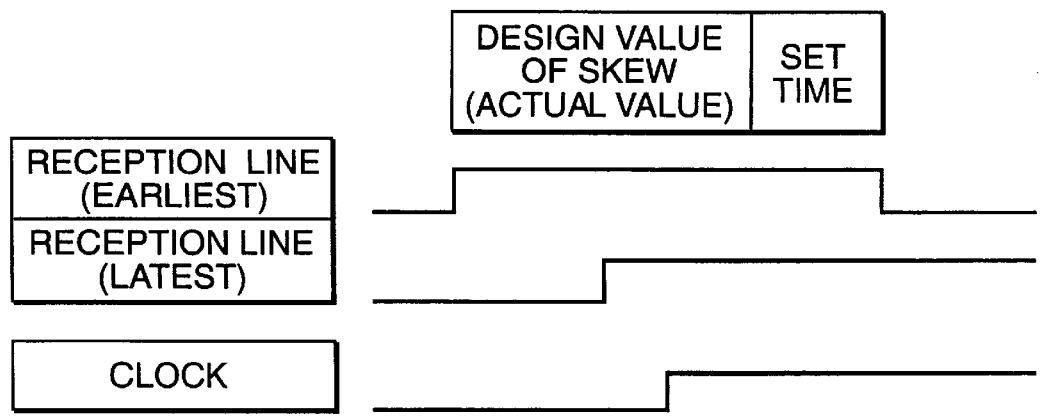
FIG. 41 is a diagram for illustrating an example of skew correction on clock of the ring of the present invention.
Figure 42:
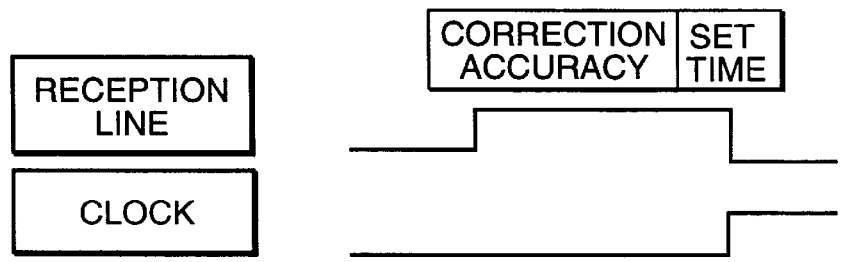
FIG. 42 is a diagram for illustrating an example of skew correction for each receiving line of the present invention.

A method for setting the phase of a clock matched to the reception line is shown in FIG. 41. The operating frequency is the sum of the design value of the skew and the set time. The latency is shortened to the sum of the actual value of the skew and the set time. A method in which the skew correction is carried out for every transmission line is shown in FIG. 42. The operating frequency is determined by the correction accuracy of skew.

PROCESSING AT RECEPTION PHASE

Figure 43:
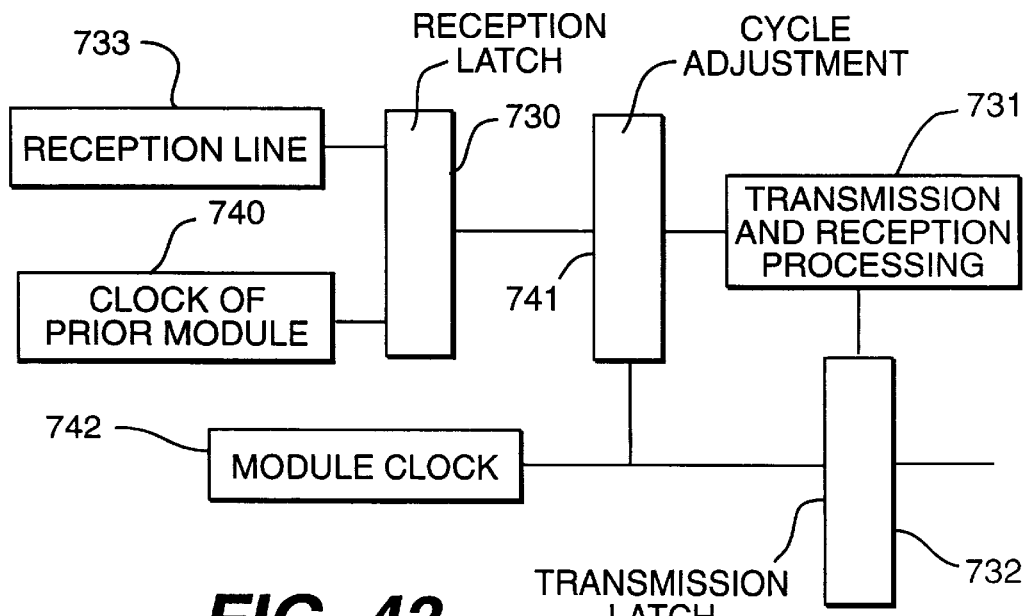
FIG. 43 is a diagram for illustrating a conventional transmission reception system.
Figure 44:
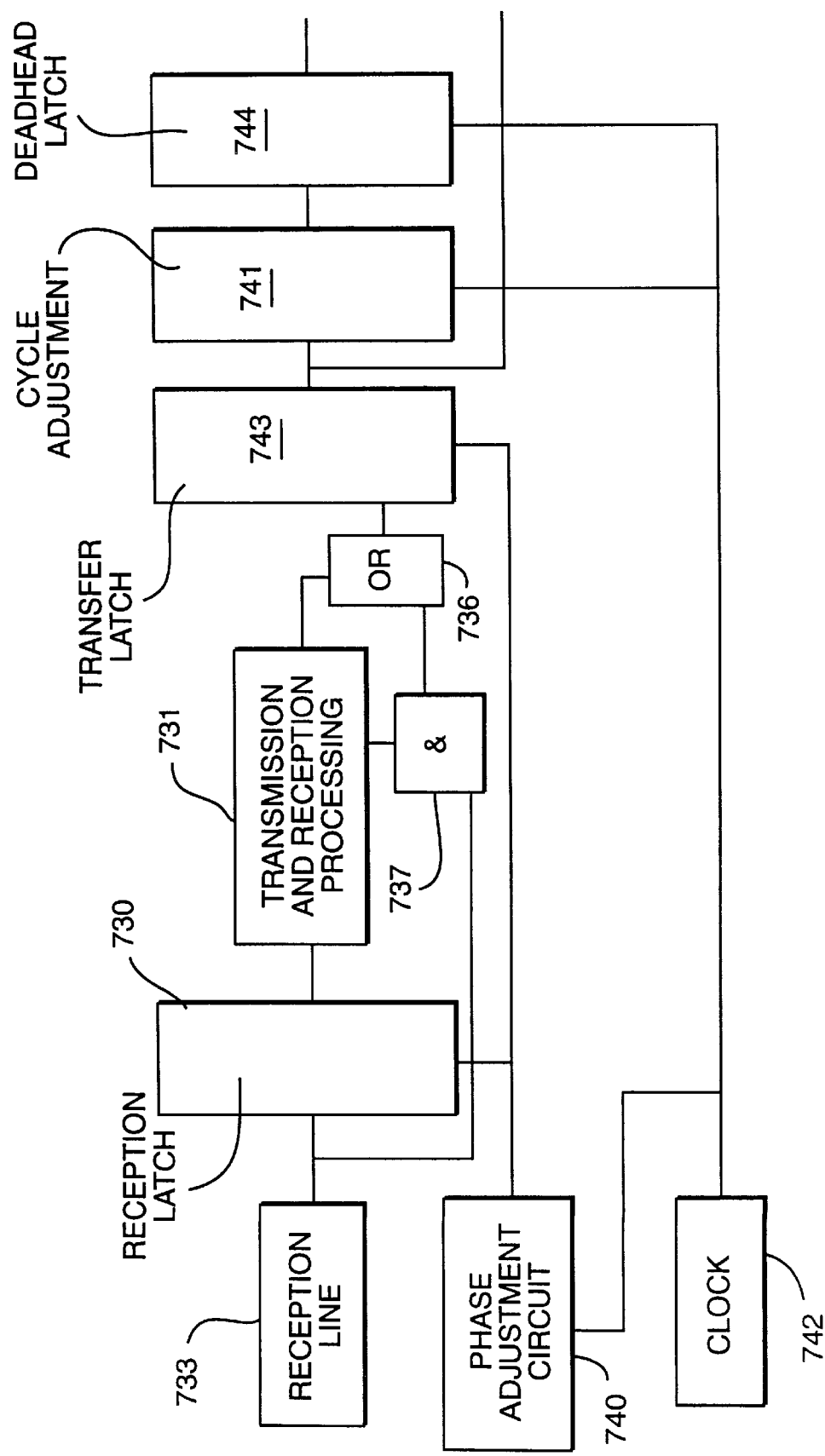
FIG. 44 is a diagram for illustrating a system operated synchronously with a clock in the ring of the present invention.

In the conventional system, the phase of a clock of a module is independent from the phase of a clock of respective modules. In average the difference results in a delay of ½ cycle. If respective modules are operated with matching to the phase of the reception line, the latency is reduced. It is required for one module of a ring that the cycle for one circulation of the ring is an integral multiple of a cycle. The conventional system is shown in FIG. 43. The reception line 733 is contained in the reception latch 730 by the clock 740 of the ring, the cycle is adjusted by the clock 742 of the module to synchronize with the cycle of the module. The transmission reception processing 731 is carried out to contain it in the transmission latch 732 and to transmit it.

A system in which the system is operated synchronously with the clock of the module. The reception line 733 adjusts the phase (740) of the clock 742 and contains it in the reception latch 730, and the transmission reception processing is performed. The reception line 733 and the content of transmission are selected by logical product 737 and logical sum 736, and contained in the transfer latch 743 with the ring clock 740. Each latch transfers the output of the transfer latch 743 to the next module. The mode of this transfer is called the transfer mode. One module for the ring contains the transfer latch 743 with the clock 742 in the deadhead latch 744 and transmits to the next module through the cycle adjustment 741. This synchronizing method is called the deadhead mode.

OPERATIONS IN TRANSFER MODE

The phase of the latch of the reception line such as the selection line, address line, and data line is matched to delay and skew of the reception line to determine the clock of the transfer latch, thereby the operating frequency and latency are improved. The sum of the design value of skew of the clock and the design value of the reception line directly influences the operating frequency. If the clock is subjected to skew correction, only the design value of skew of the reception line influences directly on the operating frequency, and the design value of clock skew does not have an influence on the operating frequency, so the influence is reduced to ½. If the skew automatic correction of the clock is performed, the influence of skew on the latency of the ring is small, that is, the design value of skew of the reception line is not counted but only the actual value of skew of the reception line is counted, and the skew design value of the clock is not added. In general, the difference between the design value and the actual value is large, therefore the difference contributes to improve the operating frequency significantly.

Figure 45:
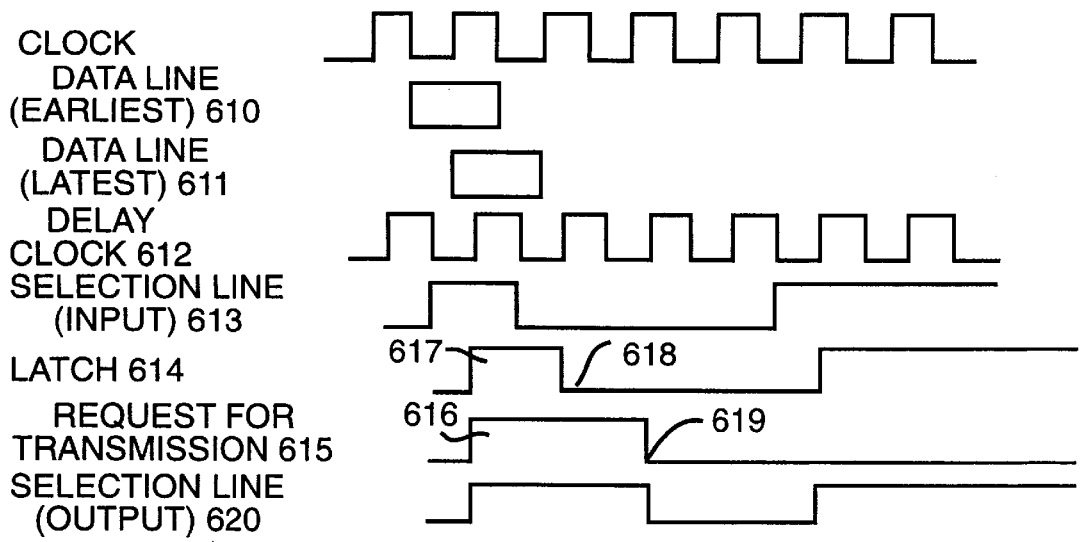
FIG. 45 is a diagram for illustrating the concept of transmission operation in transfer mode in the present invention.

A conceptual diagram of the transmission operation in the transfer mode is shown in FIG. 45. The delay clock (612) is set after a half cycle from the intermediate point of the reception line (610) received earliest and the reception line (611) received latest. The received data are contained in the transfer latch with the delay clock (612) and transmitted to the next module. The phase of the received selection line (613) is positioned at the intermediate point of both. The received selection line 613 is latched (614).

If there is a transmission request 615, the transmission request is turned to 1 (616). The latched selection line 613 is 1 (617), therefore the transmission line is maintained at 1 (616) continuously.

The latched (614) selection line 613 is 0 (618), then the transmission request 615 is turned to 0 (619). The logical sum of the latch 614 and transmission request 615 is output to the selection line 620.

PHASE ADJUSTMENT CIRCUIT

Figure 46:
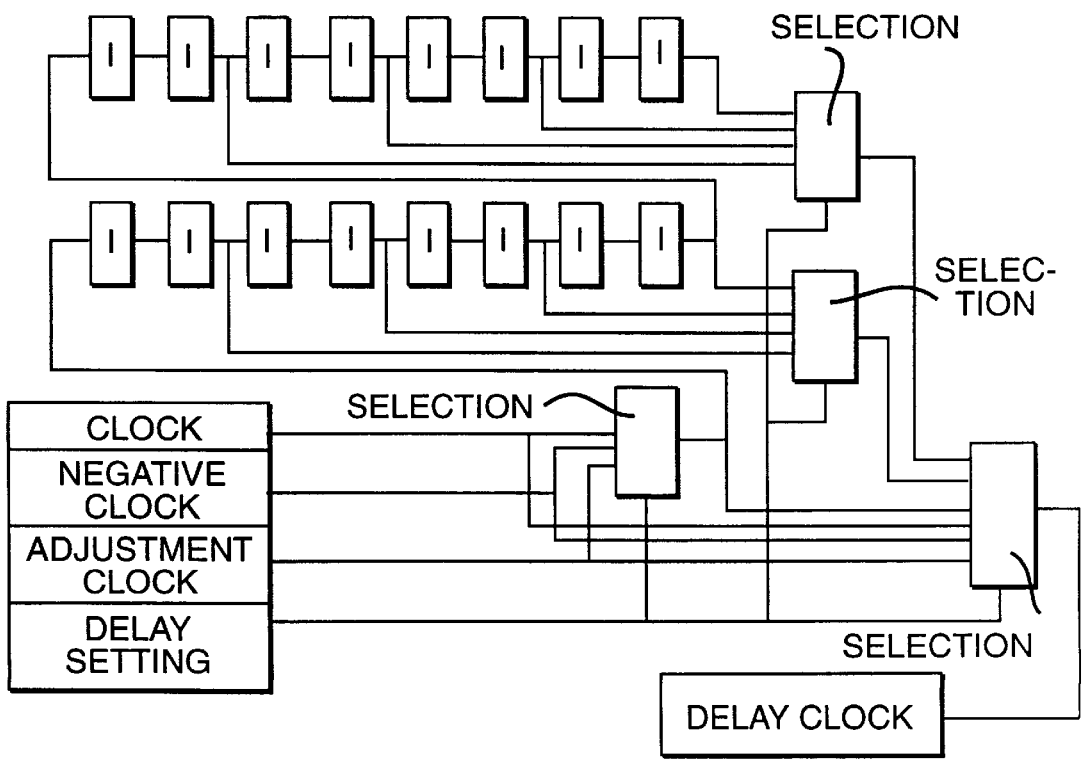
FIG. 46 is a diagram for illustrating the phase adjust circuit using delay of the gate of the present invention.

The delay clock is prepared through the phase adjustment circuit from the frequency-multiplied clock, as shown in FIG. 12. FIG. 46 shows the phase adjustment circuit using delay of the gate, in view of scattering of the semiconductor, enough delay is prescribed to assure at least delay of ½ cycle. The quantity of delay is prescribed by the delay setting register. The quantity of delay involves the selection circuit of 1 step, the selection circuit of 2 steps, 8 steps from a gate of 2 steps to a gate of 16 steps in addition to the selection circuit of 2 steps, a total of 10 steps, further, including the output of the negative clock, for a total of 20 steps. However, because of scattering in the performance of the semiconductors, at the maximum delay, delay of the clock and negative clock can superpose. For example, when delay reaches ½ cycle at the gate of 18 steps, it becomes 6 steps.

ADJUSTMENT CLOCK

The adjustment clock is a signal which changes phase thereof continuously during four cycles. The pattern for setting is transmitted from the preceding module to set the delay. The preceding module sends 1000 repeated patterns of 4 cycles through the selection line, address line, and data line so that the changing point of the signal is easily specified. To specify the changing point provided one on a four-cycle of the pattern for prescribing, the adjustment clock in which the phase changes continuously during four-cycles is provided. To generate such adjustment clock, a mechanism for changing the phase for every cycles with a period of four cycles, a phase adjustment circuit, and a range detection circuit for detecting the delay in the cycle are connected. The mechanism for changing the phase for every one cycle unit generates 1000 repeated patterns of a period of four cycles using the ring counter, and has a function of cycle selection. Any one of the logical products of the above-mentioned signal and the clock and the above-mentioned signal and the reverse polar clock are selected, and the phase is changed for every ½ cycle units.

The above-mentioned signal is input to the adjustment clock of the phase adjustment circuit. The range detection circuit examines the logical product of the delay clock which is the output of the phase adjustment circuit and the adjustment clock before delay, and inputs it to the set/reset latch to judge the output signal. If the output signal is 1, the range of delay is judged to be ½ cycle or less. If the delay exceeds the range of ½ cycle or the quantity of delay of the phase adjustment circuit is maximized, the signal is transferred to the phase of ½ cycle advance. Thus, the adjustment clock for determining reception phase having the variable delay with a period of four cycles is generated.

DETERMINATION OF RECEPTION PHASE

The procedures for determining the reception phase are described herein as follows.

The phase of an adjustment clock which receives a 0 of the setting pattern is determined for all of the transmission lines. The phase of a delay clock which receives a 1 is determined for at least one reception line, and it is used as the leading edge. The phase of the delay clock which receives a 1 is determined for all of the reception lines, and they are used as the trailing edge. The reception phase is determined at the time after ½ cycle from the intermediate point of the leading edge and the trailing edge. The intermediate point between the leading edge and the trailing edge is determined by the following procedure.

A skew counter which starts the counting when the leading edge is detected and finishes the counting when the trailing edge is detected is provided. Next, an adjustment clock is set on the leading edge. The phase of the adjustment clock is advanced to ½ of the skew counter, and the quantity of delay of the phase adjustment circuit is determined at the intermediate point between the leading edge and the trailing edge. The clock after ½ cycle from the intermediate point between the leading edge and the trailing edge is obtained by inputting a clock having reverse polarity to the original clock used for preparing the adjustment clock.

RELAY MODE

An input of the transfer latch is transferred as the reception data in the relay mode. The input of the transfer latch is switched before ½ cycle to the timing of the transfer latch. In the transmission in the transfer mode, the transmission content is switched at the timing of the transfer latch, and the transmission content is latched in the transfer latch after one cycle and transmitted. In the transmission in the relay mode, it is required to relay with ½ cycle delay so that the transmission content before 1 cycle is matched to the switching of the input of the transfer latch. To satisfy the requirement, the transmission content is latched with a clock having the reverse polarity to the transfer latch for a delay of ½ cycle, and transferred.

DEADHEAD MODE

In the deadhead mode, the content of the transfer latch may be transferred to the deadhead latch. If the phase of timing of the transfer latch is laid within the setup time of the deadhead latch, the content of the transfer latch is transferred to the adjustment latch, and then latched to the deadhead latch. To adjust the number of cycles for one circulation of the ring when the number of module connections is small or to adjust the numbers of cycles for one circulation of two rings to be the same as described hereinafter, the adjustment latch 1 is provided. By confirming that the contents after and before the latch timing of the latch are the same, no superposition of latch timing of the transfer latch and deadhead latch is confirmed. A module in deadhead mode transmits 10 repeated patterns. The timing of the deadhead latch is delayed by a prescribed value and the output of the transfer latch is latched. It means that the output of the transfer latch is delayed by prescribed value and the output of the transfer latch afer the timing of the deadhead latch is watched. Next the timing of the transfer latch is delayed by a prescribed value and the output of the transfer latch is latched at the timing of the transfer latch. It means that the output of the transfer latch is advanced by prescribed value and the output of the transfer latch before timing of the deadhead latch is watched. The timing of the transfer latch is based on the adjusted reception phase and the timing of the deadhead latch is based on the phase of the distributed clock. If both signals are identical, there is no superposition of the timing of the deadhead latch and transfer latch, therefore the passage through the adjustment latch is not necessary.

Figure 47:
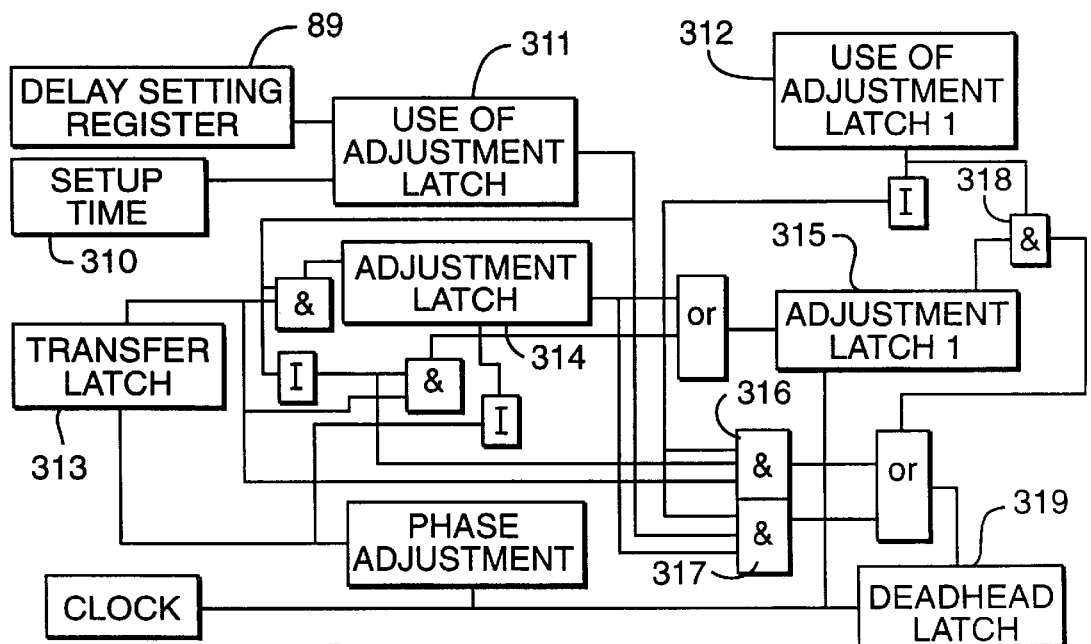
FIG. 47 is a diagram for illustrating the cycle adjust circuit of the present invention.

The cycle adjustment circuit is described referring to FIG. 47. If there is superposition of the transfer latch and deadhead latch, the adjustment latch use 311 becomes a 1. The module control unit changes the adjustment latch 1 use 312 to 1 in response to a indication of the ring control unit. If the use of adjustment latch 311 is 1, the transfer latch 313 transfers it to the adjustment latch 314. If the use of adjustment latch 312 is 1, the content of the adjustment latch 314 is transferred to the adjustment latch 1 (315). Whether the content of the transfer latch 313 is transferred by any way of directly, through the adjustment latch 314, or through the adjustment latch 1 (315), it is selected based on the logical product 316, logical product 317, and logical product 318, and the content of the transfer latch 313 is transferred to the deadhead latch 319.

SKEW CORRECTION FOR RECEPTION LINES

The design value of skew of the reception line influences the operating frequency. If the variable delay circuit is provided to every reception line, which includes the selection line, address line, and data line for automatic correction of the skew, the influence of the skew on the operating frequency is limited to only correction accuracy. The operating frequency is determined by the transmission characteristics of the driver, LSI, wiring in the substrate, package, and connector. The variable delay circuit may be the same device as the phase adjustment circuit using the delay of a gate. Though, the reverse input and input signal for adjustment are not necessary. The minimum quantity of delay is determined by the design value of the ring, and a delay of more than ½ cycle is unnecessary.

Figure 48:
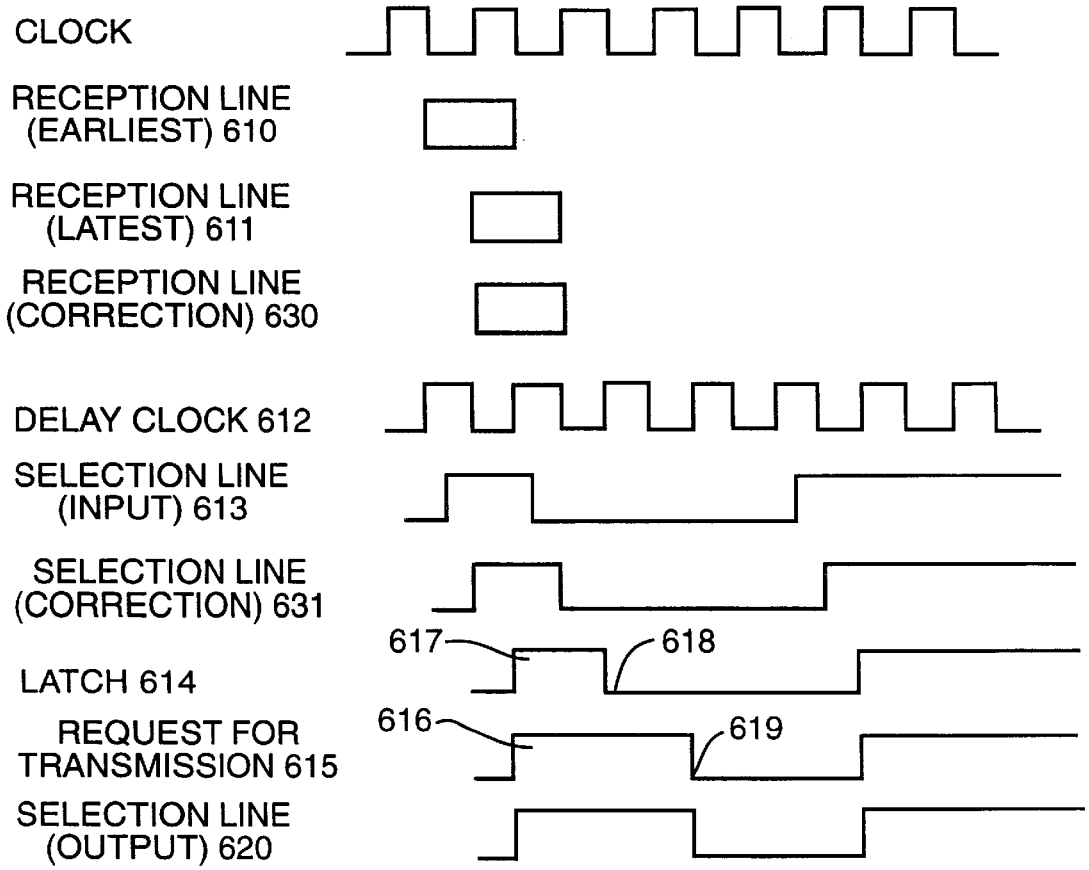
FIG. 48 is a diagram for illustrating the concept of transfer mode for skew correction for each receiving line in the present invention.

The conceptual diagram for skew correction for the reception lines in transfer mode is shown in FIG. 48. Like the case of the reception phase, 1000 patterns for the phase setting are transmitted from the preceding module. The quantity of delay of the variable delay circuit for each reception line is prescribed to be 0, and the phase of the adjustment clock is matched to the reception line 611 having the most behind phase. The quantity of delay of the variable delay circuit for every reception line is increased at the same time, and the quantity of delay of the variable delay circuit which detects "1" at the transfer latch last for every reception lines is contained. After completion of scanning of the delay, they are returned to the contained quantity of delay at a time. As the result, the output of the transfer latch of all reception lines falls in to the same phase.

By supplying a clock having the reverse polarity of the original clock of the adjustment clock to the phase adjustment circuit to delay by ½ cycle, the clock is used as a clock with the reception phase.

PACKET OF BROADCAST

To transmit packets to respective modules simultaneously, one broadcast signal is provided. The broadcast signal represents the broadcast by changing the broadcast signal line to 1 at the same time as the address. When the broadcast signal is 1, the address of a requester module is indicated in the address signal. The broadcast signal is separated as a signal line for simplifying the description, however actually, the broadcast signal is included in the header of a packet as described herein under, therefore the broadcast signal does not result in increasing of the number of signal lines.

FLOW CONTROL

A means in which the delivery confirmation of a packet at the ring level is performed at high speed by way of two added signal lines, rather than a packet so that complex control is avoided, and the reduction of the throughput is eliminated. Also, a means for delivery confirmation of broadcast packets is provided. To reduce retransmission at the ring level, an algorithm for flow control corresponding to traffic is given.

DELIVERY CONFIRMATION

Figure 49:
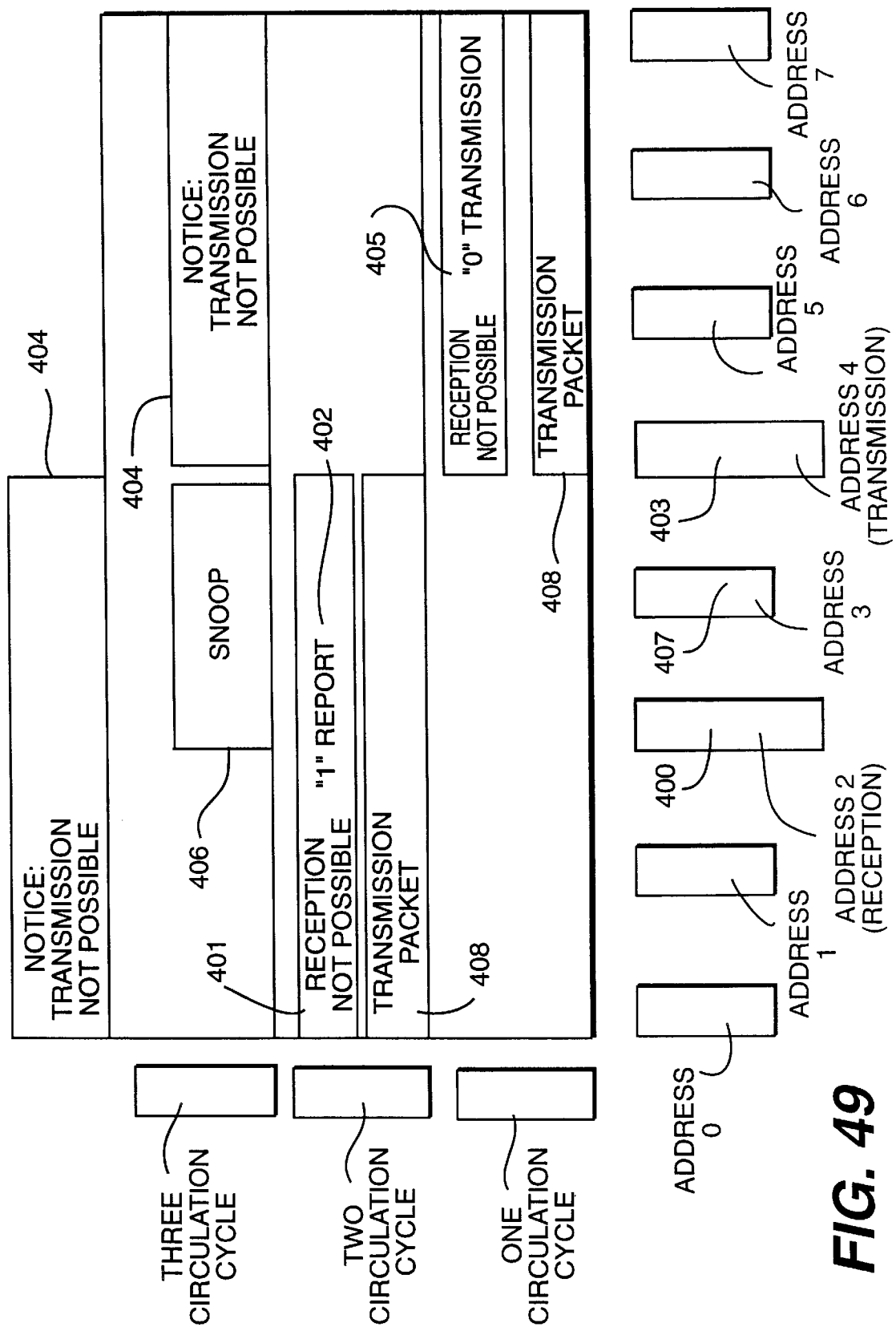
FIG. 49 is a diagram for description of delivery confirmation in the present invention.

The delivery confirmation is described by referring to FIG. 49. One signal 401 for reporting from the reception module 400 to the transmission module 403 of a reception not possible signal 402 after 2 cycles from the reception is provided. Also, one signal line 404 is provided for reporting from the transmission module 403 to respective modules after 2 cycles from the reception of the report that the transmission module 403 received the reception not possible signal. The reception module 400 which had reported the reception not possible signal transmits a message that the reception module becomes possible for reception by way of a broadcast packet. The transmission module 403 acquires, in addition to the transmission packet (408) after 2 cycles, also a reception not possible signal 401 after 2 cycles from the time, and a reception not possible signal 404 after 2 cycles from the reception of the reception not possible signal 401 by the transmission module 403.

IMPOSSIBLE RECEPTION

The transmission module 403 changes the reception not possible signal 401 to 0 (405) after 2 cycles from the packet transmission. The reception module 400 puts 1 (402) in the reception not possible signal 401 when the reception module 400 cannot receive the packet. The reception module does nothing when the reception module receives the packet. The transmission module 403 confirms the delivery by the condition that the reception not possible signal 401 is maintained at 0 (405). In the case that the packet is received, because any module does not change the reception not possible signal 401 to inactive condition, the reception not possible signal remains 0, and the delivery confirmation is possible for the broadcast.

RECEPTION IMPOSSIBLE NOTICE

The transmission module 403 provides the reception not possible notice signal 404 to respective modules. If the reception not possible notice signal 401 is 1 (402), the reception not possible notice signal 404 is changed to 1 after 2 cycles from the reception. If the reception reception not possible signal 401 is maintained at 0 (405), the reception not possible notice signal 404 is changed to 0 after 2 cycles from the reception. When a packet addressed to a specific reception module cannot be received, respective modules are informed of the message that the specified reception module cannot receive the packet. When the broadcast packet cannot be received, respective modules are informed of the message that the broadcast packet cannot be transmitted. Because the reception module 407 which can snoop (406) the information that the reception not possible signal 401 is 1 (402) before arriving to the transmission module can know the reception not possible situation by snooping, it may be used for processing.

REPORT OF CAUSE OF IMPOSSIBLE RECEPTION

A more effective flow control is possible by reporting the cause of impossible reception by way of addition of reception impossible cause lines for respective causes in addition to the addition of the reception not possible signal line. The more effective low control is possible by adding reception impossible cause notice lines for respective causes in addition to the reception not possible notice line.

RETRANSMISSION

When a packet addressed to a specific reception module cannot be received, respective modules suppress transmission and broadcast transmission to the module. When the broadcast packet cannot be received, respective modules suppress transmission of the broadcast. When free entry of a reception buffer of the reception module which had reported the impossible reception situation becomes 2 times of the number of cycles of the ring or more, the possible reception is transmitted by way of a broadcast packet. Respective modules are informed that it is possible to receive at the reception module. Respective modules retry transmitting of packets addressed to the reception module which had been unable to receive. As to the retransmission of broadcast packets which could not be received, because it is possible that a plurality of reception modules cannot receive, it is restarted after restarting for a packet addressed to a specific reception module. The transmission of the broadcast is restarted when a free space continues for a time period sufficient for the numbers of cycles for one circulation of the ring or when transmission is suppressed for a prescribed time. When the inability of the reception of the broadcast packets increases, a prescribed time for waiting for restarting of transmission is extended. If there is no impossible to receive reception, a prescribed time for waiting for restarting of transmission is shortened.

FLOW CONTROL

Flow control is operated by abandoning the transmission right of a module's own packet. The slot connected next acquires the transmission right of the highest order. When there is no empty packet on continuous number of cycles more than a prescribed value, the transmission right is abandoned even if there is a packet to be transmitted subsequently. The prescribed value is prescribed automatically to a larger value when the average busy rate is low. The reduction of busy rate caused by bursting busy condition is prevented. When the busy rate is high, a packet addressed to a specific reception module is provided with priority, and when the busy rate is low, a broadcast packet is provided with priority.

PACKET WITH A PLURALITY OF CYCLES

By transferring a packet with a plurality of cycles, the number of cycles of logical operation of respective modules, mainly the selection lines, increases, and by reducing the number of signal lines between modules, the cost is reduced. A clock with half cycle supplied to a packet with 2 cycles, therefore the relationship between the phase of the distributed clock with half cycle and the first cycle of the packet is fixed to modules individually. In the case of 2 cycles or more, a packet clock having a period of the number of cycles of the packets is generated in respective modules. The packet clock has the first cycle of 1 and the residual cycle of 0. For synchronizing of packet clocks of respective modules, a synchronizing indication is output from the ring control unit, and the module in deadhead mode transmits a repeated pattern for the first cycle of 1 and the residual cycle of 0 of a packet as a synchronizing pattern. Respective modules receive a specific synchronizing pattern and synchronize with the packet clock. The control of the transmission right is operated on the cycle at which the packet clock is 1 using the selection line. The selection line is brought to 0 after the third cycle. Thereby, the synchronizing condition of the packet clock is monitored by respective modules. The directory ring or selection ring both described hereinafter is transmitted in split form to a plurality of cycles, therefore if it is a packet of two cycles, for example, the packet is transferred through 6 lines instead of 11 lines, and 13 lines instead of 24 lines respectively.

TRANSFER OF BLOCK PACKET

When a message of a fixed length such as cache line is transmitted, if continuous transmission of the packets is guaranteed, the loss due to the split transfer of the packets can be eliminated to improve the throughput, and the assembly of a message in the reception module is easily accomplished. When a block packet is transmitted, the transmission of a block packet is notified in advance, and the transmission of ordinal packets is suppressed.

The acquisition of the transmission right of a block packet is operated at the first cycle of a block. If the number of cycles for one circulation of the ring is less than the cycle of the block cycle, the transmission right of the block packet is succeeded after the number of cycles of the block packet. If the number of cycles for one circulation of the ring is more than the cycle of the block packet, the transmission right of the block packet is succeeded after the number of cycles for one circulation of the ring. An ordinal packet has the independent transmission right equivalent to the number of cycles for one circulation of the ring. If the number of cycles for one circulation of the ring is more than the number of cycles of a block packet, an ordinal packet has the independent transmission right equivalent to an integral multiple. The transmission of a block packet is reserved and notified to respective modules to suppress the transmission of ordinal packets, and then a block packet is transmitted.

Figure 50:
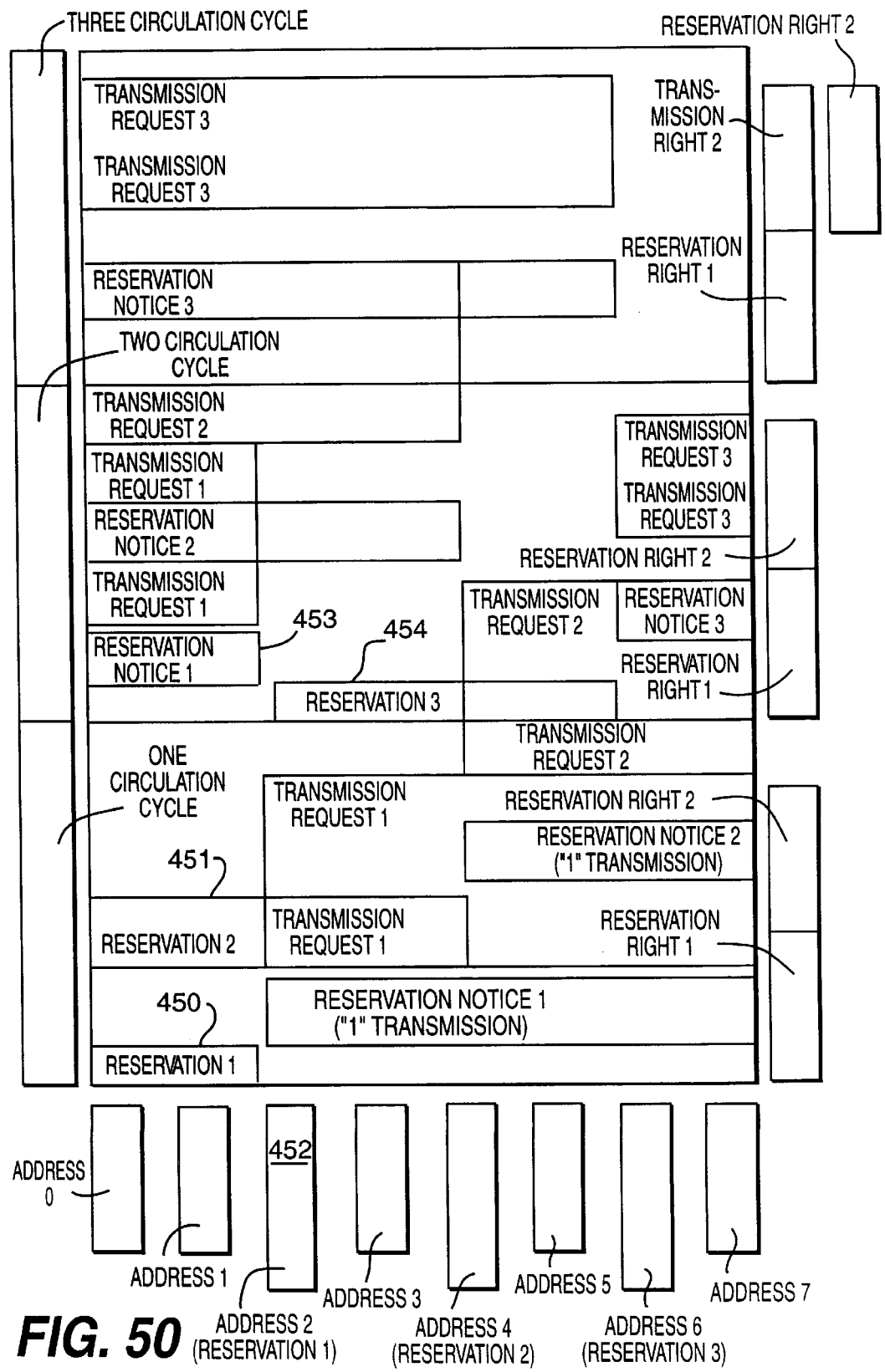
FIG. 50 is a diagram for illustrating transfer of two blocks of the independent transmission right in the present invention.

The case of two independent transmissions is described referring to FIG. 50. To acquire the reservation right for transmission of a block packet, a reservation signal (one) is provided. The reservation right of a block packet does not exist for each cycle, therefore the reservation right is started up to demonstrate the existence thereof clearly. It means the issuing of a token comprising a single signal. The module of the address 0 maintains the reservation signal at 1 ((reservation 1) 450) during 1 cycle when the power is turned on to start up one reservation right, and merely relays from the next cycle. After the first transmission of the reservation signal, if there is the number of cycles of a block packet until it attains to the number of cycles for one circulation of the ring, the required number of independent transmission right (reservation 2 (451)) is started up. The module (452) which wants to transmit a block packet transmits continuously 0 to the reservation signal. When the module (452) which wants to transmit a block packet receives a reservation signal of 1 (reservation 1 (450)), the module (452) acquires a reservation right, and does not transmit 0 to the reservation signal after 2 cycles and merely relays it. Because the number of cycles of a block packet is 2 or more, the next reservation signal (reservation 2 (451)) is not influenced.

The reservation notice line (one) for notifying the reservation right of a block packet is provided. After 2 cycles from the acquisition of the reservation right, 1 (reservation notice 1 (453)) is put on the reservation notice line for a time period of one cycle, thus a reservation of the reservation right of the number of cycles (in this case, 4) of the block packet after one circulation of the ring is notified to respective modules. The module (452) which acquires the reservation right transmits 0 (reservation 3 (454)) during a time period of one cycle to the reservation notice line after a time period of one circulation of the ring. The module (452) which acquires the reservation right of a block packet turned the selection line to 1, and operates the transmission request (transmission request 1 (455)) to acquire the transmission right. The module can keep similarly the transmission right during a time period of the number of cycles of the block packet.

If the number of cycles of a block packet is larger than the number of cycles for one circulation of the ring, the next acquisition of the reservation right is operated after the number of cycles of the block packet after the reservation. In this case, because the number of the block packet is less than the number of cycles for one circulation of the ring, the acquisition of the reservation right is operated after the cycle for one circulation of the ring. If the module does not want to transmit a block packet subsequently, the module turns the reservation line to 1 (reservation 3 (454)) during a time period of one cycle to abandon the reservation right. The module merely relays it without transmission 1 after the next cycle. If the module wants to transmit a block packet subsequently, the module can acquire a reservation right without doing anything. Respective modules suppress the transmission request of ordinal packets for a time period of the number of cycles of the block packet after 2 cycles from the reception of the reservation notice.

A block packet reception not possible signal and block packet reception not possible notice signal are provided for the delivery confirmation of a block packet. If reception is not possible for a block packet, the block packet reception not possible signal is turned to 1 after 2 cycles from the first packet to report it. The transmission module turns the block packet reception not possible notice signal to 1 after 2 cycles from the reception not possible signal, and notifies that reception of the block packet is not possible. The transmission module suppresses the transmission of the block packet to the reception module. The module which had reported that reception of the block packet is not possible provides the message that the module is ready to receive the block packet by way of a broadcast packet. Like the delivery confirmation of an ordinary packet, the causes for the reception not possible report and a notice function are added. The delivery confirmation for an ordinary packet uses the reception not possible signal and reception not possible notice signal.

Figure 51:
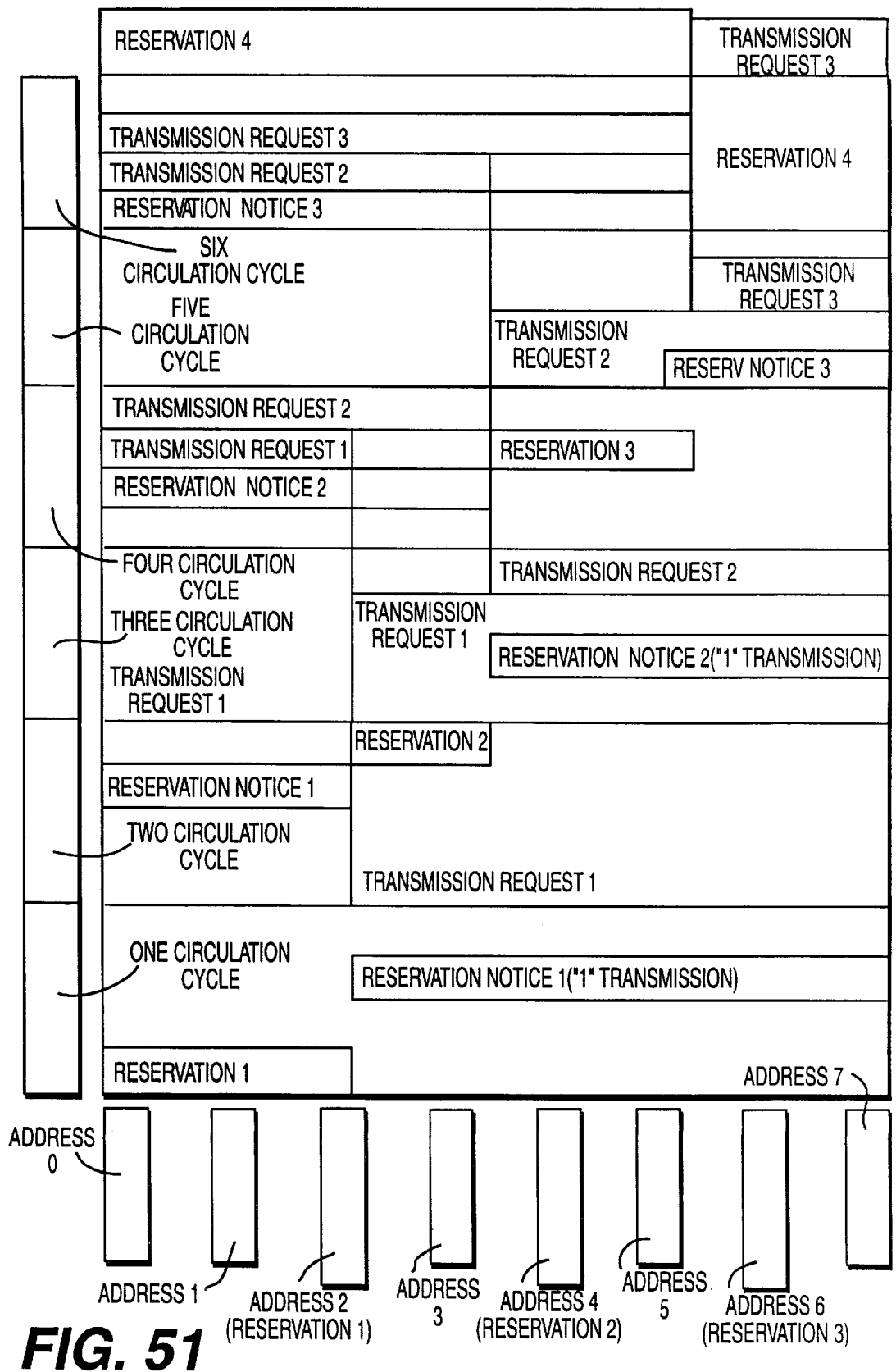
FIG. 51 is a diagram for illustrating transfer of a block larger than one circulation of the ring in the present invention.

If the average busy rate is larger than a prescribed value, the module does not acquire continuously the transmission right. The module of the next address has a right to receive the transmission right and can acquire the transmission right preferentially. Because the module which holds the transmission right is not clear, the module of address 0 is used for monitoring. The module of address 0 confirms the information that the reception signal is received with a period larger than any one of the number of cycles of the block packet or the number of cycles for one circulation of the ring, and that reception signal is received within a certain time period predetermined previously for flow control and monitoring the normality of the reservation signal. The continuous transmission of a successive prescribed number of block packets is realized by adding a long block reservation line and long block reservation notice line which function as the reservation line and reservation notice line. To transmit an ultra packet comprising a plurality of long block packets, an ultra packet reservation line corresponding to the long packet reservation line and ultra packet reservation notice line corresponding to the long packet reservation notice line are provided. Similarly, by adding signals for the acquisition of transmission right, a plurality of block packet types having different length included in the hierarchical structure can be transmitted. An example of transfer of a block packet larger than the cycle for one circulation of the ring is shown in FIG. 51.

DIRECTORY RING

Figure 52:
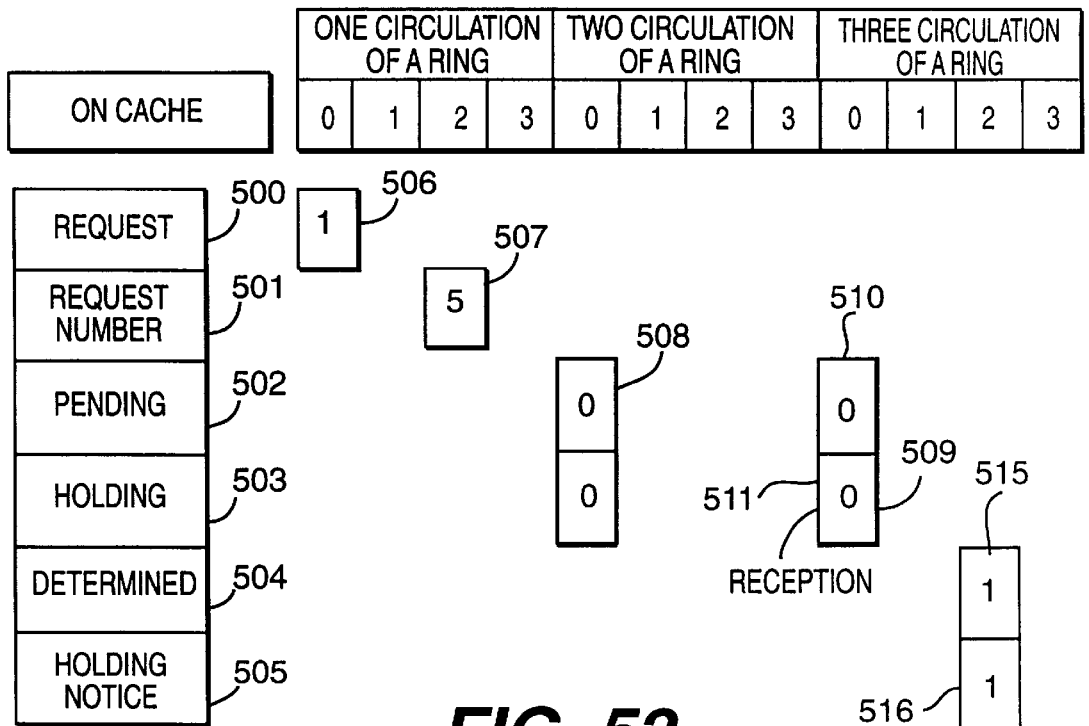
FIG. 52 is a diagram for illustrating an example of operation when there is a cache hit of the directory ring in the present invention.
Figure 53:
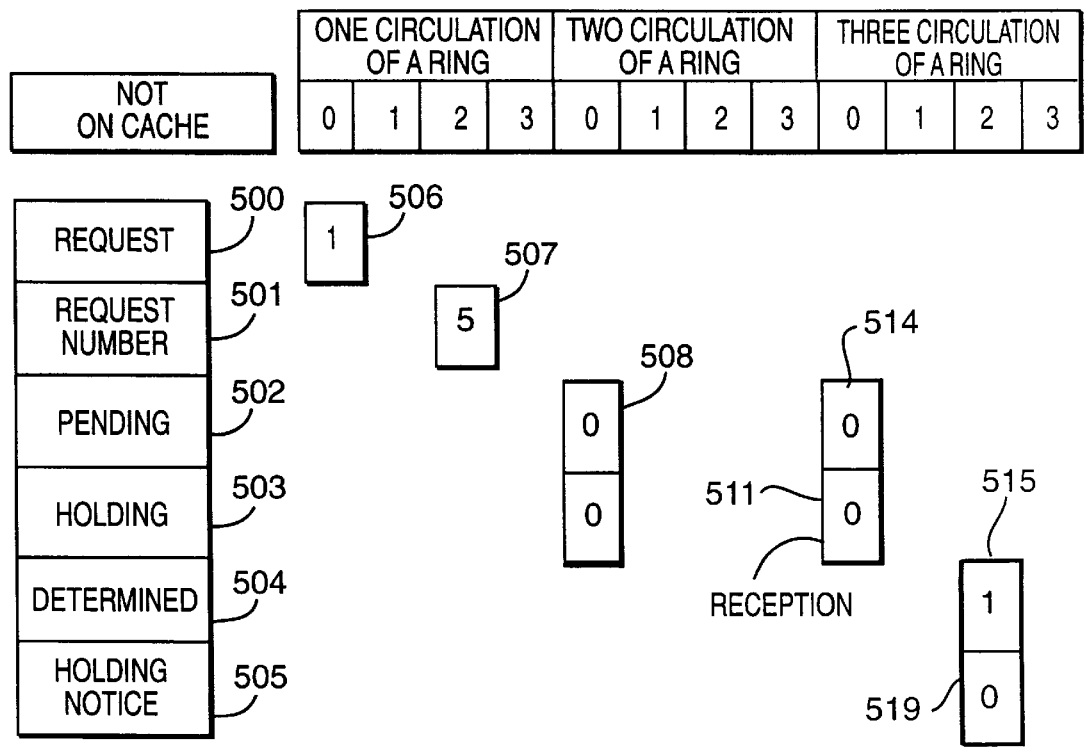
FIG. 53 is a diagram for illustrating an example of operation when there is a cache miss in the directory ring in the present invention.
Figure 54:
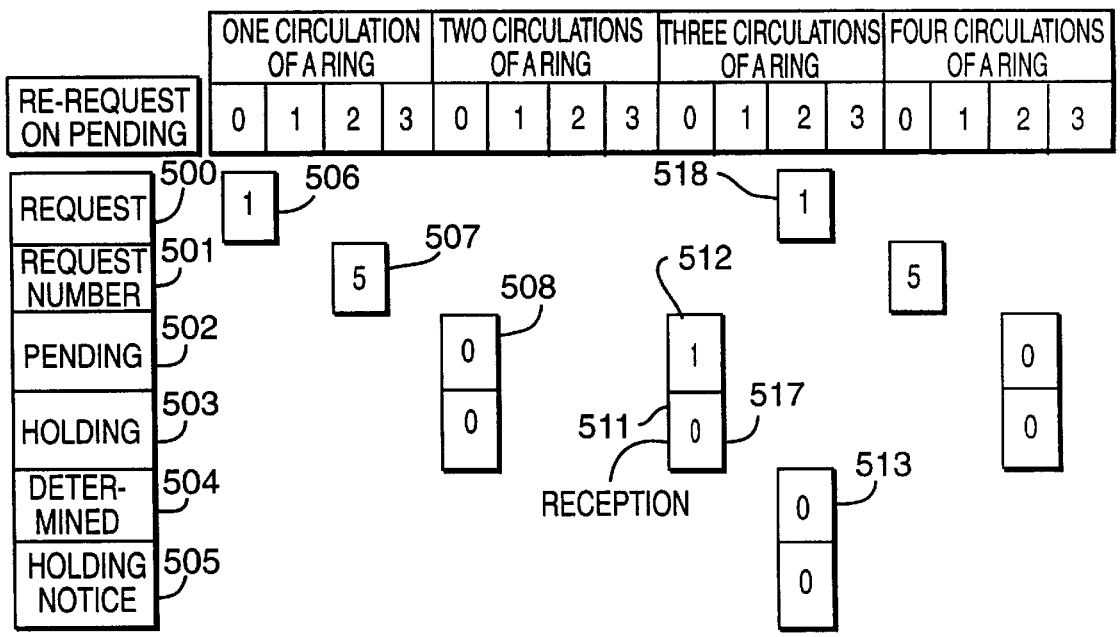
FIG. 54 is a diagram for illustrating an example of re-request operation for a directory ring with pending status in the present invention.

The transmission module is informed, by way of the directory ring, of the information that data are held in the cache of the module. The transmission module can notify this to the respective modules. The transmission module acquires the transmission right and requests a report, and notifies the respective modules based on the report. FIG. 52 shows the case in which there is a report in the cache, and FIG. 53 shows the case in which there in no report in the cache. FIG. 54 shows the case in which the request for a report is insufficient for final determination and the report is required continuously.

The request line 500 for controlling the transmission right of the directory ring, request number signal 501 (6) on which the request number corresponding to a reading packet is loaded, undetermined signal 502 (1) for reporting that the existence of a cache line is now being confirmed, holding signal 503 (1) for reporting the message that there is a cache line, determination signal 504 (1) for notifying the result, and holding notice signal 505 (1) are provided. In summarizing the signal line, the total addition is 11 lines, and in the case that a packet is transferred by way of 2 cycles, the addition is 6 lines. The long term undetermining signal (1) may be provided for informing the message that much time is required until the ending of the undetermined condition like access waiting of the local memory of the above-mentioned directory. The time for re-requesting may be delayed to reduce unnecessary requests. The transmission right of the request number signal 501 after 2 cycles, undetermining signal 502 and holding signal 503 after 4 cycles from the request line 500 and after 2 cycles from the request number signal 501, and determining signal 504 and holding notice signal 505 after the cycle which is the sum of cycles for one circulation of the ring and 6 cycles from the request line 500 are controlled by the request line 500. The module which requests a report puts the request number on the request number signal (507) after 2 cycles from the acquisition of the transmission right (506). Subsequently, the undetermining signal 502 and holding signal 503 are turned to 0 (508). A module reads the request number (507) after 2 cycles from the request line of 1 (506) to report the cache condition. When there is no line which the request number (507) indicates, the module waits for the determining signal (504) after 2 cycles of the cycle for one circulation of the ring without doing anything. If there is a line which the request number (507) indicates, the module turns the holding signal (503) to 1 (509) and completes the processing.

The pending signal x of (502), namely (510) in FIG. 52 represents 0 or 1. In FIG. 52, FIG. 53, and FIG. 54, "reception" (511) on the 0-th cycle of "three circulation of a ring" represents the condition that the transmission module receives it. While the existence of the cache line indicated by the request number (501) is being confirmed, the module puts 1 (512 in FIG. 54) on the pending signal (502), and waits for the determining signal (513 in FIG. 54) 2 cycles after the cycle circulation of the ring. The request module receives undetermining signal (502) after the cycle for one circulation of the ring and holding signal (503). If the read holding signal (503) is 1 (509 in FIG. 52) or the undetermining signal (502) is 0 (514 in FIG. 53), both signals represent the completion of the processing, the request module turns the determining signal (515) and holding notice signal (516 in FIG. 52) to 1 and completes the processing. If the holding signal (503) is 0 (517 in FIG. 54) and the undetermining signal (502) is 1 (512 in FIG. 54), the request module turns the request signal 500 to 1 (518 in FIG. 54) again, acquires the transmission right, and requests a report. If the determining signal 515 after 2 cycles of the cycle for one circulation of the ring after response to the holding signal (503) becomes 1 (515 in FIG. 52 and FIG. 53), the module interrupts or completes the processing. If the determining signal (504) is 0 (513), the module prepares for re-request from the request module. If the holding signal (503) is 1 (509), the module can snoop the information that it is in the final condition. If there is reading data and the holding notice signal (516) is 1 (516 in FIG. 52), the memory module suppresses the transmission. If there is reading data and the holding notice signal (516) is 0 (519 in FIG. 53), the memory module transmits it.

LOGICAL ORDERING

Figure 56:
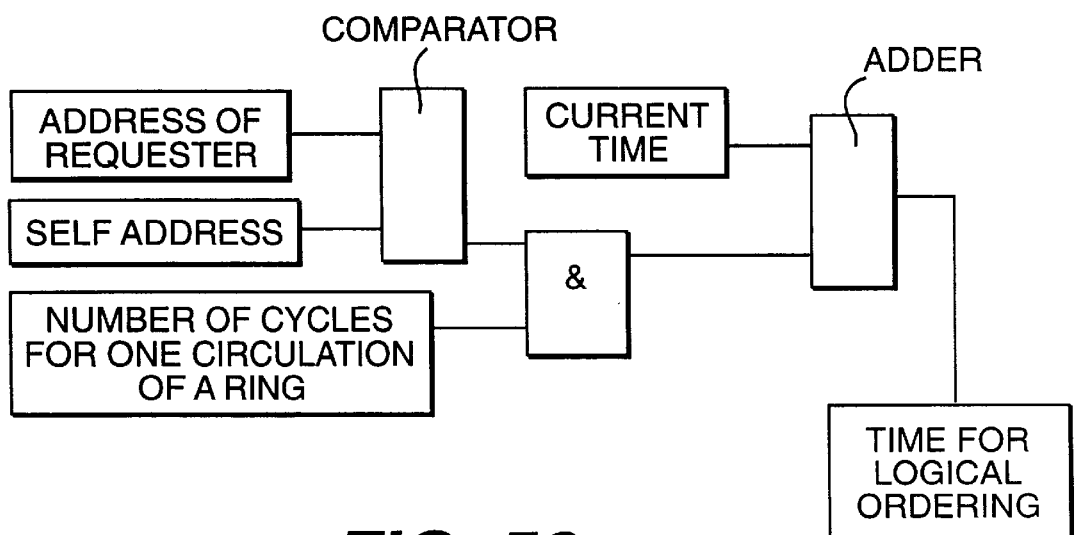
FIG. 56 is a diagram for illustrating the method for determining the time of logical order of the present invention.
Figure 55:
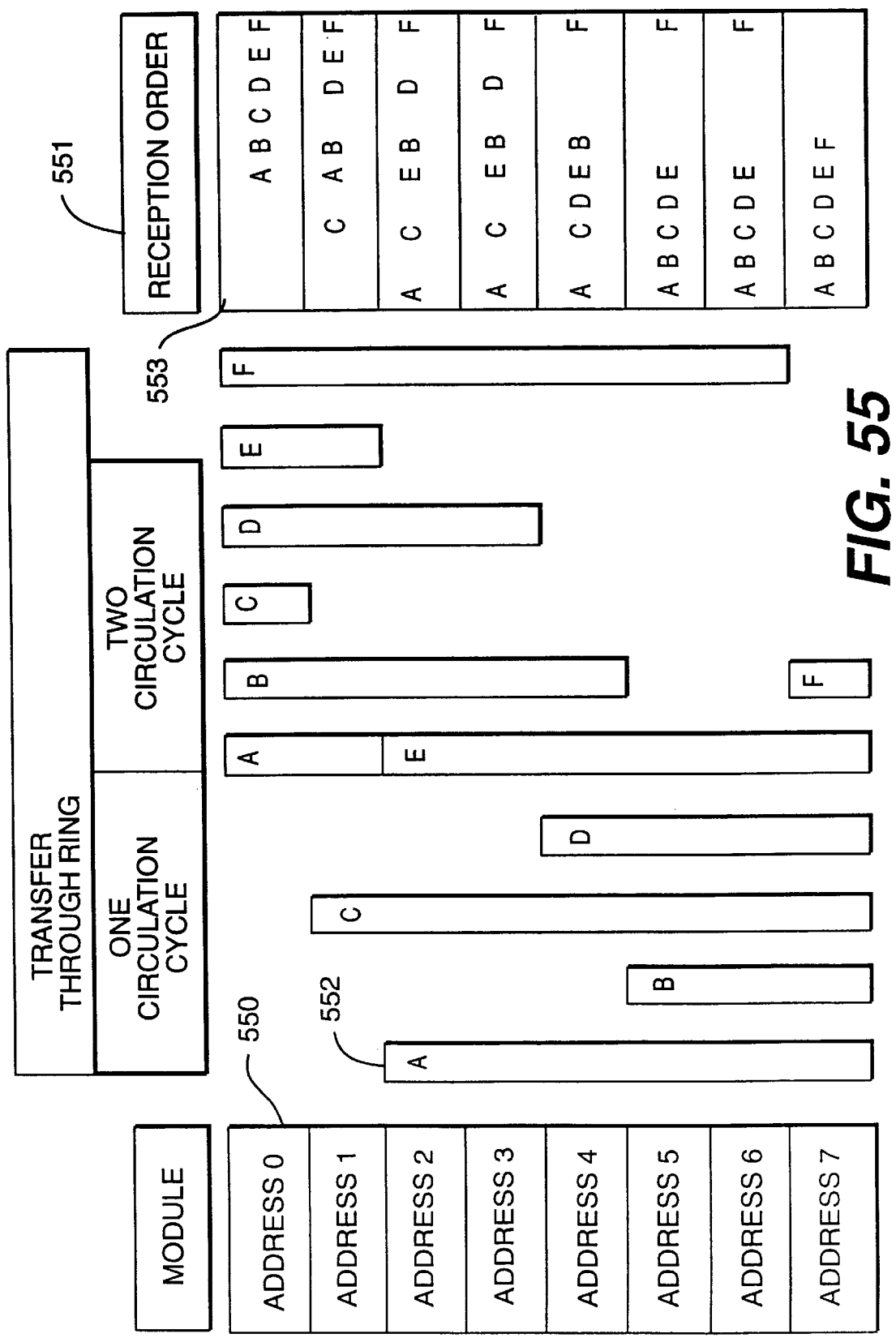
FIG. 55 is a diagram for illustrating receiving order in respective modules in the present invention.

To decide the proprietary right of the cache, the broadcast packet should perform logical ordering and respective modules should recognize it. Because the transmission right is acquired during one circulation of the ring, the broadcast packet is sure to pass through the module of address 0. The module of address 0 can determine the logical order according to the order of passage of the packets. The reception module is matched to the logical order of the module of address 0. If the transmission module is between the reception module and the module of address 0, the packet passes through the module of address 0 and passes through the reception module, and returns to the transmission module. According to the reception time of a packet, the logical order is determined. If there is the transmission module between the module of address 0 and the reception module, it passes through the reception module and passes through the module of address 0, and returns to the transmission module. The order of passage through the module of address 0 is the same as the order for the case of imaginary transmission of packets from the transmission module to the reception module. The logical order is determined by the time which is a sum of reception time of the packet and the number of cycles for one circulation of the ring. The address of the transmission module is indicated on the address line of the destination of the ring. FIG. 55 shows the order (551) of reception of packets A, B, C, D, E, and F which pass through the module 550 of address 0 at respective modules. The reception module determines the time for determination of the logical order so that the time is to be (553) by comparing the module's own (self) address and the destination address. The packet A (552) represents the message that the module of address 2 transmits it. FIG. 56 shows the condition that if self address is larger than the requester address as the result of comparison, the time of logical ordering is the time of sum of the conventional time and the number of cycles for one circulation of the ring.

SELECTION RING

Next, the selection ring is described. Instead of acquisition of the transmission right by way of the selection line of the basic ring, the integrated acquisition of the transmission right can be operated by way of the module of address 0 using the selection ring. To operate an integrated acquisition of the transmission right, two packets are transferred during a time period of 1 cycle, therefore the throughput is improved. The module of address 0 operates the processing, therefore the logical ordering may be the same as the order of acquisition of the transmission right, so no special processing is required for respective modules.

The selection line operates the dispersed transmission right acquisition, on the other hand, the selection ring operates the integrated transmission right acquisition. The latency increases because it needs transfer time from the request module to the module of address 0, time for processing the transmission right in the module of address 0, and transfer time from the module of address 0 to the request module. The number of signal lines also increases. The transmission right using the selection line is acquired for a time period of one circulation of the ring. Packets other than the broadcast packet occupies the ring from the requester address to the destination address. It may be possible to transmit a different packet from the destination address to the requester. As to the transmission right control using the selection line, the transmission right of each cycle is processed in the cycle of one circulation of the ring. In the case that the transmission right control is integrated, a different packet can be transmitted in the usable area of the ring.

The selection ring is provided, and the integrated transmission right control is operated in the module of address 0. In the integrated transmission right control, the transmission right of two packets is processed in 1 cycle, instead of the cycle for one circulation of the ring being used for one transmission right control. Respective modules report transmission request from respective modules to the module of address 0, and notice transmission right is acquired from the module of address 0. In a multiprocessor system involving cache control, reading and write back of the cache often occur simultaneously, and an ordinary packet is often a broadcast.

A system which involves parallel transfer of two non-broadcast block packets on the one circulation of the ring and transfer of only one ordinary packet between the module of address 0 and the module of the final address is described. The logical ordering is operated in the order of transmission right. The reservation line for a block packet and associated signal lines are unnecessary. The report signal of the transmission request from respective modules to the module of address 0 is a selection line (1) and transmission right reporting lines (10). A transmission request (1), requester addresses (3), destination addresses (3), a block packet (1), and broadcast (1) are loaded on the transmission right reporting lines (10) for transmission request reporting.

For busy reporting, the transmission request is turned to 0, and a busy report (1), busy report addresses (3), a block busy (1), and a busy (1) are loaded on the transmission right reporting lines (10). For busy termination reporting, the transmission request is turned to 0, and a busy termination report (1), busy termination report addresses (3), a block busy (1) and busy (1) are loaded on the transmission right reporting lines (10). The transmission request notice signal from the module of address 0 to respective modules is composed of a transmission right effect (1) and transmission right notice lines (12). The transmission right notice line can notify at most two transmission rights, namely the transmission right 0 and transmission right 1 which are acquired in the cycle when notifying the transmission request. A transmission request notice 0 (1), requester 0 addresses (3), a block packet 0 (1), and broadcast 0 (1) are loaded on the transmission right 0. On the transmission right 1, transmission notice 1 (1), requester 1 addresses (3), a block packet

1 (1) and a broadcast 1 (1) are loaded. The transmission request notice 0 is turned to 0 for a busy notice, and a busy notice to one module (1), busy notice addresses (3), a block busy (1), and a busy (1) are loaded on the transmission right notice line. The transmission request notice 0 is turned to 0 for busy termination notice, and a busy termination notice (1) for busy termination notice, busy termination notice addresses (3), block busy (3), and a busy (1) are loaded on the transmission right notice line. To sum up, the necessary number of signal lines is 11 lines for reporting and 13 lines for notifying, and total 24 lines. In the case of transfer of a packet in 2 cycles, 13 lines are added. For the delivery confirmation in flow control, the reception not possible (1) and reception not possible notice (1) are increased to two lines individually because two packets are transferred in parallel for 1 cycle. A reception not possible report 0 (1) and reception not possible report 1 (1) are provided corresponding to the transmission right 0 and transmission right 1 to confirm the delivery of a packet from respective modules to the module of address 0. Similarly a reception not possible report 0 (1) and a reception not possible notice 1 (1) are provided corresponding to the transmission right 0 and transmission right 1 to confirm the delivery of a packet from respective modules to the module of address 0.

Respective modules monitor the number of unprocessed transmission requests based on the difference between the number of transmission requests and the number of processing completion responses and control the transmission request so that the transmission request buffer is not filled up. The broadcast packet and block packet from the same requester respond in the order of request, therefore it is not necessary to specify the transmission request to include the request number.

TRANSMISSION RIGHT ACQUISITION PROCESSING

In the processing of an integral transmission right control of an ordinary packet, the processing that is operated conventionally by way of the basic ring is operated by way of only the logical circuit in the module of address 0. The integrated transmission right control in the module of address 0 is shown herein as follows.

The transmission right of the tail address (end point) of the cycle after the address (starting point) of the cycle is determined. If there is no transmission request to be selected, the processing of the cycle is completed with the address 0 as a starting point of the transmission right processing after the cycle for one circulation of the ring. If the destination of a transmission request to be selected is located ahead of the end point of the address of the ring, the processing is completed with the destination address as a starting point of the transmission right processing after the cycle for one circulation of the ring. If the destination is located behind the end point, the processing of the cycle is completed with the address 0 as a starting point of the transmission right processing after the cycle for one circulation of the ring.

HIGH SPEED TRANSMISSION RIGHT ACQUISITION CIRCUIT

Figure 57:
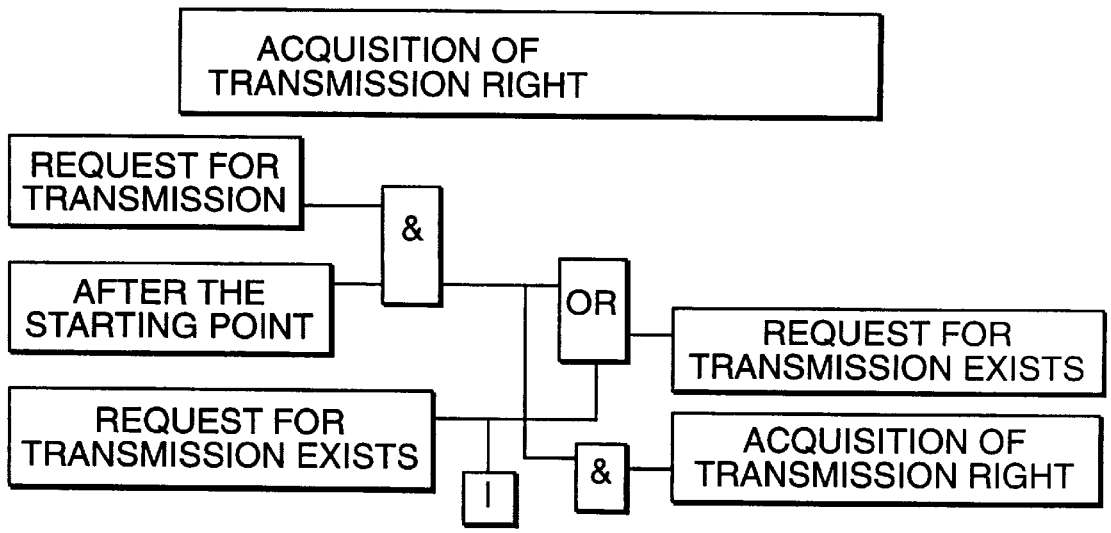
FIG. 57 is a diagram for illustrating transmission right acquisition logic of the present invention.
Figure 58:
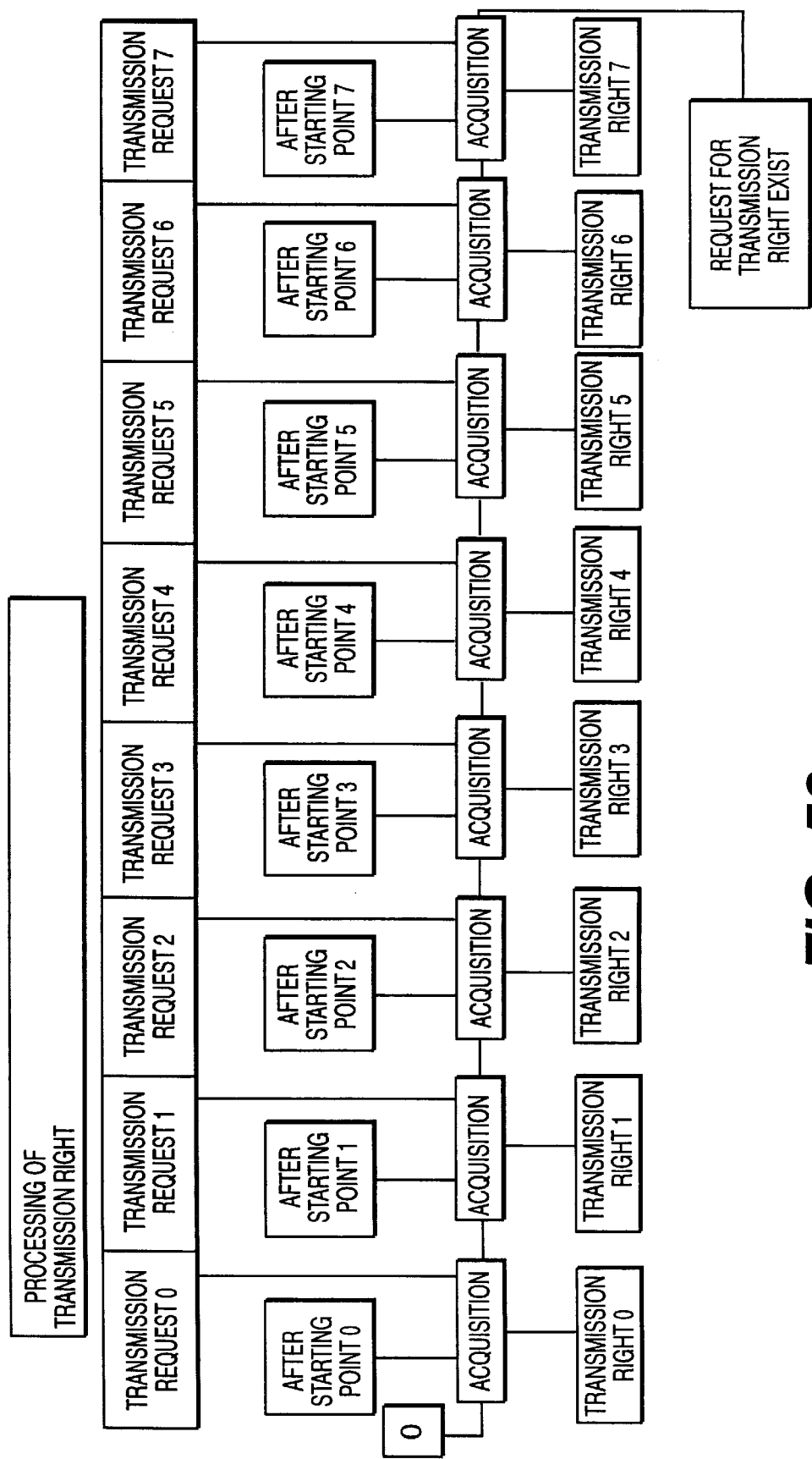
FIG. 58 is a diagram for illustrating transmission right acquisition logic of eight modules of the present invention.
Figure 59:
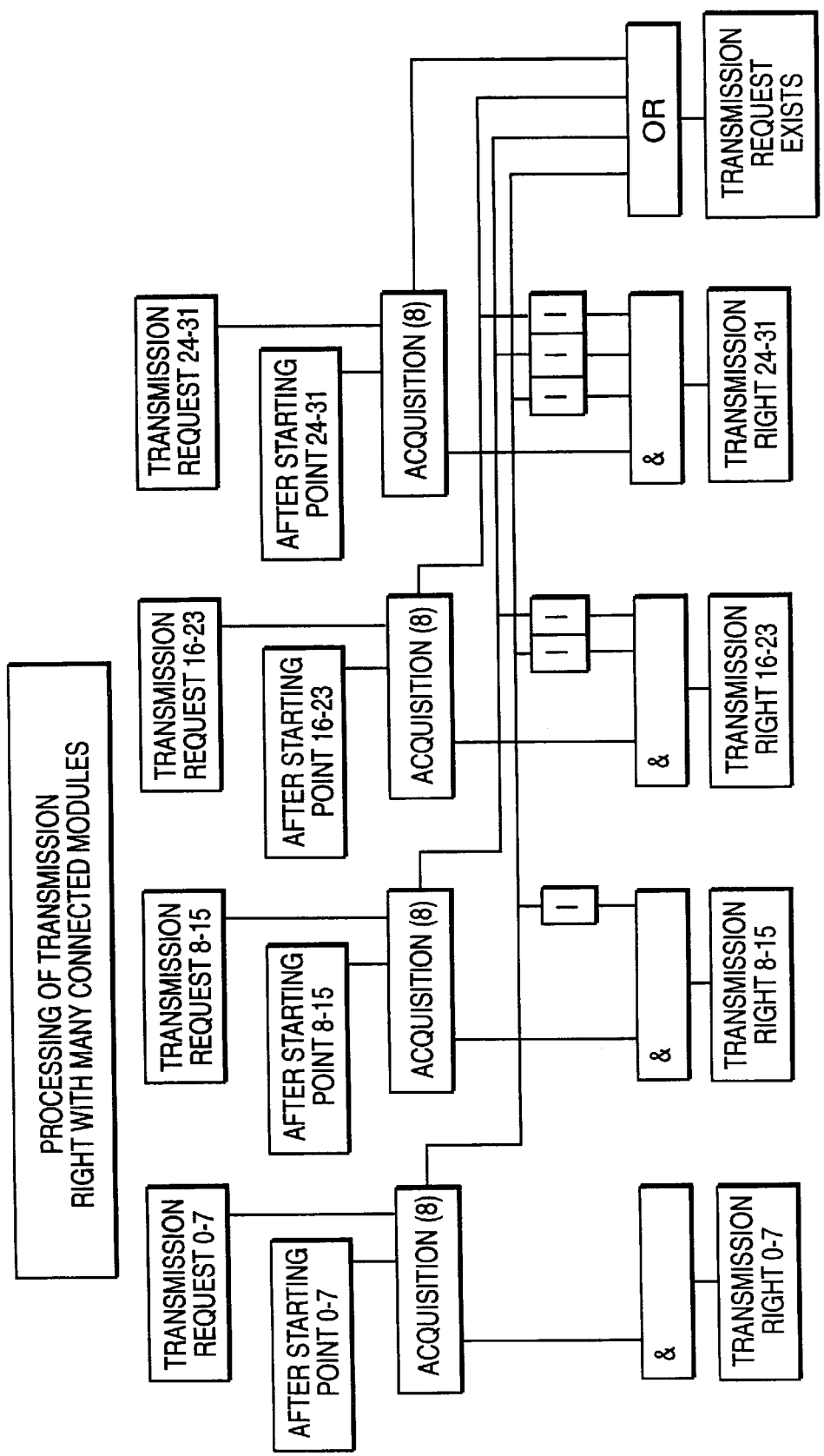
FIG. 59 is a diagram for illustrating transmission right processing involving many connections in the present invention.

The critical pass of the transmission right acquisition is in a cascade connection with a logical sum circuit of two inputs. The transmission right acquisition logic for the respective modules is shown in FIG. 57. In FIG. 58, logic comprising 8 transmission right acquisition logic shown in FIG. 57 which are cascade connected for acquiring a transmission right from the transmission request of respective modules is shown. In FIG. 59, a logic comprising 4 circuits shown in FIG. 58 which are connected for acquiring a transmission right when the number of connections is large is shown.

SELECTION OF PARALLEL TRANSFERABLE BLOCK

Figures 60, 64:
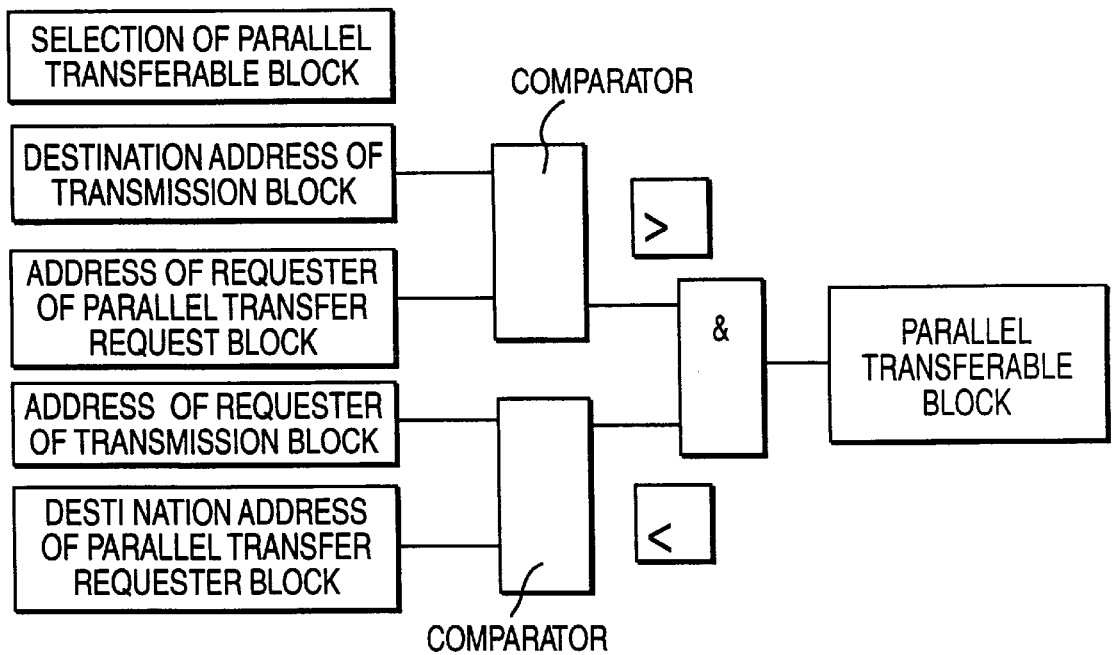
FIG. 60 is a diagram for illustrating the selection system of parallel transferable block of the present invention.
FIG. 64 is a diagram for illustrating the relationship between addresses of hierarchical connection of the present invention.

The transmission right of at most 2 packets is processed during a time period of one circulation of the ring for a block packet. The transmission right of the tail address (end point) of the cycle is determined after the address (starting point) of the cycle for the first block packet similarly to the case of an ordinary packet. If there is a block packet which acquires a transmission right, a block packet which can transferable of a block packet using a ring area from the destination address of the block to the requester is selected. In FIG. 60, a selection circuit of the parallel transferable packet block in the transmission request is shown.

SELECTION OF PARALLEL TRANSFERABLE BLOCK

Figure 61:
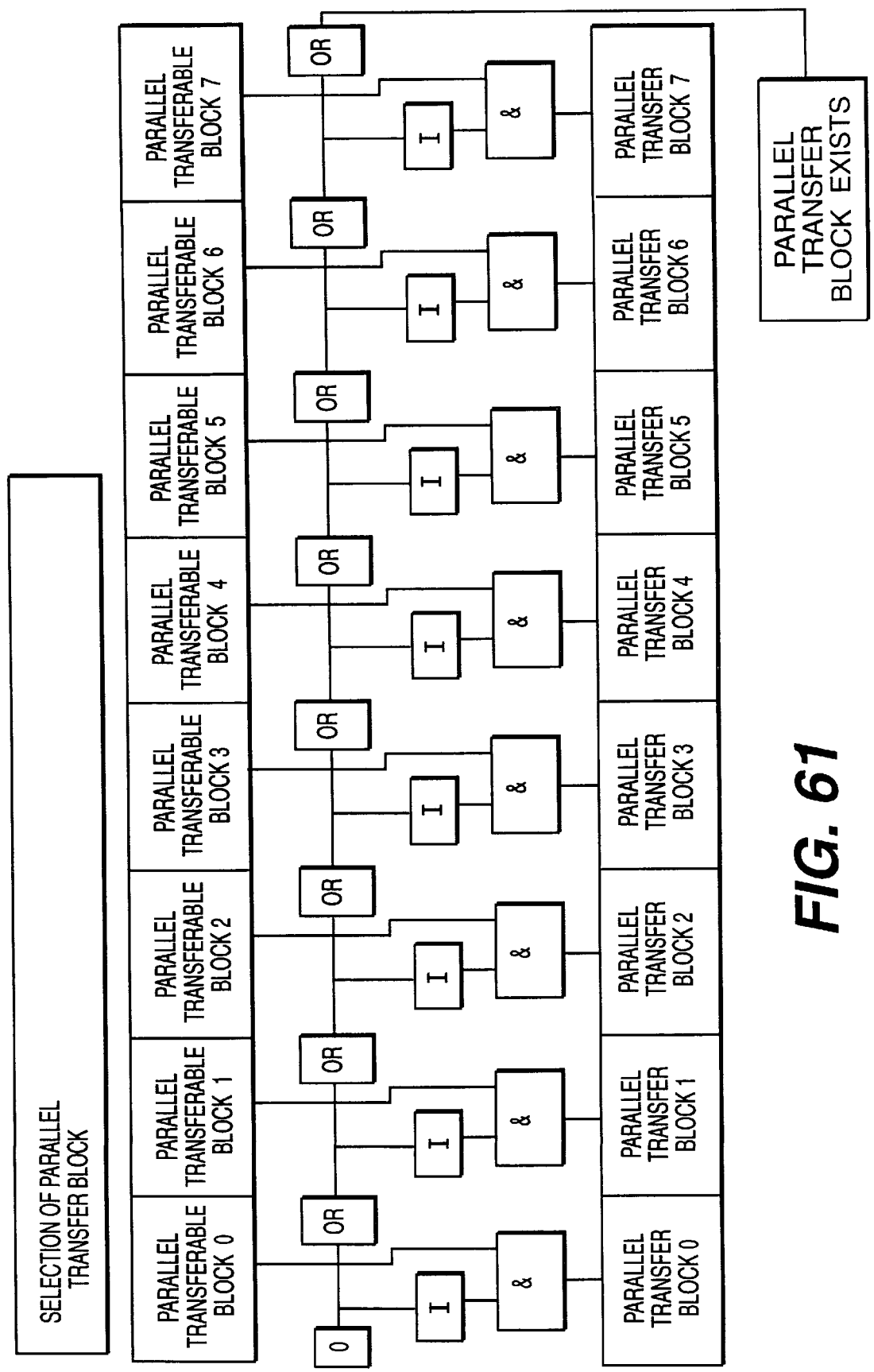
FIG. 61 is a diagram for illustrating selection of parallel transfer block in the present invention.

The block packet which has the least address out of the parallel transferable packet blocks acquires a transmission right. In FIG. 61, a circuit for selecting one parallel transfer block out of the parallel transferable blocks of respective modules is shown. 8 selection circuits of parallel transferable blocks shown in FIG. 59 are cascade connected. The critical pass of the transmission right acquisition of a block packet is in the cascade connection of logical sum circuits with 2 input. A dedicated circuit may be used instead of using a standard gate.

NOTICE OF PARALLEL TRANSFER BLOCK

If two block packets are on the same cycle, the transmission right acquisition is notified simultaneously using the ring. If the second packet located on the next cycle, the notice is operated in the next cycle. Because the block packet continues at least two, 2 cycles are used for the transmission right processing.

FLOW CONTROL

In the flow control, if the average busy rate is low, the broadcast is provided with priority, on the other hand, if the average busy rate is high, non-block packet and non-broadcast packets are provided with a priority. When the average busy rate is high, successive transmission rights exceeding the number prescribed for the respective modules cannot be acquired.

HIERARCHICAL CONNECTION

To improve the performance of a processor system with a ring connection, the hierarchical connection is applied. Processor systems are connected hierarchically therebetween with a main ring, wherein a processor system is used as a subring. A transfer which is closed in a subring does not have an effect on the main ring. The latency of the whole is determined by the sum of the latency of the main ring and subrings. When it is required to suppress the number of connections of the module of subrings at a low level to satisfy the throughput requirement from the main ring, the latency is improved by shorting subrings with cables.

Figure 62:
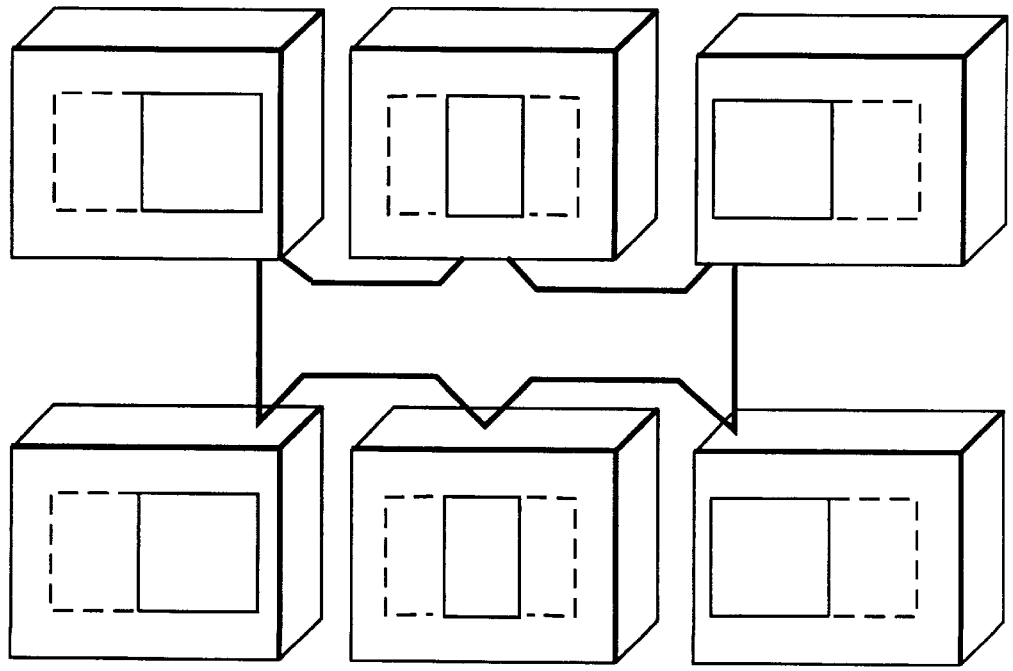
FIG. 62 is a diagram for illustrating the connection system for hierarchical connection of the present invention.

Usually, subrings are contained in a back plane. The main ring connected between back planes is connected using a cable, which is a feature of the ring, therefore the main ring is mounted easily. When subrings are connected exceeding the prescribed length, a module for extension is added. The connection method of hierarchical connection is shown in FIG. 62. The connection mechanism of the main ring and subrings has the address 0 of a module of a subring, and can operate a notice of a transmission right acquisition to a subring and a transmission request to the main ring simultaneously. The connection mechanism generates an address in the main ring or address in a subring from the header of a packet. The subring structure is possible to assemble for an ordinary bus structure. If semaphore of a message, address map register, and DMA register etc. are loacted in common IO address space, the destination is restricted to a single destination and the transfer of a packet becomes one-to-one style because of no caching. If a broadcast packet is generated like dispersed common memory, the throughput required for respective subrings is linear to the total number of subrings.

Figure 63:
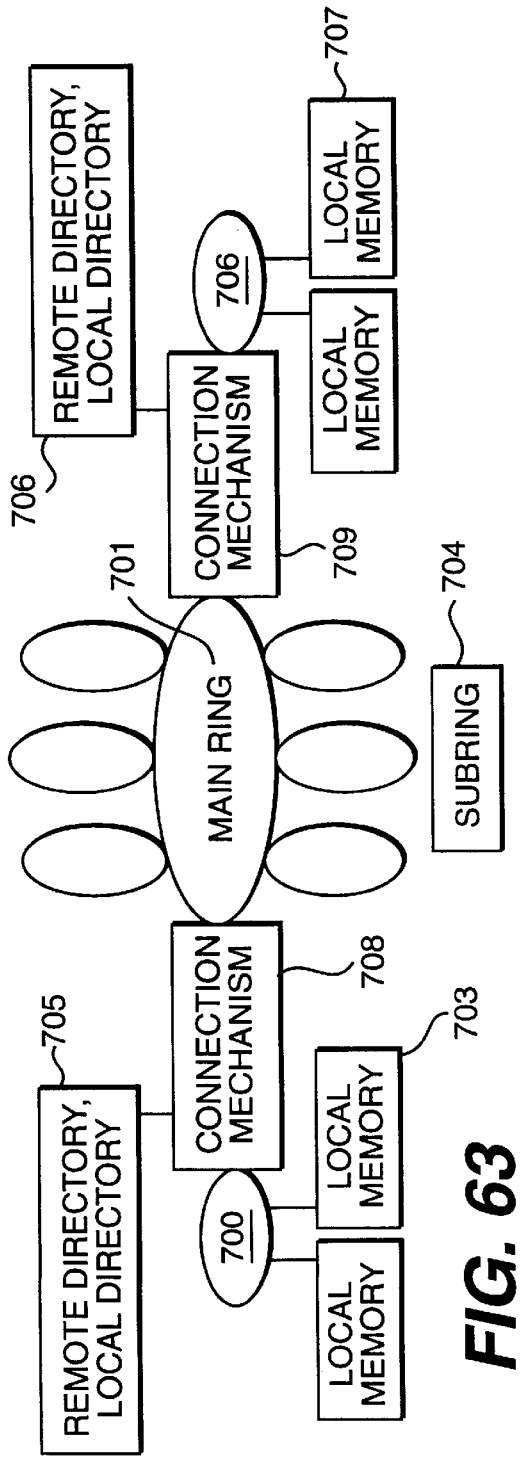
FIG. 63 is a diagram for illustrating the connection mechanism for cacheable access for hierarchical connection of the present invention.

In FIG. 63, a connection mechanism of hierarchical connection having a common memory which is capable of caching is shown. A packet which is closed in the subring 700 is not transferred to the main ring 701. A packet of the main ring 701 addressed to this subring 700 is transferred to the subring 700. A broadcast packet is transferred to all subrings and the main ring. The latency is shortened but the throughput required for the ring increases. By incorporating with a directory and protocol prescribed in SCI in the connection mechanism, the broadcast packet is eliminated, but the latency increases and the directory becomes larger. Using actively the broadcast performance of the ring, by reducing the broadcast packet for cache coherence and by suppressing the increase of the latency, thus the connection mechanism can have a directory with a suitable size.

When a module which belongs to the subring 700 makes access to the local memory 703 which belongs to the subring, if there is no copy in the cache of another subring 704, the packet may not be transferred to the main ring 701. If the connection mechanism has a local directory 705 for indicating the condition that there is no copy of the local memory 703 which belongs to the subring 700 in the cache of another subring 704, the transfer of a packet to the main ring 701 is eliminated. When a module which belongs to a certain subring 700 takes an access to the local memory 707 which belongs to another subring 706, if the another subring 706 having the local memory 707 which had received the access notifies that there is no copy in the subring 704, the packet may not be transferred in the subring 704. If the local memory 707 which belongs to another subring 706 has a remote directory 706 which indicates the condition that there is a copy in the cache of the subring 704, thus a packet to be transferred in the subring 704 is eliminated. The subring of destination is processed using the first 4 bits out of 36 bits. After confirming the condition that it is a cachable memory area and mounted, the directory receives the access.

LOCAL DIRECTORY

It is assumed that the memory address has 36 bits (64 GB), the address of a local memory to be mounted in a subring has 32 bits (4 GB), and the size of a line is 6 bits (64 B). The number of entries of the local directory is calculated by subtracting 6 bits from 32 bits, namely 26 bits (64 M entries).

In FIG. 64, the relationship of address is shown. The entry of the local directory has 2 bits of a copy bit and change bit. The copy bit contains 1 if there is the copy in the cache of another subring, and the copy bit contains 0 if there is no copy in the cache of another subring. The change bit contains 1 if there is a copy in the cache of another subring and it is probably changed, and the change bit contains 0 if there is no copy in the cache of another subring. The local directory has a capacity of ½₅₆ of the local memory.

Figure 65:
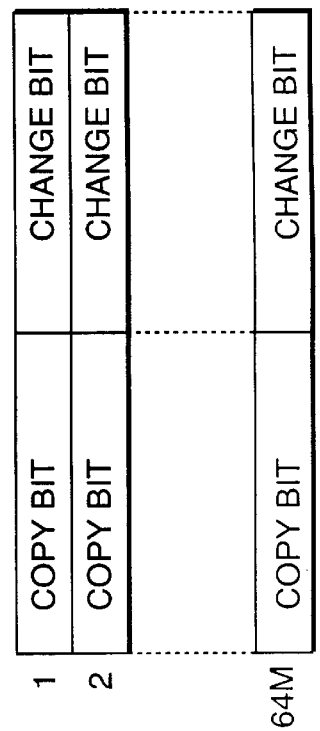
FIG. 65 is a diagram for illustrating the local directory of the present invention.

In FIG. 65, a local directory is shown. When the memory address is extended to 40 bits (1024 GB) and the address of the local memory to be mounted in a subring is extended to 36 bits (64 GB), the number of entries of the local directory is calculated by subtracting 6 from 36 bits, namely 30 bits (1024 M entry). It is contained in the local memory as a local directory table and the copy is contained in the local directory because the capacity is large. The copy of the local directory is arranged to the size of 64 B unit that is the same as the size of the line. Entries of 256 (8 bits) are contained in 64 B (512 bits). A copy of 18 bits (256 K entry), that is a value obtained by subtracting 8 bits from 26 bits, is contained in the local directory. An address conversion table is provided to change 22 bits to 18 bits, which 22 bits are obtained by subtracting 8 bits and 6 bits from 36 bits of the address of the local memory.

In FIG. 66, the extension of addresses is shown. The address conversion table has a 256 K entry (18 bits), and each entry has an address of 22 bits. One entry of the address conversion table shows one copy out of 16 units equivalent to 4 bits which is obtained by subtracting 18 bits from 22 bits.

In FIG. 67, an address conversion table is shown. Because the local directory contains the cache condition in all area of the local memory, the directory ring is unnecessary. The number of entries of the address conversion table is reduced by hashing the address of 18 bits.

REMOTE DIRECTORY

As to each entry, there is a 1 if there is the copy of the local memory which belongs to the subring in another subring or 0 if there is no copy in another subring is contained successively in addresses from the address 0 to the address 7 of a subring of the main ring. These 8 bits are called a copy vector. When a subring (address) in the main ring is extended to 31, each bit is allocated to group units. The intragroup extension is effective for SMP and the intergroup extension is effective for clusters. For example, the first bit is allocated to a group of address 0–3. Even if there is the copy in only one address out of 4 addresses, the group is treated as if there were copies in all the subrings corresponding to 4 addresses. The number of entries of the remote directory is determined based on the frequency of reuse. If the address is extended to 22 bits (4 M entry), 4 bits obtained by subtracting 22 bits and 6 bits from 32 bits of the local address are contained in each entry to specify the entry. To extend the local address to 36 bits, 8 bits obtained by subtracting 22 bits and 6 bits from 36 bits are contained to specify the entry. In FIG. 68 the remote directory is shown.

NOTICE OF COPY VECTOR

When a broadcast packet which makes access to the local memory which belongs to a subring is transferred to the main ring, a copy vector is contained in the header and transferred. When the main ring receives the broadcast packet which takes an access to the local memory which belongs to the subring, the copy vector is notified by way of a packet. Because the copy vector does not need a copy bit on its own address position, if the position is 1, it represents the condition that it is valid.

TYPES OF LOCAL MEMORY

Figure 69:
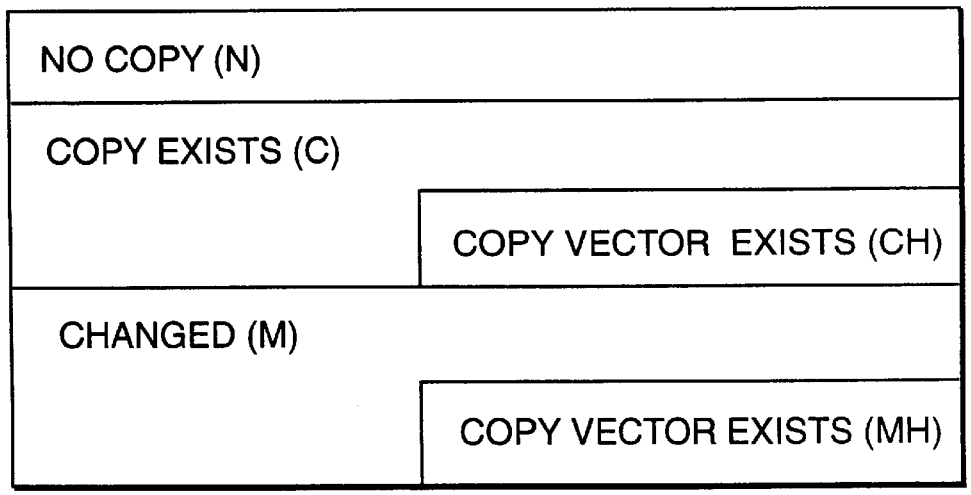
FIG. 69 is a diagram for illustrating types of local memory categorized based on directory of the present invention.

The local memory is categorized to be without copy (N), with copy (C), and with change (M) by the local directory. The local memory with copy (C) is partially categorized to be with copy vector (CH) and with change (M) and is partially categorized to be with copy vector (MH) by the remote directory. In FIG. 69, types of local memory are shown.

LOCAL MEMORY ACCESS

When a module which belongs to the subring 705 transmits a packet for copying the local memory 703 and the connection mechanism 708 receives it, if it is N or C, the packet is not transferred to the main ring. If it is M, it is required to write back the changed content from the cache. For writing back, the copy vector is contained in the header, and a broadcast packet is transmitted to the main ring 701. If the copy vector is valid and is 0, another subring 704 of the main ring 701 does not transfer a packet in the subring 704. If the copy vector is valid and is 0 or invalid, a packet is transferred in the subring 704. During writing back from another subring, an access to the same address remains waiting in the connection mechanism. When writing back is completed, the address is changed to CH, and the processing is succeeded. When a module which belongs to the subring 700 transmits a packet for changing the local memory 703 and the connection mechanism 708 receives it, if the address is N, the packet is not transferred to the main ring. If it is C, it is required to destroy the copy of the cache. If it is M, it is required to write back the content of the cache and destroy it. If it is C or M, the copy vector is contained in the header, and a broadcast packet is transmitted to the main ring 701. If the copy vector is valid and is 0, another subring 704 of the main ring 701 does not transmit the packet in the subring 704. If the copy vector is valid and is 0 or invalid, a packet is transferred in the subring 704. If it is M, it waits for writing back and is changed to N, and if it is C, it is changed to N as it is. As is obvious from the description herein above, the processing which is performed in a local memory does not influence another subring.

REMOTE MEMORY ACCESS

When a module which belongs to the subring 700 transmits a packet for copying the local memory 707 (remote memory) which belongs to another subring 706, and the connection mechanism 708 receives the packet, the packet is transferred to the main ring 701. Another subring 706 having the local memory 707 advises the copy vector by way of the packet. Another subring 704 of the main ring 701 operates the processing of a received packet after receiving the copy vector. If the copy vector is valid and is 0, the packet is not transferred in the subring 704. If the copy vector is valid and 0 or invalid, the packet is transferred in the subring 704. The condition of the local memory 707 is turned to CH. When a module which belongs to the subring 700 transmits a packet for changing the local memory 707 (remote memory) which belongs to another subring 706 and the connection mechanism 708 receives it, the packet is transferred to the main ring 701. The connection mechanism 709 of the subring 706 having the local memory 707 receives the packet and transfers it to the subring 706. The connection mechanism 709 of the subring 706 having the local memory 707 takes an access to the local memory 707 if it is N, and notifies by way of the packet the message that another subring 704 is not required to process the packet. If it is C, the connection mechanism 709 makes access to the local memory 707, and provides the message that if there is a copy in the cache of another subring 704, the copy is destroyed. If it is M, the connection mechanism 709 operates writing back and provides a message to destroy it.

To do these operations, the copy vector of the cache is notified by way of the packet. Another subring 704 of the main ring 701 receives the copy vector from the packet, then processes the received packet. If the copy vector is valid and is 0, the packet is not transferred in the subring 704. If the copy vector is valid and is 0 or invalid, the packet is transferred in the subring 704. The type of local memory is MH. As obvious from the description herein above, the processing for taking an access to the remote memory does not results in the delaying of the latency and does not involve the access to unnecessary subrings.

TWO-WAY RING

Figure 70:
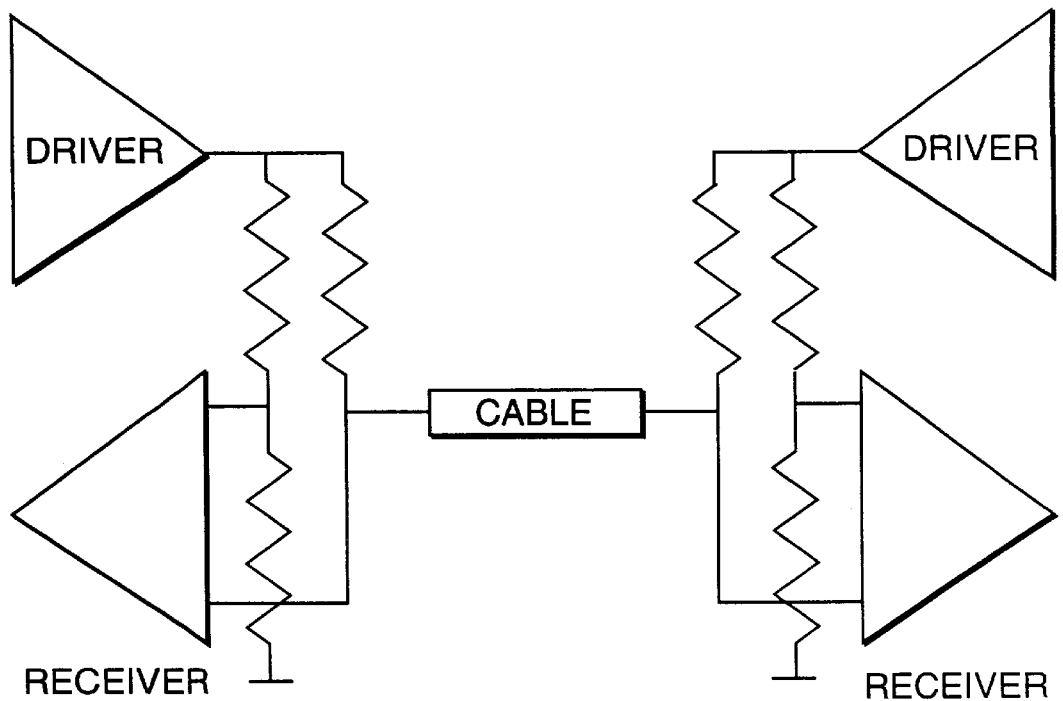
FIG. 70 is a diagram for illustrating the discrimination circuit of the two-way ring of the present invention.
Figure 71:
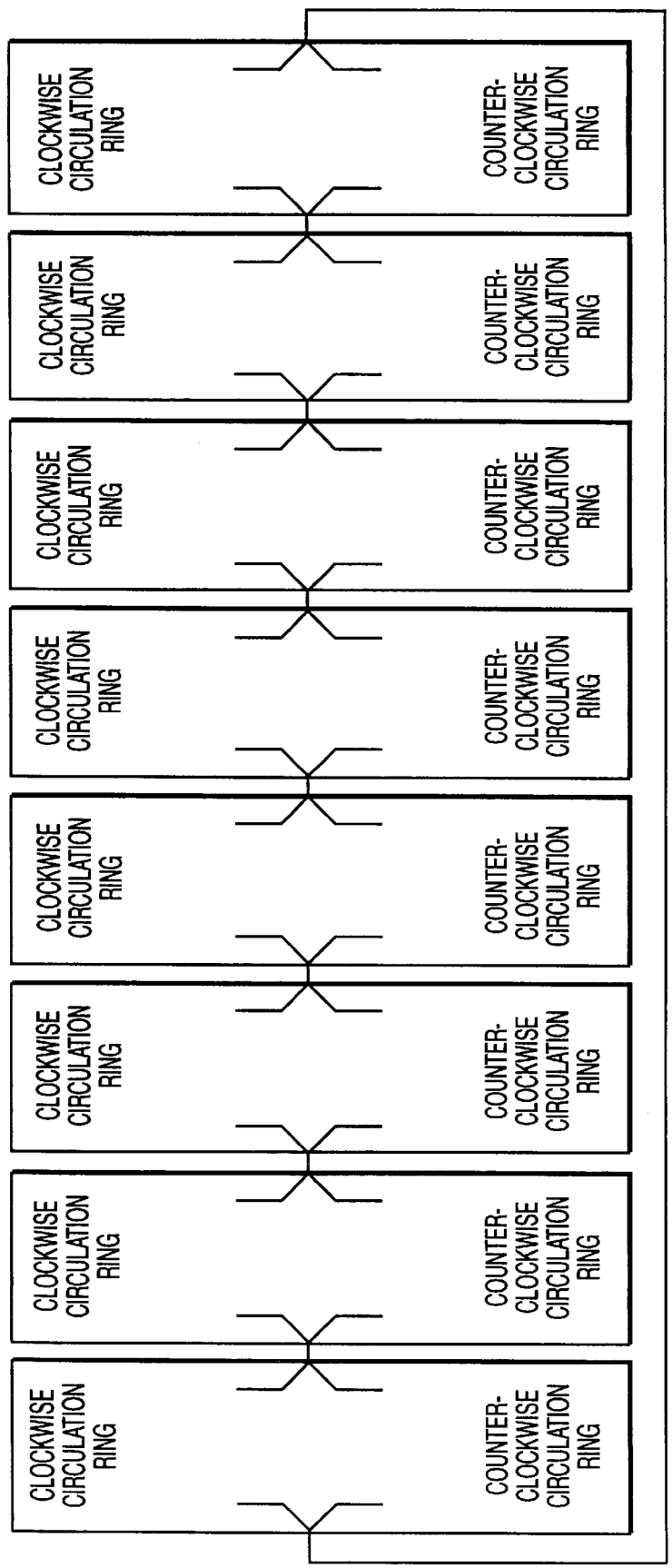
FIG. 71 is a diagram for illustrating inter-module connection of the two-way ring in the present invention.

The one-to-one transmission in one direction is operated between modules. Two independent two-way rings can be structured by using a two-way transmission circuit. The two-way ring provides the expandability which doubles the limit of performance while the wiring of the ring connection remains unchanged. Because of the limitation that synchronizing of two rings is impossible, the discrimination accuracy of a discrimination circuit of transmission direction is reduced, and because of the restriction on the frequency characteristics, the limit of the operating frequency is reduced. Further, because of the discrimination circuit itself and also noise generated from the discrimination circuit, the restriction on the number of modules in the relay mode becomes serious, the proportion of the transfer mode modules increases to result in longer latency. A broadcast ordinary packet assures the logical ordering using one ring, and distributes to two rings an ordinary packet having no restriction on the ordering and block packet. The performance is just lower in comparison with a structure of two parallel connection rings. In FIG. 70, an example of the discrimination circuit is shown. In FIG. 71, the connection between modules of a two-way ring is shown.

STRUCTURAL CHANGE

Figure 72:
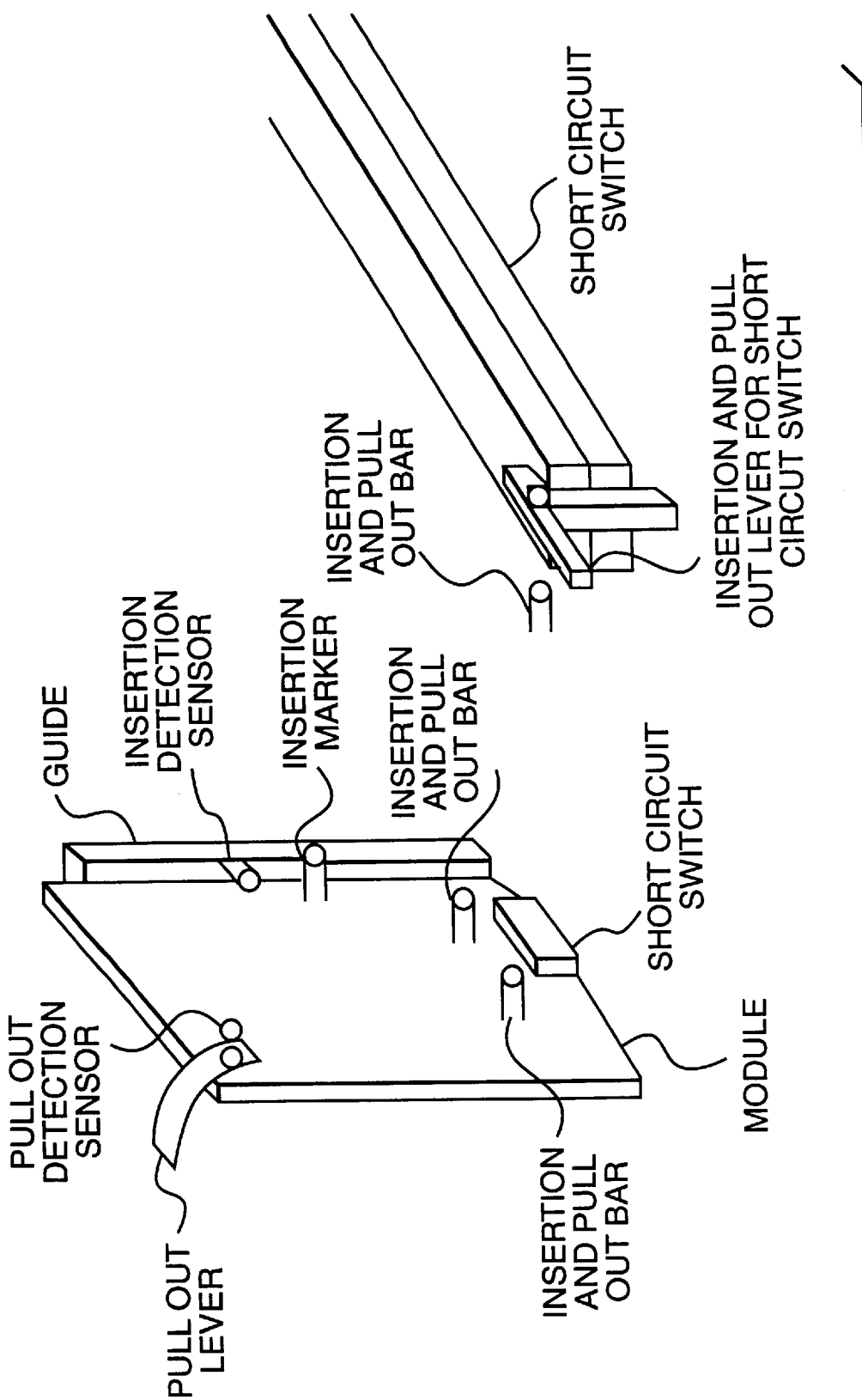
FIG. 72 is a diagram for illustrating the early detection system involving insertion and withdrawal of a module of the present invention.

The ring control unit detects the situation where a structural change is made. The ring control unit transmits a frame for health checking of respective module (check that respective module operate normally or not) and receives no response. The ring control unit operates the health check of respective modules, is informed of the completion of a structural change by re-response, and operates initialization. Generally, some packets are lost by structural change, therefore it is required to back up to a suitable restarting point. In FIG. 72, a method is shown, in which when the structural change of the ring is operated, the plan is stopped, the operation of the ring is stopped, and initialization is operated. Immediately the plan is restarted.

To have early notification of the pulling out of a module, the pulling up of a pull-out lever of the module is detected by a pulling out sensor. The detection is reported to the ring control unit through the module control unit. When the module receives broadcast of a pulling out report, the ring control unit of the module suppresses starting of the new operation request to respective modules, operates the response to previous operation request preferentially, and directs the normal stop of hardware operations.

In linking with the pulling out of a module, the short circuit switch is shorted. The ring control module confirms automatically the completion of the pulling out of a module by health checking. The clock of the ring is supplied continuously during the pulled out condition of the module, therefore the normal stopping condition of modules other than the pulling out module continues. In response to the pulling out report of the module, the address is reset, initialization is performed for modules which require skew correction, the module in deadhead mode decides the number of cycles for one circulation of the ring. The ring control unit terminates the hardware stopping condition and transmits new structural information.

Operations of the ring are stopped when a module is inserted. To detect early the insertion of a module, the insertion signal (1) is provided. The insertion line begins from the guide of the module, passes through a short circuit connector if connected, and connects and terminates at the next module. The module does not transfer an insertion signal because of connection between modules. The insertion sensor detects the passage through the guide of the module, and the insertion signal is shorted temporarily. Respective modules always monitor the shorting of the insertion signal, when shorted, respective modules report to the ring control unit the notice that the former module is to be inserted. The ring control unit does not start new operation requests to respective modules, but operates responses to previous operation requests preferentially, then directs the normal stop of hardware operations.

In linking with insertion of a module, the short circuit switch is turned off mechanically. The ring control unit confirms the completion of the insertion and specifies the module based on response to health checking. The clock of the ring is supplied during insertion of the module, therefore the normal stopping condition of the modules other than the inserting module continues. In response to the report of insertion, the address is reset, initializing is operated to modules which require skew correction, the module in deadhead mode decides the number of cycles for one circulation of the ring. The ring control unit terminates the hardware stopping condition and transmits new structural information. Two rings are connected, synchronous and parallel operations are operated in normal condition, and degeneration operation is operated in failure condition. A delay latch of 1 cycle is provided in deadhead mode to synchronize two rings, the number of cycles for one circulation of the ring is coincided, and operation of ring control unit is synchronized. If a plurality of main rings of hierarchical connection is provided, the throughput and reliability are improved through the extensibility is reduced slightly. Slots are connected using cables without a common substrate.

EXAMPLE OF INTERFACE SIGNAL LINE

Figure 73:
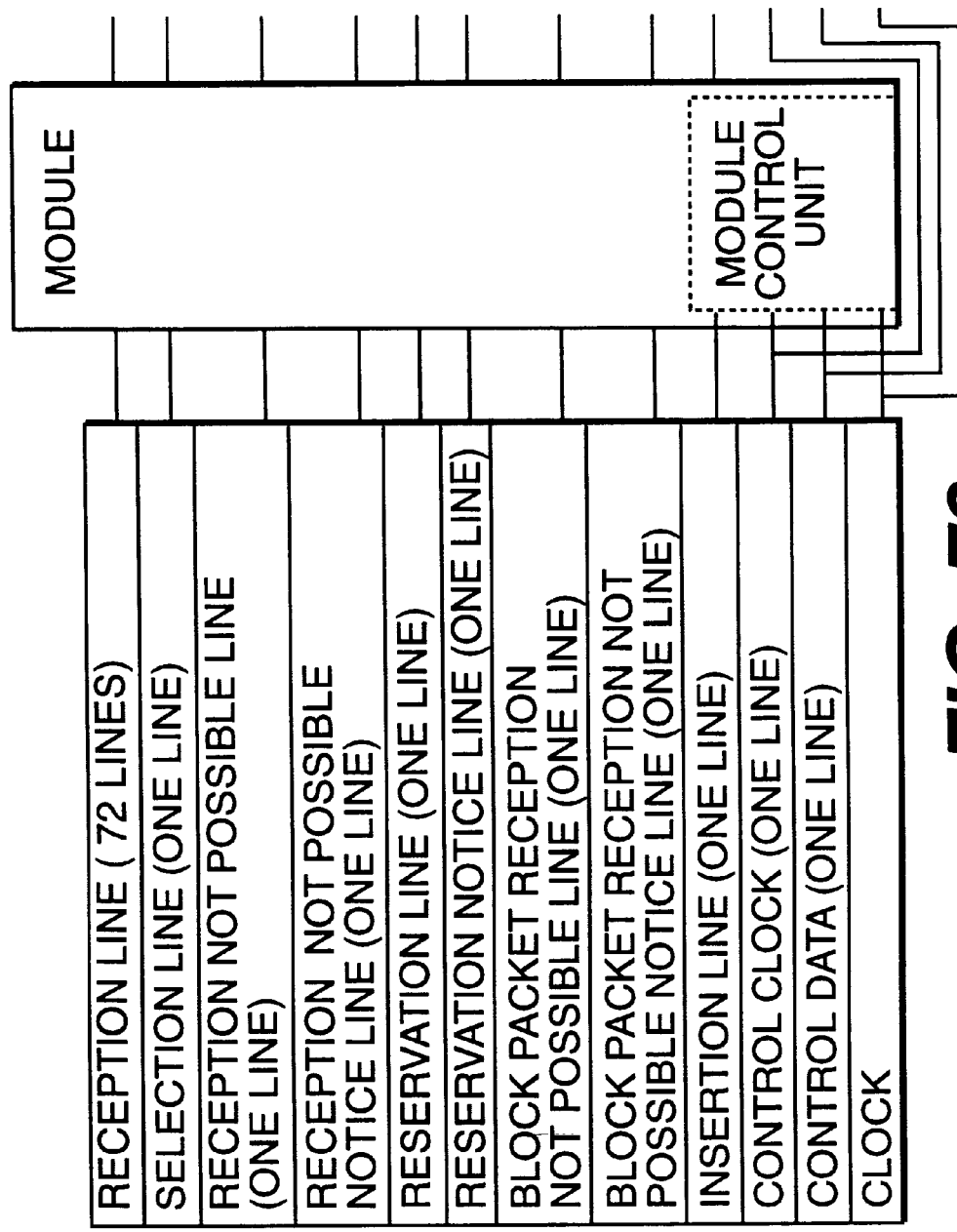
FIG. 73 is a diagram for illustrating an example of the ring interface of the present invention.

An example of interface signal line is shown in FIG. 73. In this example, because the memory has a directory, there is no directory ring. The selecting ring is not applied.

INITIALIZATION

The address of respective modules, the deadhead mode, the transfer mode, the relay mode, the phase adjustment circuit, the cycle adjustment circuit, the variable delay circuit, the number of cycles for one circulation of the ring, and the synchronizing of the clock of packets with a plurality of cycles are set when initializing. The ring control unit sends indications to the module control units of the respective modules to operate the control of the whole ring, the mutual relationship between the modules, and the synchronizing of the processing. The module control unit operates processing such as the setting of the variable delay circuits based on indications.

RING CONTROL UNIT

The ring control unit controls and administrates initialization of the ring control and distributes clocks to the respective modules in the form of a ring. The ring control unit receives confirmation of the condition that the clock is distributed. Respective modules execute processing based on the indications from the ring control unit, and report the condition to the ring control unit.

The ring control unit transmits indications by way of a frame. Indications are output step-by-step. The content of a frame is composed of a command byte, address byte, gap with two bytes, and data of two bytes. The commands involves an indication and response request by the ring control unit. The address indicates the respective modules or a broadcast. The gap with two bytes gives a time for processing a response to the module control unit. The data are an indication to respective modules or response from respective modules. The module specified by the address receives frame data from the indication frame. The module specified by the address module responds by putting the content in the data section of the response request frame. The ring control unit and the respective module are connected in a ring form. The control ring is provided with the structure of what is called a ring bus to keep high independence from respective modules. The frame comprises bits and bytes. The bit synchronizing is operated by the control clock. The phase of the control clock rises at the center of a frame bit. The byte synchronization is operated using a synchronizing pattern "000000000000FF". The frame synchronization is operated using "FExxxxxxxx". "00" is put between frames.

POWER-ON MODE

The ring control unit directs the power-on mode to respective modules by way of a broadcast. In the power-on mode, only the deadhead mode and the transfer mode are used to cope with fluctuations in operations.

SETTING OF MODULE ADDRESS

The ring control unit directs respective modules to prepare for address setting by way of the broadcast. Respective modules have previously a slot number to be inserted. Upon receiving the indication of address setting preparation, respective modules operate to the address section with the slot number. The ring control unit puts the slot number in the address section and requests responses of the type of module and logical address. The specified module reports the type of processor, IO, memory, and processor subsystem by way of the data section. The ring control unit puts the slot number in the address section and puts the address of the module in the data section, and indicates the address setting. The control unit directs to the respective modules the completion of the address setting by way of the broadcast. Upon receiving the indication of the address setting completion, the respective modules are operated on the address which is set to the address section. The ring control unit sets the deadhead mode, the transfer mode, and the relay mode.

SKEW CORRECTION FOR EVERY RECEPTION LINES

When skew correction for each of the reception lines is operated, the ring control unit directs the modules of deadhead mode and transfer mode to transmit a 1000 repeating pattern. The ring control unit directs the subsequent module to operate skew correction with broken down basic operations.

First, the phase of the adjusting clock is subjected to initial setting. The initial setting of the adjusting clock is completed through 0 setting of quantity of delay of the variable delay circuit, indication of adjustment starting of the phase adjustment circuit, indication to detect 0 of all the reception lines, scanning of every step of delay quantity of the phase adjustment circuit, and reporting for every step a 0 detection result. Next, the phase of the delay clock is matched to the reception line with the largest delay. The phase of the phase adjustment circuit is matched to the reception line with the largest delay through indication to detect "1" of all the reception lines, scanning of every steps of delay quantity of the phase adjustment circuit, and reporting of "1" detection result for every steps. Next, by scanning of every steps of delay quantity of the variable delay circuit, the delay quantity where "1" is detected last. After completion of the scanning of the delay quantity, the contained delay quantity is returned and the skew correction is completed. In this case, the reception phase is determined simultaneously by supplying a clock with reverse phase to the delay clock. This operation is repeated for all of the modules to indicate the completion of skew correction, and it is supplied to the ring control sections other than the ring control section of the modules which write the delay clock.

DETERMINATION OF RECEPTION PHASE

The preceding module transmits a 1000 setting pattern. First, the delay clock is matched to the reception line with the smallest delay, and this is used as the heading edge. Next, the delay clock is matched to the reception line with the largest delay, and this is used as the trailing edge. Subsequently, the delay clock is matched to the intermediate reception line, and a clock with reverse phase is supplied to determine the reception phase. The module control unit indicates the module control unit of the preceding module with broken down basic operations.

CYCLE ADJUSTMENT CIRCUIT

A module in deadhead mode transmits a 10 repeating pattern. From the input detection circuit built in the cycle adjustment circuit of the module in deadhead mode, values before a prescribed time of the clock and after a prescribed time of the clock are reported. If two values are the same, the direct latch not through the cycle adjustment latch is indicated. If two values are not the same, latching through the cycle adjustment latch is indicated.

SETTING OF THE NUMBER OF CYCLES

The ring control module directs the module in deadhead mode to transmit a repeating pattern having a single 1 and subsequent specified number of 0. The ring control module directs the module in the deadhead mode to operate the number of cycles for one circulation of the ring with an interval of reception of 1, and requests a report. The ring control unit informs the respective modules of the number of cycles for one circulation of the ring by way of the broadcast.

SETTING OF PHASE OF A PLURALITY OF CYCLES

The setting of the phase of a plurality of cycles is indicated by way of a broadcast. The repeating pattern composed of 1 matched to the number of cycles and subsequent 0's is transmitted in the deadhead mode. The completion of the setting is indicated by way of the broadcast.

CHANGING TO OPERATIONAL MODE

The ring control unit terminates the power-on mode and changes to the operational mode after a prescribed time required for acquiring stable condition of skew quantity from the condition just after power-on. The deadhead mode, transfer mode, relay mode, skew correction for every reception lines, reception phase, cycle adjustment circuit, and number of cycles are determined again for respective modules of the ring.

DETECTION OF ERROR OPERATIONS

The control ring monitors respective modules by health checking. As to the detection of error operations in the basic ring, periodical checking of the error detection code for the data line and the transmission right abandonment is monitored. The impossible recovery of the ring and frequent error operations exceeding a prescribed number of error operations are reported from the module control unit to the ring control unit through the ring control interface. The ring control unit directs the ring to stop and operates initialization. The ring control unit receives the report of a fault which is specific to respective modules by health checking, and directs the module control unit to disconnect it.

According to the data transfer method and information processing system using the ring connection, the latency due to the passage through processors is reduced, and a high performance of the information processing system is realized. Modules are supplied with a stable clock from the ring even during switching when the ring usually stops the operation. Further, according to the data transfer method and information processing system using ring connection, the throughput of the information processing system is improved.

I claim:

1. A data transfer method using ring connection of an information processing system having a plurality of modules including one of said plurality of modules being a processor module connected with rings comprising a plurality of signal lines, comprising the steps of:

distributing a clock to said plurality of modules through a clock line as an operating clock;

relaying received signals through the ring in a first module of said plurality of modules to a second module next to the first module in the ring;

transmitting a request for a data transmission right through a selection line of the ring in a first module of said plurality of modules;

receiving signals from a third module of said plurality of modules through the selection line in the first module; acquiring the requested data transmission right in the first module when the received signals through the selection line include no request for another data transmission right; and transmitting data through a plurality of data lines of the ring at predetermined cycles of the clock after the acquisition of the transmission right in the first module.

2. A data transfer method according to claim 1, further comprising the steps of:

distributing a clock to said plurality of modules via a clock line; and performing an operation including data transmission, data reception and data transfer via the ring in accordance with the clock.

3. A data transfer method according to claim 1 further comprising the steps of: distributing a clock to said plurality of modules via a clock line; and performing an operation including data transmission, data reception and data transfer via the ring in accordance with the clock.

4. A data transfer method according to claim 1, further comprising the steps of:

transmitting address data through a plurality of address lines of the ring at predetermined cycles of the clock after the acquisition of the transmission right in the first module, wherein address data specifies a destination module of said plurality of modules; and receiving the transmitted data to process the data in the destination module.

5. A data transfer method according to claim 1, further comprising the steps of:

adjusting a phase of the clock in accordance with a signal received from the ring in each of said plurality of modules; and delaying the relay of a received signal through the ring in one of said plurality of modules to adjust the number of the clock cycle for one circulation of the ring to be an integer number.

6. A data transfer method according to claim 1, further comprising the step of correcting skew of the received signals for each line of said plurality of signal lines.

7. An information processing system using ring connection, comprising:

a ring comprising a plurality of signal lines, including a selection line and a plurality of data lines; and a plurality of modules connected with the ring in order;

wherein each module of said plurality of modules comprises:

transmitting means for transmitting signals through the ring to the next module of said plurality of modules in the order of the ring;

receiving means for receiving signals through the ring from the prior module of said plurality of modules in the order of the ring;

relay means for relaying received signals from the prior module to the next module;

data transmission right acquiring means for transmitting a request for a data transmission right through the selection line to the next module and for acquiring the requested data transmission right when the received signals through the selection line include no request for another data transmission right; and means for transmitting data through said plurality of data lines after the acquisition of the data transmission right.

8. An information processing system according to claim 7, said plurality of signal lines including a plurality of address lines, wherein said data transmitting means transmits address data through said plurality of address lines after the acquisition of the transmission right, said address data specifying one of said plurality of modules; and wherein each of said plurality of modules further comprises means for reading received data transmitted through said plurality of data lines when said received address data transmitted through said plurality of address lines specifies the module.

9. An information processing system according to claim 8, further comprising means for distributing a clock to said plurality of modules through a clock line as an operating clock, at predetermined cycles of the clock.

10. An information processing system according to claim 9, wherein said data transmitting means transmits the data and the address data at predetermined cycles of the clock after the acquisition of the transmission right.

11. An information processing system according to claim 9, wherein one of said plurality of modules further comprises means for delaying the relay of received signals through the ring to adjust the number of the clock cycle for one circulation of the ring to be an integer number.

12. An information processing system according to claim 9, said ring including a block packet ring, wherein said block packet ring comprises a reservation line and a reservation notifying line, and wherein each of said plurality of modules further comprising:

reservation right acquiring means for transmitting a request for a reservation right of a block packet transmission through the reservation line to the next module and for acquiring the reservation right when the received signals through the reservation line include no request for another reservation right;

means for notifying the acquisition of the reservation right through the reservation notifying line at first predetermined cycles of the clock after the acquisition of the reservation right;

means for transmitting the block packet through said plurality of data lines at second predetermined cycles of the clock after notifying the acquisition of the reservation right; and means for suppressing data transmission by said means for transmitting data in case of receiving the notice of the acquisition of the reservation right.

* * * * *